United States Patent [19]

Sawada et al.

[11] Patent Number: 5,414,065
[45] Date of Patent: May 9, 1995

[54] POLYMER COMPRISING FLUOROALKYL GROUP, A METHOD OF PREPARATION THEREOF, A SURFACE ACTIVE AGENT, A SURFACE TREATMENT AGENT AND A COATING COMPOSITION

[75] Inventors: Hideo Sawada, Kamakura; Keiji Komoto, Tokyo; Masahiro Sano, Yokohama; Yutaka Enokida, Yokosuka; Mitani Motohiro, Tsukuba; Takeo Matsumoto, Tsukuba; Masaharu Nakayama, Tsuchiura; Masato Okajima, Kusatsu, all of Japan

[73] Assignee: NOF Corporation, Tokyo, Japan

[21] Appl. No.: 262,981

[22] Filed: Jun. 21, 1994

Related U.S. Application Data

[62] Division of Ser. No. 959,372, Oct. 13, 1992, Pat. No. 5,324,803.

[30] Foreign Application Priority Data

| Oct. 14, 1991 | [JP] | Japan | 3-265061 |
| Oct. 16, 1991 | [JP] | Japan | 3-267728 |
| Nov. 8, 1991 | [JP] | Japan | 3-293447 |
| Nov. 11, 1991 | [JP] | Japan | 3-294547 |
| Mar. 9, 1992 | [JP] | Japan | 4-50883 |
| Apr. 10, 1992 | [JP] | Japan | 4-91280 |
| Jul. 3, 1992 | [JP] | Japan | 4-177037 |
| Jul. 16, 1992 | [JP] | Japan | 4-189553 |
| Aug. 6, 1992 | [JP] | Japan | 4-210362 |
| Aug. 19, 1992 | [JP] | Japan | 4-220298 |

[51] Int. Cl.⁶ ............... C08F 30/08; C08F 4/32
[52] U.S. Cl. ............... 526/279; 526/231; 526/273; 526/287; 526/317.1; 526/328.5; 526/329.3; 526/344; 526/346; 526/352.2
[58] Field of Search ......... 526/231, 279, 273, 287, 526/317.1, 328.5, 329.3, 344, 346, 352.2

[56] References Cited

U.S. PATENT DOCUMENTS

| 2,792,423 | 5/1957 | Young et al. |
| 3,397,191 | 8/1968 | Beckerbauer | 526/231 |
| 3,418,302 | 12/1968 | Darby | 526/247 |
| 3,493,530 | 2/1970 | Sianesi et al. | 526/231 |
| 3,810,875 | 5/1974 | Rice et al. |
| 4,559,630 | 7/1951 | Bullitt, Jr. | 526/231 |
| 4,861,845 | 8/1989 | Slocum et al. | 526/247 |
| 5,068,454 | 11/1991 | Sawada et al. |

FOREIGN PATENT DOCUMENTS

| 0186215 | 7/1986 | European Pat. Off. |
| 0405396A1 | 1/1991 | European Pat. Off. |
| 60-127371 | 7/1985 | Japan |
| 794830 | 5/1955 | United Kingdom |
| PCT91/00272 | 1/1991 | WIPO |

OTHER PUBLICATIONS

Zhao Chengxue, "Thermal Decomposition of Some Perfluoro– and Polyfluorodiacyl Peroxides," *J. Org. Chem.* vol. 47 (1982):2009–2013.

*Primary Examiner*—Joseph L. Schofer
*Assistant Examiner*—N. Sarofim
*Attorney, Agent, or Firm*—Levy, Zito & Grandinetti

[57] ABSTRACT

A polymer comprising fluoroalkyl group has a structure in which one or two parts of the fluoroalkyl group at the one or both ends of the molecule are linked to a part of alkylene groups or alkylene groups substituted with halogen, a part of alkylene group substituted with functional groups, such as halogen, cyano group, alkylsulfonic acid group, amidoalkylsulfonic acid group, carboxylic acid group, carboxyl group, oxycarbonyl group, ether group, epoxy group and the like, and/or a part of silicone group. A method of preparation of the polymer comprising fluoroalkyl group contains reaction of a fluoroalkanoyl peroxide with a monomer comprising the functional group or a monomer comprising silicone group. A surface active agent comprises fluoroalkyl group and caroxylic acid salt group. A surface treatment agent comprises the polymer comprising fluoroalkyl group, hydrolysis products thereof, hydrolytic condensation products thereof, and mixtures thereof. A coating composition comprises the polymer comprising fluoroalkyl group. The polymer comprising fluoroalkyl group has excellent water repellency, oil repellency and weatherability because the fluoroalkyl group is introduced into the molecule through carbon-carbon linkage.

4 Claims, No Drawings

POLYMER COMPRISING FLUOROALKYL GROUP, A METHOD OF PREPARATION THEREOF, A SURFACE ACTIVE AGENT, A SURFACE TREATMENT AGENT AND A COATING COMPOSITION

This application is a division of U.S. application Ser. No. 07/959,372, filed Oct. 13, 1992, now U.S. Pat. No. 5,324,803.

BACKGROUND OF THE INVENTION

1. Field of the Invention

The present invention relates to a novel polymer comprising fluoroalkyl group, a novel method of preparation thereof, a novel surface active agent, a novel surface treatment agent and a novel coating composition.

2. Description of the Prior Art

Organic compounds comprising fluoroalkyl group in the molecule have been attracting attention because of the advantageous properties such as weatherability, water repellency, oil repellency and physiological activity. Particularly, polymers comprising fluoroalkyl group in which the fluoroalkyl group is chemically introduced into the polymeric molecule have advantageous properties such as low surface tension, low light refractivity, heat resistance, cold resistance, oil resistance, electric insulation, water repellency, mold releasing property, resistance against chemicals and the like and have been considered to be useful for application to the area of surface treatment to provide properties like water repellency, oil repellency and resistance against fouling to surfaces of optical lenses, lenses of spectacles, glass apparatuses, coated layers and the like, to the area of materials for biological applications, medicines and agricultural chemicals and to the area of providing materials with mold releasing property. However, conventional polymers comprising fluoroalkyl group have a problem that weatherability is inferior because the fluoroalkyl group is introduced through ester linkage to acrylic acid or methacrylic acid or through amino linkage. An example of epoxy compound comprising fluoroalkyl group in which the fluoroalkyl group is introduced through amino linkage is described in J. Fluorine Chem. volume 55, page 1 (1991). Acrylic coating materials comprising fluoroalkyl group have problems that the fluoroalkyl group is easily eliminated by hydrolysis and the water repellency and the oil repellency are decreased and that resistance against fouling is insufficient because the fluoroalkyl group is introduced into the polymer through ester linkage. A fluororesin coating material developed for the purpose of improvement of weatherability by using chlorotrifluoroethylene (Yuki Gosei Kagaku Kyokaishi, volume 42, page 841 (1992)) has a problem that the water repellency and the oil repellency are inferior and the resistance against fouling is insufficient even though it has good weatherability.

Fluororesins comprising fluoroalkyl group such as fluoroacrylate polymers comprising fluoroalkyl group introduced through ester linkage have been widely used as surface treatment agents by which surfaces of articles and apparatuses are provided with protected surfaces, beautiful appearance, water repellency, oil repellency, electric insulation, mold releasing property, resistance against fouling and the like through the coating layer formed on the surface. However, the fluororesins have problems that they have inferior adhesive property to inorganic materials such as metals, glasses, cement and the like and organic materials such as various kind of plastics, substrates and the like and that they have inferior stability against acids and alkalis because the fluoroalkyl group is introduced into the polymer molecule through ester linkage.

For the purpose of improving the problems described above, silicone compounds comprising fluoroalkyl group were proposed in literatures such as Laid Open Japanese Patent Application Showa 59-10280. However, the silicone compounds cannot improve the adhesive property to the satisfactory degree and has an additional problem that the water repellency and the oil repellency are decreased.

Recently, it is considered that surface active agents and surface treatment agents comprising fluoroalkyl group having the water repellency and the oil repellency and amphiphillic group having hydrophillic property in the same molecule will be useful as SR processing agents, antifogging agents, surface active agents and surface treatment agents and the development of such kind of agents is urgently desired.

Thus, development of agents comprising fluoroalkyl group introduced directly through carbon-carbon linkage in the molecule and having excellent water repellency and the oil repellency is urgently desired.

SUMMARY OF THE INVENTION

The present invention accordingly has an object to provide a polymer comprising fluoroalkyl group introduced through carbon-carbon bond, a surface active agent, a surface treatment agent and a coating composition which have excellent properties such as low surface tension, low light refractivity, heat resistance, cold resistance, oil resistance, electric insulation, water repellency, mold releasing property and resistance against chemicals as well as water repellency, oil repellency and resistance against fouling at the surface of optical lenses, lenses of spectacles, glass apparatuses, coating and the like. Another object of the invention is to provide a method of preparation of the polymer comprising fluoroalkyl group introduced through carbon-carbon linkage easily with a high yield without using a reaction catalyst or a particular apparatus.

Thus, the polymer comprising fluoroalkyl group of the invention has number average molecular weight in the range from 500 to 1000000 and has the formula (I):

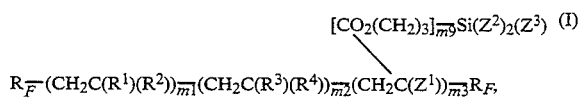

$$R_F-(CH_2C(R^1)(R^2))_{\overline{m_1}}(CH_2C(R^3)(R^4))_{\overline{m_2}}(CH_2C(Z^1))_{\overline{m_3}}R_F,$$

wherein $Z^1$ is hydrogen atom or methyl group, $Z^2$ and $Z^3$ are the same or different groups having 1 to 10 carbon atoms respectively selected from the group consisting of alkyl group, alkoxy group and alkylcarbonyloxy group, $R^1$ and $R^2$ are the same or different atoms or groups respectively selected from the group consisting of hydrogen atom, halogen atom and alkyl group having 1 to 5 carbon atoms, $R^2$ and $R^4$ are the same or different atoms or groups respectively selected from the group consisting of hydrogen atom, halogen atom, cyano group, alkylsulfonic acid group having 1 to 4 carbon atoms, amidoalkylsulfonic acid group having 1 to 4 carbon atoms, —$CO_2R^5$, —$OCOR^6$, —$OR^7$,
—$CO_2(CH_2CH(R^8)O)_{m4}$—$(CH_2CH(R^9)O)_{m5}[CH_2CH_2(CH_2)_{m7}O]_{m6}(R^{10})$,

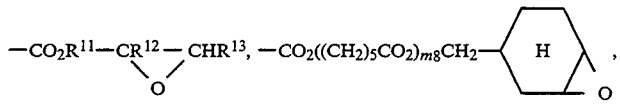

—$CO_2CHCH_3OR^{14}$ and
—$CO_2(CH_2)_r$—$CHR^{15}CHR^{16}O[CO(CH_2)_sCHR^{17}(CH_2)_tCHR^{18}O]_u$—H, $R_F$ is —$(CF_2)_{n1}X$ or $-\underset{CF_3}{\underset{|}{CF}}-(OCF_2CF)_{n2}-OC_3F_7$,
                            $\underset{CF_3}{\underset{|}{}}$ $m_1$ is an integer of 1 to 1000, $m_2$ and $m_3$ are respectively an integer of 0 to 3000, $R^5$ is hydrogen atom, sodium atom, potassium atom, ammonium group, alkyl group having 1 to 18 carbon atoms or hydroxyalkyl group having 3 to 6 carbon atoms, $R^6$ and $R^7$ are the same or different atoms or groups respectively selected from the group consisting of hydrogen atom, alkyl group having 1 to 18 carbon atoms and hydroxyalkyl group having 1 to 4 carbon atoms, $R^8$, $R^9$ and $R^{10}$ are the same or different groups respectively selected from the group consisting of hydrogen atom and methyl group, $R^{11}$ is alkylene group having 1 to 10 carbon atoms or —$(CH_2CH_2O)_pCH_2$—, $R^{12}$ and $R^{13}$ are the same or different atoms or groups respectively selected from the group consisting of hydrogen atom and alkyl group having 1 to 18 carbon atoms, $R^{14}$ is alkyl group having 1 to 18 carbon atoms, $m_4$ is an integer of 1 to 20, $m_5$ and $m_6$ are respectively an integer of 0 to 20, $m_7$ is 1 or 2, $m_8$ is an integer of 0 to 5, p is an integer of 1 to 10, $R^{15}$, $R^{16}$, $R^{17}$ and $R^{18}$ are the same or different atoms or groups respectively selected from the group consisting of hydrogen atom and methyl group, r is an integer of 0 to 2, s and t are respectively an integer of 0 to 3, u is an integer of 1 to 5, $n_1$ is an integer of 1 to 10, X is fluorine atom, chlorine atom or hydrogen atom, $n_2$ is an integer of 0 to 8, $m_9$ is 0 or 1 and $Z^1$ is hydrogen atom when $m_9=0$.

The method of preparation of the polymer comprising fluoroalkyl group described in claim 1 of the invention comprises reaction of a fluoroalkanoyl peroxide having the formula (II):

          (II)

wherein $R_F$ is —$(CF_2)_{n1}X$ or

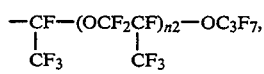

$n_1$ is an integer of 1 to 10, X is fluorine atom, chlorine atom or hydrogen atom and $n_2$ is an integer of 0 to 8; with a monomer having the formula (III):

$CH_2=C(R^1)(R^2)$          (III), wherein $R^1$ is hydrogen atom, halogen atom or alkyl group having 1 to 5 carbon atoms, $R^2$ is hydrogen atom, cyano group, alkylsulfonic acid group having 1 to 4 carbon atoms, amidoalkylsulfonic acid group having 1 to 4 carbon atoms, —$CO_2R^5$, —$OCOR^6$, —$OR^7$,
—$CO_2(CH_2CH(R^8)O)_{m4}$—
    —$(CH_2CH(R^9)O)_{m5}[CH_2CH_2(CH_2)_{m7}O]_{m6}(R^{10})$,
—$CO_2R^{11}$—$CR^{12}$——$CHR^{13}$,
              $\diagdown O \diagup$

—$CO_2CHCH_3OR^{14}$ or

—$CO_2(CH_2)_r$—

—$CHR^{15}CHR^{16}O[CO(CH_2)_sCHR^{17}(CH_2)_tCHR^{18}O]_u$—H, $R^5$ is hydrogen atom, alkyl group having 1 to 18 carbon atoms or hydroxyalkyl group having 3 to 6 carbon atoms, $R^6$ and $R^7$ are the same or different atoms or groups respectively selected from the group consisting of hydrogen atom, alkyl group having 1 to 18 carbon atoms and hydroxyalkyl group having 1 to 4 carbon atoms, $R^8$, $R^9$ and $R^{10}$ are the same or different groups respectively selected from the group consisting of hydrogen atom and methyl group, $R^{11}$ is alkylene group having 1 to 10 carbon atoms or —$(CH_2CH_2O)_pCH_2$—, $R^{12}$ and $R^{13}$ are the same or different atoms or groups respectively selected from the group consisting of hydrogen atom and alkyl group having 1 to 18 carbon atoms, $R^{14}$ is alkyl group having 1 to 18 carbon atoms, $m_4$ is an integer of 1 to 20, $m_5$ and $m_6$ are respectively an integer of 0 to 20, $m_7$ is 1 or 2, $m_8$ is an integer of 0 to 5, p is an integer of 1 to 10, $R^{15}$, $R^{16}$, $R^{17}$ and $R^{18}$ are the same or different atoms or groups respectively selected from the group consisting of hydrogen atom and methyl group, r is an integer of 0 to 2, s and t are respectively an integer of 0 to 3 and u is an integer of 1 to 5; or a monomer having the formula (IV):

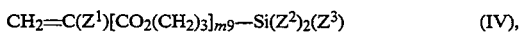          (IV), wherein $Z^1$ is hydrogen atom or methyl group, $Z^2$ and $Z^3$ are groups having 1 to 10 carbon atoms respectively selected from the group consisting of alkyl group, alkoxy group and alkylcarbonyloxy group, $m_9$ is 0 or 1 and $Z^1$ is hydrogen atom when $m_9=0$.

The surface active agent comprising fluoroalkyl group of the invention has number average molecular weight in the range from 500 to 50000 and has the formula (V):

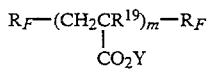

wherein $R_F$ is $-(CF_2)_{n1}X$ or

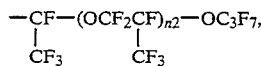

Y is hydrogen atom, sodium atom, potassium, atom or ammonium group, $n_1$ is an integer of 1 to 10, X is fluorine atom, chlorine atom or hydrogen atom, $n_2$ is an integer of 0 to 8 and m is an integer of 1 to 250.

The surface treatment agent of the invention comprises effective components selected from the group consisting of a polymer comprising fluoroalkyl group, having number average molecular weight in the range from 500 to 1000000 and having the formula (VI):

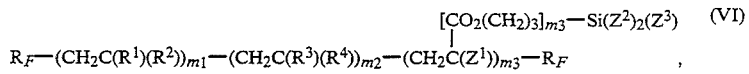

wherein $Z^1$ is hydrogen atom or methyl group, $Z^2$ and $Z^3$ are the same or different groups having 1 to 10 carbon atoms respectively selected from the group consisting of alkyl group, alkoxy group and alkylcarbonyloxy group, $R^1$ and $R^3$ are the same or different atoms or groups respectively selected from the group consisting of hydrogen atom, halogen atom and alkyl group having 1 to 5 carbon atoms, $R^2$ and $R^4$ are the same or different atoms or groups respectively selected from the group consisting of hydrogen atom, halogen atom, cyano group, alkylsulfonic acid group having 1 to 4 carbon atoms, amidoalkylsulfonic acid group having 1 to 4 carbon atoms,

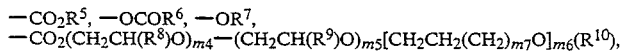

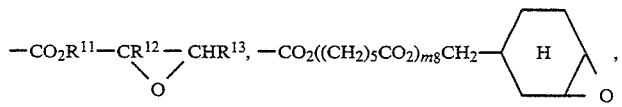

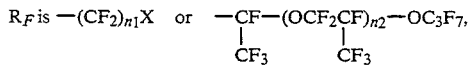

$m_1$ is an integer of 1 to 1000, $m_2$ and $m_3$ are respectively an integer of 0 to 3000, $R^5$ is hydrogen atom, alkyl group having 1 to 18 carbon atoms or hydroxyalkyl group having 3 to 6 carbon atoms, $R^6$ and $R^7$ are the same or different atoms or groups respectively selected from the group consisting of hydrogen atom, alkyl group having 1 to 18 carbon atoms and hydroxyalkyl group having 1 to 4 carbon atoms, $R^8$, $R^9$ and $R^{10}$ are the same or different groups respectively selected from the group consisting of hydrogen atom and methyl group, $R^{11}$ is alkylene group having 1 to 10 carbon atoms or $-(CH_2CH_2O)_nCH_2-$, $R^{12}$ and $R^{13}$ are the same or different atoms or groups respectively selected from the group consisting of hydrogen atom and alkyl group having 1 to 18 carbon atoms, $R^{14}$ is alkyl group having 1 to 18 carbon atoms, $m_4$ is an integer of 1 to 20, $m_5$ and $m_6$ are respectively an integer of 0 to 20, $m_7$ being 1 or 2, $m_8$ is an integer of 0 to 5, p is an integer of 1 to 10, $R^{15}$, $R^{16}$, $R^{17}$ and $R^{18}$ are the same or different atoms or groups respectively selected from the group consisting of hydrogen atom and methyl group, r is an integer of 0 to 2, s and t are respectively an integer of 0 to 3, u is an integer of 1 to 5, $n_1$ is an integer of 1 to 10, X is fluorine atom, chlorine atom or hydrogen atom, $n_2$ is an integer of 0 to 8, $m_9$ is 0 or 1 and $Z^1$ is hydrogen atom when $m_9=0$; hydrolysis products thereof; hydrolytic condensation products thereof; and mixtures thereof.

The coating composition of the invention contains a polymer comprising fluoroalkyl group and having number average molecular weight in the range from 500 to 1000000 as the essential polymer component thereof in an amount of 0.01 to 100 weight % based on the total amount of the polymer, the polymer comprising fluoroalkyl group being prepared by reaction of a material composition comprising a fluoroalkanoyl peroxide having the formula (VII):

wherein $R_F$ is $-(CF_2)_{n1}X$ or

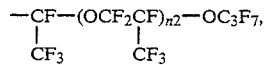

$n_1$ is an integer of 1 to 10, X is fluorine atom, chlorine atom or hydrogen atom and $n_2$ is an integer of 0 to 8; and a silicone monomer having the formula (VIII):

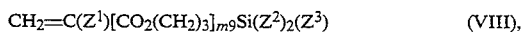

wherein $Z^1$ is hydrogen atom or methyl group, $Z^2$ and $Z^3$ are groups having 1 to 10 carbon atoms respectively selected from the group consisting of alkyl group, alkoxy group and alkylcarbonyloxy group, $m_9$ is 0 or 1 and $Z^1$ is hydrogen atom when $m_9=0$;
and/or a radical polymerizable monomer having the formula (IX):

wherein $R^{20}$ is hydrogen atom, halogen atom, carboxylic acid group or alkyl group having 1 to 5 carbon atoms, $R^{21}$ is hydrogen atom, halogen atom, cyano group, carboxylic acid group, phenyl group, formyloxy group, hydroxyl group, alkyloxycarbonyl group having 1 to 20 carbon atoms, hydroxyalkyloxycarbonyl group having 1 to 4 carbon atoms, alkylcarbonyloxy group having 1 to 18 carbon atoms, hydroxyalkylcarbonyloxy group having 1 to 18 carbon atoms, alkyl ether group having 1 to 8 carbon atoms, alkylsulfonic acid group having 1 to 18 carbon atoms, amidoalkylsulfonic acid group having 1 to 4 carbon atoms, hydroxyalkyl ether group having 1 to 18 carbon atoms,

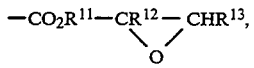

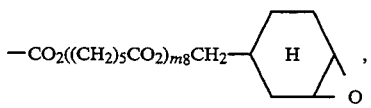

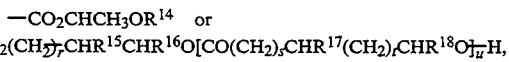

$R^{11}$ is alkylene group having 1 to 10 carbon atoms or $-(CH_2CH_2O)_pCH_2-$, $R^{12}$ and $R^{13}$ are the same or different atoms or groups respectively selected from the group consisting of hydrogen atom and alkyl group having 1 to 18 carbon atoms, $R^{14}$ is alkyl group having 1 to 18 carbon atoms, $m_8$ is an integer of 0 to 5, p is an integer of 1 to 10, $R^{15}$, $R^{16}$, $R^{17}$ and $R^{18}$ are the same or different atoms or groups respectively selected from the group consisting of hydrogen atom and methyl group, r is an integer of 0 to 2, s and t are respectively an integer of 0 to 3 and u is an integer of 1 to 5.

Other and further objects, features and advantages of the invention will appear more fully from the following description.

DETAILED DESCRIPTION OF THE INVENTION

The polymer comprising fluoroalkyl group of the invention has the formula (I):

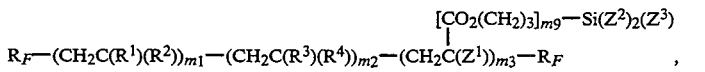

wherein $Z^1$ is hydrogen atom or methyl group, $Z^2$ and $Z^3$ are the same or different groups having 1 to 10 carbon atoms respectively selected from the group consisting of alkyl group, alkoxy group and alkylcarbonyloxy group, $R^1$ and $R^3$ are the same or different atoms or groups respectively selected from the group consisting of hydrogen atom, halogen atom and alkyl group having 1 to 5 carbon atoms, $R^2$ and $R^4$ are the same or different atoms or groups respectively selected from the group consisting of hydrogen atom, halogen atom, cyano group, alkylsulfonic acid group having 1 to 4 carbon atoms, amidoalkylsulfonic acid group having 1 to 4 carbon atoms, $-CO_2R^5$, $-OCOR^6$, $-OR^7$,
$-CO_2(CH_2CH(R^8)O)_{m4}-(CH_2CH(R^9)O)_{m5}[CH_2CH_2(CH_2)_{m7}O]_{m6}(R^{10})$,

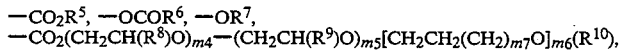

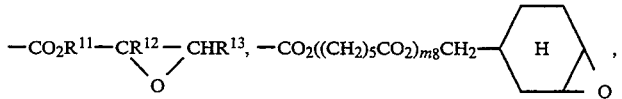

$-CO_2CHCH_3OR^{14}$ and
$-CO_2(CH_2)_r-CHR^{15}CHR^{16}O[CO(CH_2)_sCHR^{17}(CH_2)_tCHR^{18}O]_u-H$,

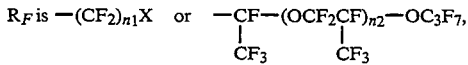

$m_1$ is an integer of 1 to 1000, $m_2$ and $m_3$ are respectively an integer of 0 to 3000, $R^5$ is hydrogen atom, sodium atom, potassium atom, ammonium group, alkyl group having 1 to 18 carbon atoms or hydroxyalkyl group having 3 to 6 carbon atoms, $R^6$ and $R^7$ are the same or different atoms or groups respectively selected from the group consisting of hydrogen atom, alkyl group having 1 to 18 carbon atoms and hydroxyalkyl group having 1 to 4 carbon atoms, $R^8$, $R^9$ and $R^{10}$ are the same or different groups respectively selected from the group consisting of hydrogen atom and methyl group, $R^{11}$ is alkylene group having 1 to 10 carbon atoms or $-(CH_2CH_2O)_pCH_2-$, $R^{12}$ and $R^{13}$ are the same or different atoms or groups respectively selected from the group consisting of hydrogen atom and alkyl group having 1 to 18 carbon atoms, $R^{14}$ is alkyl group having 1 to 18 carbon atoms, $m_4$ is an integer of 1 to 20, $m_5$ and $m_6$ are respectively an integer of 0 to 20, $m_7$ is 1 or 2, $m_8$ is an integer of 0 to 5, p is an integer of 1 to 10, $R^5$, $R^{16}$, $R^{17}$ and $R^{18}$ are the same or different atoms or groups respectively selected from the group consisting of hydrogen atom and methyl group, r is an integer of 0 to 2, s and t are respectively an integer of 0 to 3, u is an integer of 1 to 5, $n_1$ is an integer of 1 to 10, X is fluorine atom, chlorine atom or hydrogen atom, $n_2$ is an integer of 0 to 8, $m_9$ is 0 or 1 and $Z^1$ is hydrogen atom when $m_9=0$.

The fluoroakyl group $R_F$ which is a part of the polymer comprising fluoroalkyl group having the formula (I) is $-(CF_2)_{n1}X$ or

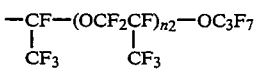

Examples of such fluoroalkyl group are:

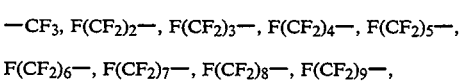

-continued

F(CF$_2$)$_{10}$—, HCF$_2$—, H(CF$_2$)$_2$—, H(CF$_2$)$_3$—, H(CF$_2$)$_4$—,
H(CF$_2$)$_5$—, H(CF$_2$)$_6$—, H(CF$_2$)$_7$—, H(CF$_2$)$_8$—,
H(CF$_2$)$_9$—, H(CF$_2$)$_{10}$—, ClCF$_2$—, Cl(CF$_2$)$_2$—,
Cl(CF$_2$)$_3$—, Cl(CF$_2$)$_4$—, Cl(CF$_2$)$_5$—, Cl(CF$_2$)$_6$—,
Cl(CF$_2$)$_7$—, Cl(CF$_2$)$_8$—, Cl(CF$_2$)$_9$—, Cl(CF$_2$)$_{10}$—,

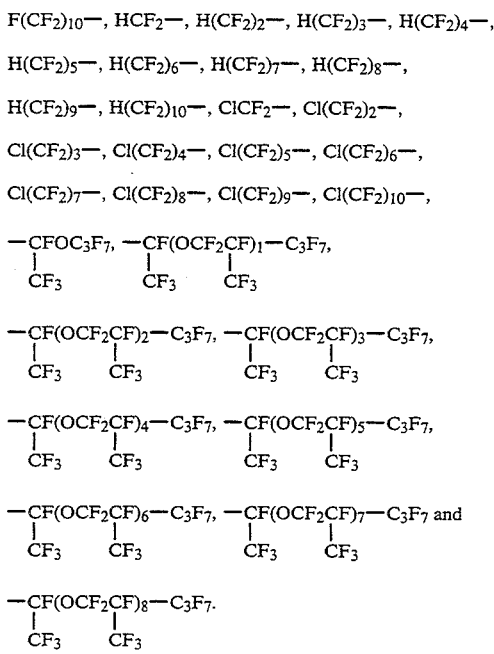

When n$_1$ and n$_2$ which are the numbers of carbon atoms in R$_F$ are more than 10 and 8 respectively, solubility of the polymer to solvents is decreased and the numbers outside of the specified ranges are not desirable.

Examples of the monomer having the formula (III):

$$CH_2=C(R^1)(R^2) \quad (III),$$

wherein R$^1$ is hydrogen atom, halogen atom or alkyl group having 1 to 5 carbon atoms, R$^2$ is hydrogen atom, halogen atom, cyano group, alkylsulfonic acid group having 1 to 4 carbon atoms, amidoalkylsulfonic acid group having 1 to 4 carbon atoms, —CO$_2$R$^5$, —OCOR$^6$, —OR$^7$,
—CO$_2$(CH$_2$CH(R$^8$)O)$_{m4}$—(CH$_2$CH(R$^9$)O)$_{m5}$[CH$_2$CH$_2$(CH$_2$)$_{m7}$O]$_{m6}$(R$^{10}$),

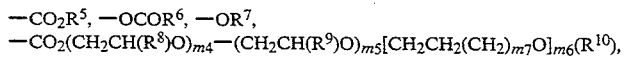

—CO$_2$CHCH$_3$OR$^{14}$ or
—CO$_2$(CH$_2$)$_r$—CHR$^{15}$CHR$^{16}$O[CO(CH$_2$)$_s$CHR$^{17}$(CH$_2$)$_t$CHR$^{18}$O]$_u$—H,

—CO$_2$R$^5$, —OCOR$^6$, —OR$^7$,
—CO$_2$(CH$_2$CH(R$^8$)O)$_{m4}$—
   —(CH$_2$CH(R$^9$)O)$_{m5}$[CH$_2$CH$_2$(CH$_2$)$_{m7}$O]$_{m6}$(R$^{10}$),

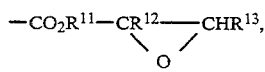

—CO$_2$CHCH$_3$OR$^{14}$ or
—CO$_2$(CH$_2$)$_r$—
   —CHR$^{15}$CHR$^{16}$O[CO(CH$_2$)$_s$CHR$^{17}$(CH$_2$)$_t$CHR$^{18}$O]$_u$—H,

R$^5$ is hydrogen atom, alkyl group having 1 to 18 carbon atoms or hydroxyalkyl group having 3 to 6 carbon atoms, R$^6$ and R$^7$ are the same or different atoms or groups respectively selected from the group consisting of hydrogen atom, alkyl group having 1 to 18 carbon atoms and hydroxyalkyl group having 1 to 4 carbon atoms, R$^8$, R$^9$ and R$^{10}$ are the same or different groups respectively selected from the group consisting of hydrogen atom and methyl group, R$^{11}$ is alkylene group having 1 to 10 carbon atoms or —(CH$_2$CH$_2$O)$_p$CH$_2$—, R$^{12}$ and R$^{13}$ are the same or different atoms or groups respectively selected from the group consisting of hydrogen atom and alkyl group having 1 to 18 carbon atoms, R$^{14}$ is alkyl group having 1 to 18 carbon atoms, m$_4$ is an integer of 1 to 20, m$_5$ and m$_6$ are respectively an integer of 0 to 20, m$_7$ is 1 or 2, m$_8$ is an integer of 0 to 5, p is an integer of 1 to 10, R$^{15}$, R$^{16}$, R$^{17}$ and R$^{18}$ are the same or different atoms or groups respectively selected from the group consisting of hydrogen atom and methyl group, r is an integer of 0 to 2, s and t are respectively an integer of 0 to 3 and u is an integer of 1 to 5, which is comprised in the polymer comprising fluoroalkyl group having the formula (I):

$$R_F-(CH_2C(R^1)(R^2))_{\overline{m1}}(CH_2C(R^3)(R^4))_{\overline{m2}}(CH_2C(Z^1))_{\overline{m3}}R_F \quad (I)$$
$$[CO_2(CH_2)_3]_{\overline{m9}}Si(Z^2)_2(Z^3)$$

are: vinyl chloride, vinylidene chloride, vinyl fluoride, vinylidene fluoride, acrylonitrile, vinyl acetate, vinyl propionate, vinyl butyrate, (meth)acrylic acid, methyl (meth)acrylate, t-butyl (meth)acrylate, n-butyl (meth)acrylate, 2-ethylhexyl (meth)acrylate, 2-hydroxyethyl (meth)acrylate, 2-hydroxypropyl (meth)acrylate,

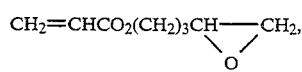
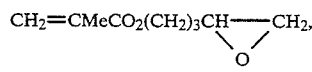
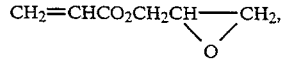
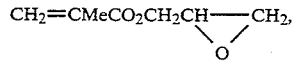

-continued

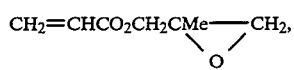

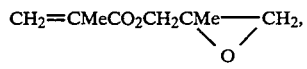

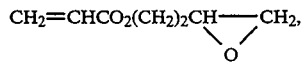

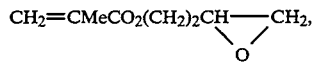

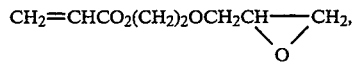

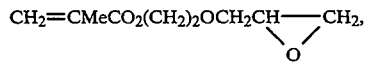

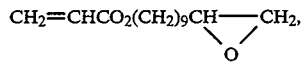

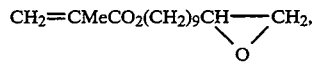

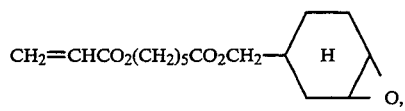

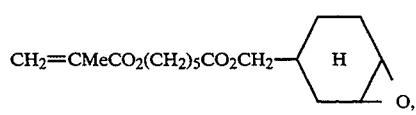

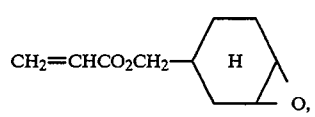

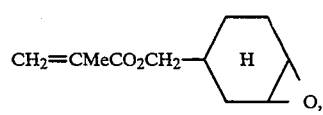

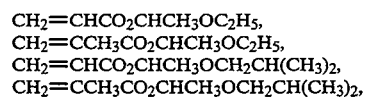

CH$_2$=CHCO$_2$CHCH$_3$OC$_2$H$_5$,
CH$_2$=CCH$_3$CO$_2$CHCH$_3$OC$_2$H$_5$,
CH$_2$=CHCO$_2$CHCH$_3$OCH$_2$CH(CH$_3$)$_2$,
CH$_2$=CCH$_3$CO$_2$CHCH$_3$OCH$_2$CH(CH$_3$)$_2$,

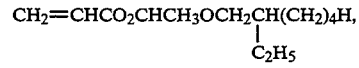

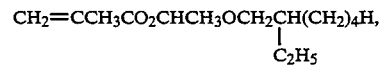

CH$_2$=CHCO$_2$CH$_2$CH$_2$O[CO(CH$_2$)$_5$O]$_{q1}$H,
CH$_2$=CMeCO$_2$CH$_2$CH$_2$O[CO(CH$_2$)$_5$O]$_{q1}$H,
CH$_2$=CCH$_3$CO$_2$(CH$_2$CH$_2$O)$_{q2}$H (q2 ≠ 1),
CH$_2$=CCH$_3$CO$_2$(CH$_2$CH$_2$O)$_{q2}$CH$_3$,

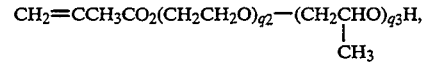

-continued

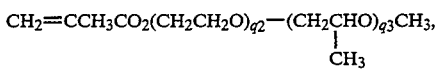

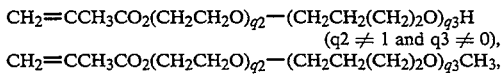

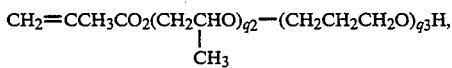

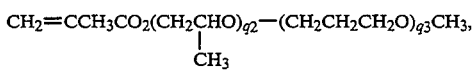

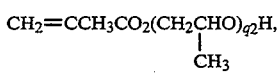

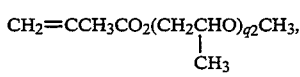

CH$_2$=CHCO$_2$(CH$_2$CH$_2$O)$_{q2}$H (q2 ≠ 1),
CH$_2$=CHCO$_2$(CH$_2$CH$_2$O)$_{q2}$CH$_3$,

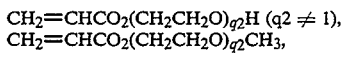

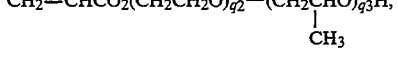

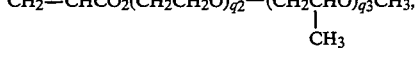

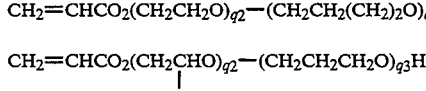

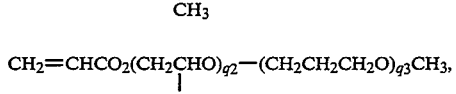

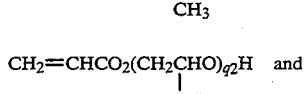

In the formulae describes above, q$_1$ is an integer of 1 to 10, q$_2$ is an integer of 1 to 20 and q$_3$ is an integer of 0 to 20. The group may be comprised as a single kind or as a combination of groups having different values of q$_1$, q$_2$ and q$_3$.

Examples of the silicon monomer having the formula (IV):

$$CH_2=C(Z^1)[CO_2(CH_2)_3]_{m9}-Si(Z^2)_2(Z^3) \qquad (IV),$$

wherein Z$^1$ is hydrogen atom or methyl group, Z$^2$ and Z$^3$ are groups having 1 to 10 carbon atoms respectively selected from the group consisting of alkyl group, alkoxy group and alkylcarbonyloxy group, m$_9$ is 0 or 1 and Z$^1$ is hydrogen atom when m$_9$=0, which is comprised in the polymer comprising fluoroalkyl group having the formula (I) are; trimethoxyvinylsilane, triethoxyvinylsilane, diacetyloxymethylvinylsilane, diethoxymethylvinylsilane, triacetyloxyvinylsilane, triisopropoxyvinylsilane, trimethylvinylsilane, tri-t-butoxyvinylsilane, ethoxydiethylvinylsilane, diethylmethylvinylsilane, 3-methacryloxypropyltrimethoxysilane, 3-methacryloxypropyltriethoxysilane, 3-methacryloxypropyldiacetyloxymethylsilane, 3-methacryloxypropyldiethoxymethylsilane, 3-methacryloxypropyltriacetyloxysilane, 3-methacryloxypropyltriisopropoxysilane, 3-methacryloxypropyltrimethylsilane, 3-methacryloxylpropyltri-t-butyoxysilane, 3-methacryloxylpropylethoxydiethylsilane, 3-methacryloxypropyldiethylmethylsilane, 3-acryloxypropyltrimethoxysilane, 3-acryloxypropyltriethoxysilane, 3-acryloxypropyldiacetyloxymethylsilane, 3-acryloxypropyldiethoxymethylsilane, 3-acryloxypropyltriacetyloxysilane, 3-acryloxypropyltriisopropoxysilane, 3-acryloxypropyltrimethylsilane, 3-acryloxypropyltri-t-butoxysilane, 3-acryloxypropylethoxydiethylsilane, 3-acryloxypropyldiethylmethylsilane and the like.

In the polymer comprising fluoroalkyl group having the formula (I), $m_1$ is an integer of 1 to 1000 and $m_2$ is an integer of 0 to 3000. When $m_1$ is larger than 1000 or $m_2$ is larger than 3000, preparation of the polymer is difficult. Number average molecular weight of the polymer comprising fluoroalkyl group having the formula (I) is in the range from 500 to 1000000 and preferably in the range from 500 to 10000 for sufficiently exhibiting the favorable properties of the fluoroalkyl group. Preparation of the polymer is difficult either when the number average molecular weight is lower than 500 or when it is higher than 1000000.

In one of the the present inventions, a specific difluoroalkanoyl peroxide and a specific monomer are used for the reaction of the preparation of the polymer comprising fluoroalkyl group.

The difluoroalkanoyl peroxide utilized in the invention is a compound having the formula (II) described above. When $n_1$ is larger than 11 or $n_2$ is larger than 9 in the difluoroalkanoyl peroxide having the formula (II), solubility of the difluoroalkanoyl peroxide in solvents is decreased and cannot be utilized for the reaction in solution.

The group $R_F$ in the difluoroalkanoyl peroxide having the formula (II) is the same as that described in the polymer having the formula (I). Preferable examples of the difluoroalkanoyl peroxide are diperfluoro-2-methyl-3-oxahexanoyl peroxide, diperfluoro-2,5-dimethyl-3,6-dioxanonanoyl peroxide, diperfluoro-2,5,8-trimethyl-3,6,9-trioxadodecanoyl peroxide, diperfluorobutyryl peroxide, diperfluoroheptanoyl peroxide and the like.

In the reaction of the difluoroalkanoyl peroxide and the monomer having the formula (III) and/or the monomer having the formula (IV), mol ratio of the monomer having the formula (III) and the monomer having the formula (IV) is not particularly limited but preferably in the range from 1:0.01 to 1:100. Mol ratio of the difluoroalkanoyl peroxide and the monomer having the formula (II) or the monomer having the formula (IV) in the reaction between them is preferably in the range from 1:0.1 to 1:5000 and more preferably in the range from 1:0.5 to 1:1000. When the mol ratio is less than 0.1, products of self-decomposition of the peroxide are formed in large amounts and, when the mol ratio is more than 5000, yield of the desired polymer comprising fluoroalkyl group is decreased. Thus, mol ratios outside of the specified range are not advantageous. The molecular weight of the prepared polymer can be adjusted by varying the mol ratio of the difluoroalkanoyl peroxide to the other monomers. The molecular weight of the polymer prepared is adjusted to a lower value by making the mol ratio higher and to a higher value by making the mol ratio lower. The reaction can be performed at the atmospheric pressure. Temperature of the reaction is generally in the range from −20° to 150° C. and preferably in the range from 0° to 100° C. When the temperature is lower than −20° C., the reaction takes too long time and when the temperature is higher than 150° C., pressure during the reaction becomes too high and operation of the reaction becomes difficult. Time of the reaction is generally in the range from 30 minutes to 20 hours and it is practically preferred that conditions of the reaction is adjusted so that the time of reaction is within the range from 1 to 10 hours.

In the method of preparation of the invention, the desired polymer comprising fluoroalkyl group can be obtained by the direct one step reaction of the fluoroalkanoyl peroxide and the other monomers and it is preferred that a solvent is utilized for the reaction to make handling of the fluoroalkanoyl peroxide easier and to make the reaction proceed smoothly. As the solvent, halogenated aliphatic solvents are preferred. Examples of such solvent are: methylene chloride, chloroform, 2-chloro-1,2-dibromo-1,1,2-trifluoroethane, 1,2-dibromohexafluoropropane, 1,2-dibromotetrafluoroethane, 1,1-difluorotetrachloroethane, 1,2-difluorotetrachloroethane, fluorotrichloromethane, heptafluoro-2,3,3-trichlorobutane, 1,1,1,3-tetrachlorotetrafluoropropane, 1,1,1-trichloropentafluoropropane, 1,1,2-trichlorotrifluoroethane, 1,1,1,2,2-pentafluoro-3,3-dichloropropane, 1,1,2,2,3-pentafluoro-1,3-dichloropropane and the like. Preferable examples of the solvent for industrial practice are 1,1,2-trichlorotrifluoroethane, 1,1,1,2,2-pentafluoro-3,3-dichloropropane and 1,1,2,2,3-pentafluoro-1,3-dichloropropane. It is preferred that the amount of the solvent is adjusted so that the concentration of the fluoroalkanoyl peroxide in the solvent is in the range from 0.1 to 30 weight %.

Th polymer comprising fluoroalkyl group having the formula (I) can be obtained by the method of preparation described above. The polymer comprising fluoroalkyl group thus prepared may comprise a polymer which comprises the $R_F$ group only at one of the ends of the molecule.

The reaction product obtained by the method of the invention can be purified by generally known methods, such as distillation, reprecipitation, column chromatography and the like.

The surface active agent comprising fluoroalkyl group of the invention has the formula (V):

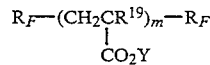

wherein $R_F$ is $-(CH_2)_{n1}X$ or

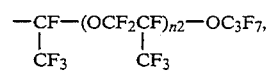

Y is hydrogen atom, sodium atom, potassium atom or ammonium group, preferably hydrogen atom, sodium atom and potassium atom, $n_1$ is an integer of 1 to 10, preferably an integer of 3 to 8, X is fluorine atom, chlorine atom or hydrogen atom, preferably fluorine atom, $n_2$ is an integer of 0 to 8, preferably an integer of 0 to 5, and m is an integer of 1 to 250. The surface agent comprising fluoroalkyl group described above may contain a polymer which comprises the $R_F$ group only at one of the ends of the molecule.

Number average molecular weight of the surface active agent comprising fluoroalkyl group is in the range from 500 to 50000 and preferably in the range from 800 to 20000.

In the surface active agent comprising fluoroalkyl group having the formula (V), a fluoroalkyl group $R_F$ can be selected and utilized from the examples of the fluoroalkyl group $R_F$ described in the formula (I).

As the monomer constituting the surface active agent comprising fluoroalkyl group having the formula (V), acrylic acid or methacrylic acid can be utilized.

The surface active agent comprising fluoroalkyl group having the formula (V) can be prepared by the reaction of acrylic acid or methacrylic acid with the fluoroalkanoyl peroxide having the formula (II):

wherein $R_F$ is $-(CF_2)_{n1}X$ or

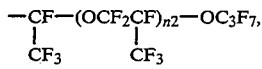

$n_1$ is an integer of 1 to 10, X is fluorine atom, chlorine atom or hydrogen atom and $n_2$ is an integer of 0 to 8. The surface active agent comprising fluoroalkyl group having the formula (V) in which Y is sodium atom, potassium atom or ammonium group can be prepared by the reaction of sodium hydroxide, potassium hydroxide or ammonium hydroxide with a carboxylic acid in which the corresponding group Y is hydrogen atom.

The surface active agent comprising fluoroalkyl group of the invention can be easily prepared by adding the surface active agent comprising fluoroalkyl group having the formula (V) to water, an organic solvent miscible with water such as a alcohol or a mixture of water and the organic solvent miscible with water, followed by stirring or ultrasonic treatment of the mixture. Other surface active agents may be additionally utilized in the preparation described above. Temperature of the preparation is preferably in the range from 5° to 50° C. Amount of the surface active agent comprising fluoroalkyl group is preferably in the range from $10^2$ to $10^{-15}$ g/L based on the amount of the solvent.

The surface treatment agent of the invention has the formula (VI):

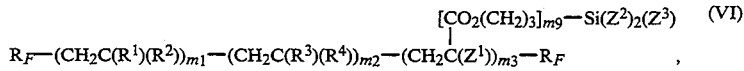

wherein $Z^1$ is hydrogen atom or methyl group; $Z^2$ and $Z^3$ are the same or different groups having 1 to 10 carbon atoms respectively selected from the group consisting of alkyl group, alkoxy group and alkylcarbonyloxy group, preferably from the group consisting of alkoxy group and alkylcarbonyloxy group having 1 to 10 carbon atoms, more preferably from the group consisting of alkoxy group and alkylcarbonyloxy group having 1 to 6 carbon atoms; $R^1$ and $R^3$ are the same or different atoms or groups respectively selected from the group consisting of hydrogen atom, halogen atom and alkyl group having 1 to 5 carbon atoms, preferably from the group consisting of hydrogen atom and methyl group; $R^2$ and $R^4$ are the same or different atoms or groups respectively selected from the group consisting of hydrogen atom, halogen atom, cyano group, alkylsulfonic acid group having 1 to 4 carbon atoms, amidoalkylsulfonic acid group having 1 to 4 carbon atoms,

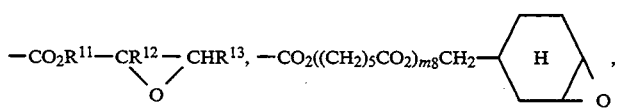

preferably one of the atoms and the groups described above excluding cyano group, alkylsulfonic acid group having 1 to 4 carbon atoms and amidoalkylsulfonic acid group having 1 to 4 carbon atoms; $R_F$ is $-(CF_2)_{n1}X$ or

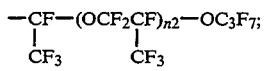

$m_1$ is an integer of 1 to 1000, preferably of 1 to 500; $m_2$ and $m_3$ are respectively an integer of 0 to 3000, preferably of 0 to 1000; $R^5$ is hydrogen atom, alkyl group having 1 to 18 carbon atoms or hydroxyalkyl group having 3 to 6 carbon atoms, preferably hydrogen atom, alkyl group having 1 to 8 carbon atoms or hydroxyalkyl group having 3 or 4 carbon atoms; $R^6$ and $R^7$ are the same or different atoms or groups respectively selected from the group consisting of hydrogen atom, alkyl group having 1 to 18 carbon atoms and hydroxyalkyl group having 1 to 4 carbon atoms, preferably from the group consisting of hydrogen atom, alkyl group having 1 to 8 carbon atoms and hydroxyalkyl group having 1 to 4 carbon atoms; $R^8$, $R^9$ and $R^{10}$ are the same or different groups respectively selected from the group consisting of hydrogen atom and methyl group; $R^{11}$ is alkylene group having 1 to 10 carbon atoms or $-(CH_2CH_2O)_pCH_2-$, preferably alkylene group having 1 to 5 carbon atoms or $-(CH_2CH_2O)_pCH_2-$; $R^{12}$ and $R^{13}$ are the same or different atoms or groups respectively selected from the group consisting of hydrogen atom and alkyl group having 1 to 18 carbon atoms, preferably from the group consisting of hydrogen atom and alkyl group having 1 to 8 carbon atoms; $R^{14}$ is alkyl group having 1 to 18 carbon atoms, preferably alkyl group having 1 to 8 carbon atoms; $m_4$ is an integer of 1 to 20, preferably of 1 to 10; $m_5$ and $m_6$ are respectively an integer of 0 to 20, preferably of 0 to 10, respectively; $m_7$ is 1 or 2; $m_8$ is an integer of 0 to 5, preferably of 1 to 2; p is an integer of 1 to 10, preferably of 1 to 5; $R^{15}$, $R^{16}$, $R^{17}$ and $R^{18}$ are the same or different atoms or groups selected from the group consisting of hydrogen atom and methyl group; r is an integer of 0 to 2; s and t are respectively an integer of 0 to 3; u is an integer of 1 to 5; $n_1$ is an integer of 1 to 10, preferably of 3 to 8; X is fluorine atom, chlorine atom or hydrogen atom, preferably fluorine atom; $n_2$ is an integer of 0 to 8, preferably of 0 to 5; $m_9$ is 0 or 1 and $Z^1$ is hydrogen atom when $m_9=0$. The surface treatment agent comprising fluoroalkyl group described above may comprise a polymer which comprise the $R_F$ group only at one of the ends of the molecule.

Average molecular weight of the polymer comprising fluoroalkyl group which is the effective component of the surface treatment agent of the invention is in the range from 500 to 1000000 and preferably in the range from 500 to 100000. The polymer comprising fluoroalkyl group can be prepared by the same method as that of the compound having the formula (I).

The hydrolytic condensate of the polymer comprising fluoroalkyl group which is also the effective component of the invention can be prepared generally by dissolving the polymer comprising fluoroalkyl group into a mixed solvent of water and an alkyl alcohol or a mixed solvent of water, an alkyl alcohol and a fluorochlorohydrocarbon or a fluoroaromatic hydrocarbon. Examples of the fluorochlorohydrocarbon solvent are 1,1,2-trichlorotrifluoroethane, 1,2-difluorotetrachloroethane and the like. Examples of the fluoroaromatic hydrocarbon solvent are benzotrifluoride, hexafluoroxylene and the like. Examples of the alkyl alcohol solvent are ethanol, isopropanol, butanol and the like. Ratio of mixing of the solvents is suitably selected so that the mixed solvent formed dissolves the polymer comprising fluoroalkyl group utilized for the condensation. Amount of water in the mixed solvent is preferably in the range from 1 to 30% based on the amount of the mixed solvent excluding the amount of water. Temperature of the condensation is in the range from the room temperature to 200° C. and time of the condensation is in the range from 30 minutes to 24 hours.

The surface treatment agent comprising the polymer comprising fluoroalkyl group as the effective component of the invention is utilized by dissolving into a general use organic solvent. Other ingredients, such as surface active agents, levelling agents and the like, may added to the solution. Concentration of the surface treatment agent comprising fluoroalkyl group during the surface treatment is preferably in the range from 0.005 to 20%. When the concentration is less than 0.005%, the water repellency and the oil repellency are decreased because of too thin layer of the agent. When the concentration is more than 20%, the water repellency and the oil repellency are not enhanced to the degree expect from the amount utilized and furthermore problems arise such as deteriorated uniformity of the layer and increase of separation of the layer.

As the method of application of the surface treatment agent, generally utilized methods, such as coating by brushes, spray coating, roll coating, spin coating, dip coating and the like, can be adopted.

The coating layer can be formed at the room temperature. However, the temperature of the application may be varied for the purpose of adjusting the speed of the application. Thickness of the coating layer can be varied to a desired value by adjusting the concentration of the surface treatment agent comprising fluoroalkyl group in the solvent, the temperature of the treatment, the pull up speed in the dip coating method, the rotation speed in the spin coating method and the like conditions. The thickness can be varied in the range from the order of an angstrom to the order of ten micrometers.

The polymer comprising fluoroalkyl group utilized in the coating composition of the invention as the essential component thereof is a polymer comprising fluoroalkyl group prepared by the reaction of a specific difluoroalkanoyl peroxide and a specific monomer.

The specific difluoroalkanoyl peroxide utilized as the material for the polymer comprising fluoroalkyl group described above is the difluoroalkanoyl peroxide having the formula (II) described above.

The specific monomer is the monomer having the formula (VIII) and/or the monomer having the formula (IX) described above. These monomers may be utilized singly or as a combination of two or more kinds.

The polymer comprising fluoroalkyl group utilized in the coating composition of the invention as the essential component thereof can be prepared by the same method as that of the polymer comprising fluoroalkyl group having the formula (I) described above.

The polymer comprising fluoroalkyl group utilized in the coating composition of the invention as the essential component thereof comprises one or both of the monomer unit having the formula (X) and the monomer unit having the formula (XI) to form the backbone structure of the polymer and has the same group $R_F$ as that described for the difluoroalkanoyl peroxide at the ends of the polymer. The polymer comprising fluoroalkyl group described here may contain a polymer which comprises the $R_F$ group only at one of the ends of the molecule. In the description of $R_F$ in the above, X is preferably fluorine atom, $n_1$ is preferably an integer of 3 to 8 and $n_2$ is preferably an integer of 1 to 5.

One of the monomer units described above has the formula (X):

wherein $R^{20}$ is hydrogen atom, halogen atom, carboxylic acid group or alkyl group having 1 to 5 carbon atoms, preferably hydrogen atom, halogen atom or methyl group; $R^{21}$ is hydrogen atom, halogen atom, cyano group, carboxylic acid group, phenyl group, formyloxy group, hydroxyl group, alkyloxycarbonyl group having 1 to 20 carbon atoms, hydroxyalkyloxycarbonyl group having 1 to 4 carbon atoms, alkylcarbonyloxy group having 1 to 18 carbon atoms, hydroxyalkylcarbonyloxy group having 1 to 18 carbon atoms, alkyl ether group having 1 to 8 carbon atoms, alkylsulfonic acid group having 1 to 18 carbon atoms, amidoalkylsulfonic add group having 1 to 4 carbon atoms, hydroxyalkyl ether group having 1 to 18 carbon atoms,

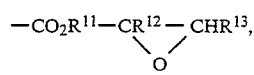

-continued

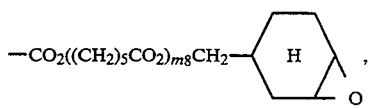

—CO$_2$CHCH$_3$OR$^{14}$ or
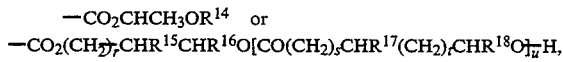

preferably one of the atoms and the groups described above excluding cyano group, phenyl group and amidoalkylsulfonic acid group having 1 to 4 carbon atoms; R$^{11}$ is alkylene group having 1 to 10 carbon atoms or —(CH$_2$CH$_2$O)$_p$CH$_2$—, preferably alkylene group having 1 to 5 carbon atoms or —(CH$_2$CH$_2$O)$_p$CH$_2$—; R$^{12}$ and R$^{13}$ are the same or different atoms or groups respectively selected from the group consisting of hydrogen atom and alkyl group having 1 to 18 carbon atoms, preferably hydrogen atom or alkyl group having 1 to 8 carbon atoms; R$^{14}$ is alkyl group having 1 to 18 carbon atoms, preferably alkyl group having 1 to 8 carbon atoms; m$_8$ is an integer of 0 to 5, preferably of 0 to 2; p is an integer of 1 to 10, preferably of 1 to 5; R$^{15}$, R$^{16}$, R$^{17}$ and R$^{18}$ are the same or different atoms or groups respectively selected from the group consisting of hydrogen atom and methyl group; r is an integer of 0 to 2; s and t are respectively an integer of 0 to 3 and u is an integer of 1 to 5.

The other of the monomer units described above has the formula (XI):

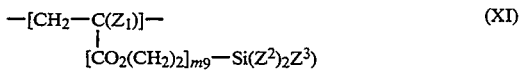

wherein Z$^1$ is hydrogen atom or methyl group; Z$^2$ and Z$^3$ are groups having 1 to 10 carbon atoms respectively selected from the group consisting of alkyl group, alkoxy group and alkylcarbonyloxy group, preferably alkoxy group having 1 to 10 carbon atoms or alkylcarbonyl group having 1 to 10 carbon atoms respectively, more preferably alkoxy group having 1 to 6 carbon atoms or alkylcarbonyl group having 1 to 6 carbon atoms respectively; m$_9$ is 0 or 1 and Z$^1$ is hydrogen atom when m$_9$=0.

Number average molecular weight of the polymer comprising the monomer unit having the formula (X) and/or the monomer unit having the formula (XI) as the repeating units is in the range from 500 to 1000000 and preferably in the range from 500 to 100000. When the number average molecular weight of the polymer is outside of the specified range, the excellent properties arising from the fluoroalkyl group are less readily exhibited in the coating composition.

In the coating composition of the invention, the polymer comprising fluoroalkyl group described above which is the essential component of the coating composition can be utilized singly as the polymer component of the coating composition. However, other binder polymers may also be comprised in the polymer component of the coating composition together with the polymer described above. Kind of the other binder polymer is not particularly limited so long as it is a binder polymer generally utilized for coating materials. Preferable examples of the other binder polymer are acrylic resins, polyester resins, alkyd resins, silicone resins, fluororesins, epoxy resins, vinyl chloride resins, cellulosic resins, phenol resins, xylene resins, toluene resins, amino resins, polyisocyanate compounds, blocked isocyanate compounds and the like. Commercial products may be utilized. The other binder polymer may be utilized singly or as a combination of two or more kinds.

Amount of the polymer comprising fluoroalkyl group utilized in the coating composition of the invention as the essential component thereof is in the range from 0.01 to 100 weight % and preferably in the range from 0.05 to 20 weight % based on the total of the polymer components. When the amount is less than 0.01 weight %, the water repellency and the oil repellency of the coating is insufficient and the resistance against fouling of the coating is decreased.

The coating composition of the invention may comprise the polymer components described above alone or may additionally comprise generally utilized auxiliary agents and additives, such as pigments, dyestuffs, dispersants, cure acceralators, levelling agents and the like.

The coating composition of the invention may comprise the polymer components described above alone or may also comprise a solvent for dissolving and diluting the polymer components. Preferable examples of such solvent are aromatic hydrocarbon solvents, such as toluene, xylene, Solvesso #100 ® (a product of Exxon Kagaku Co., Ltd.) and the like, aromatic hydrocarbon solvents containing fluorine, such as benzotrifluoride, hexafluoroxylene, hexafluorobenzene and the like; ester solvents, such as ethyl acetate, butyl acetate, ethylene glycol monoethyl ether acetate, propylene glycol monomethyl ether acetate and the like, ketone solvents, such as methyl isobutyl ketone, methyl amyl ketone and the like, alcohol solvents, such as butyl alcohol, amyl alcohol and the like, ether alcohol solvents, such as ethylene glycol monobutyl ether and the like, and the like solvents.

The coating composition of the invention can be applied to substrates by generally known methods, such as spray coating, coating with brushes and the like. The coated composition can be cured at the temperature in the range from the room temperature to 200° C.

Examples of the polymers comprising fluoroalkyl group having the formulae (I), (V) and (VI) and polymers comprising fluoroalkyl group described in the coating composition of the invention are shown in the following:

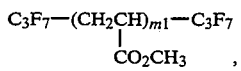

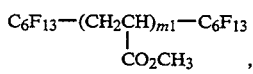

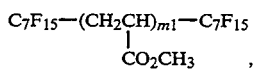

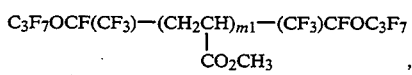

-continued
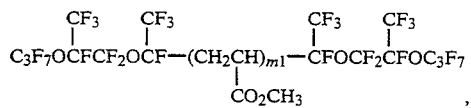
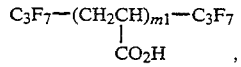
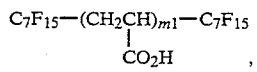
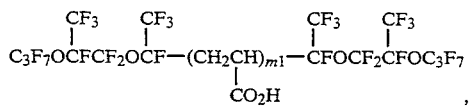
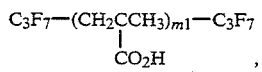
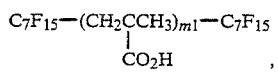
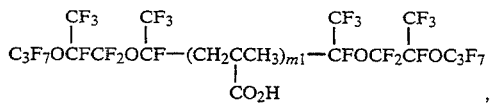
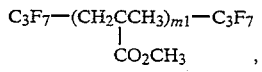
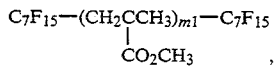
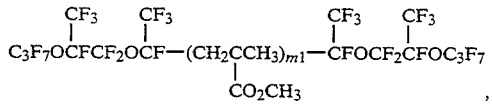
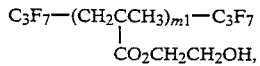
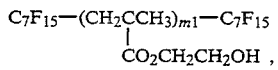
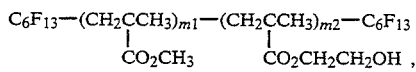
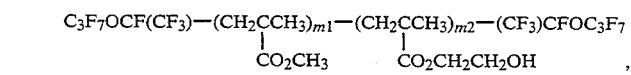
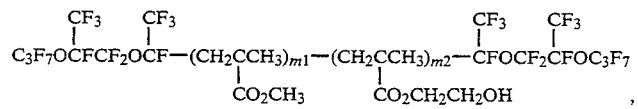
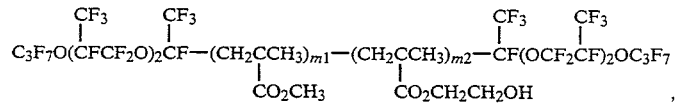
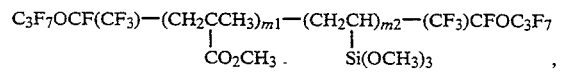
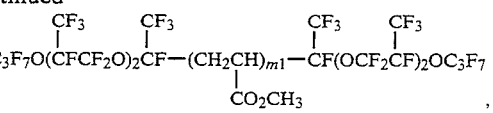
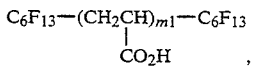
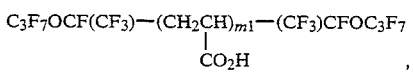
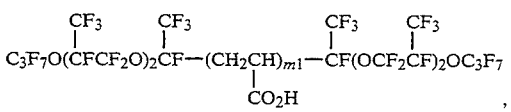
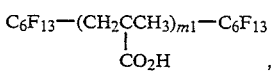
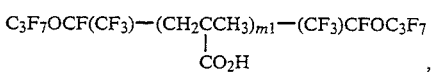
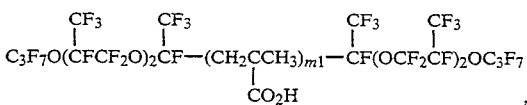
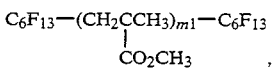
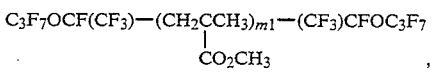
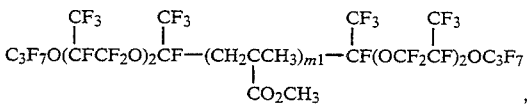
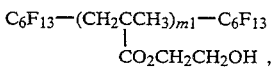
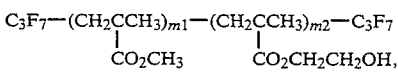
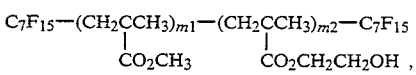

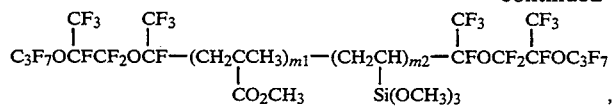
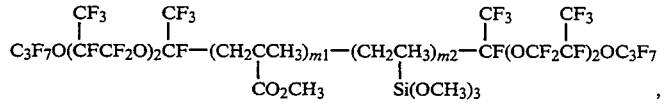
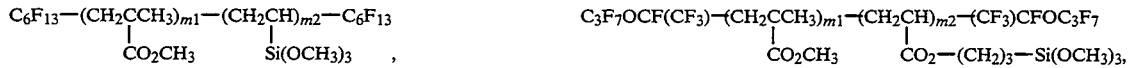
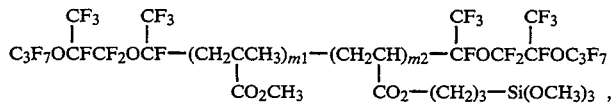
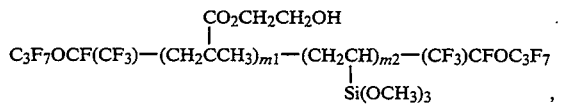
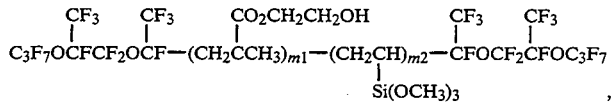
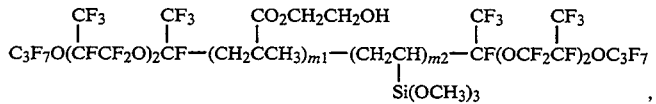
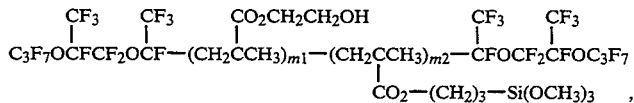
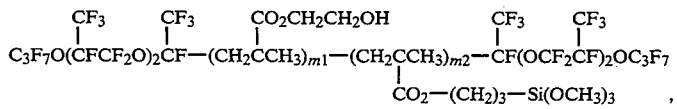
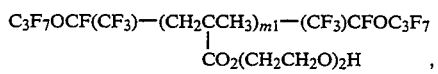
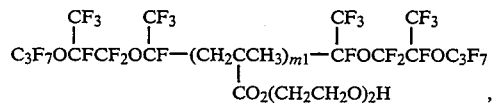
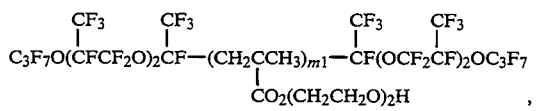
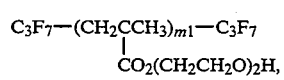
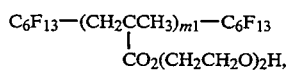
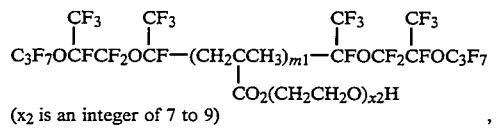
($x_2$ is an integer of 7 to 9)
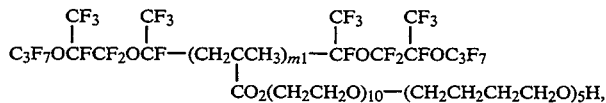
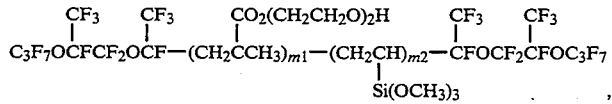

-continued $$C_3F_7O(CFCF_2O)_2CF\underset{CF_3}{|}-(CH_2CCH_3)_{m1}\underset{CO_2(CH_2CH_2O)_2H}{|}-(CH_2CH)_{m2}\underset{Si(OCH_3)_3}{|}-CF\underset{CF_3}{|}(OCF_2CF)_2OC_3F_7\underset{CF_3}{|}$$

$$C_3F_7OCFCF_2OCF\underset{CF_3}{|}-(CH_2CCH_3)_{m1}\underset{CO_2(CH_2CH_2O)_2H}{|}-(CH_2CCH_3)_{m2}\underset{CO_2(CH_2)_3Si(OCH_3)_3}{|}-CFOCF_2CFOC_3F_7\underset{CF_3}{|}\underset{CF_3}{|}$$

$$C_3F_7-(CH_2CCH_3)_{m1}\underset{CO_2(CH_2CH_2O)_{x2}H}{|}-C_3F_7$$
($x_2$ is an integer of 7 to 9), $$C_6F_{13}-(CH_2CCH_3)_{m1}\underset{CO_2(CH_2CH_2O)_{x2}H}{|}-C_6F_{13}$$

$$C_3F_7OCFCF_2OCF\underset{CF_3}{|}-(CH_2CCH_3)_{m2}\underset{CO_2CH_2CHCH_2}{|}-CFOCF_2CFOC_3F_7\underset{CF_3}{|}\underset{CF_3}{|}$$
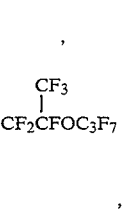

$$C_3F_7OCF(CF_3)-(CH_2CCH_3)_{m2}\underset{CO_2CH_2CH_2OCH_2CHCH_2}{|}-(CF_3)CFOC_3F_7$$

$$C_3F_7OCF(CF_3)-(CH_2CCH_3)_{m1}\underset{CO_2(CH_2)_4H}{|}-(CH_2CCH_3)_{m2}\underset{CO_2CH_2CHCH_2}{|}-(CF_3)CFOC_3F_7$$

$$C_3F_7OCFCF_2OCF\underset{CF_3}{|}-(CH_2CCH_3)_{m1}\underset{CO_2(CH_2)_3CH_3}{|}-(CH_2CCH_3)_{m2}\underset{CO_2CH_2CHCH_2}{|}-CFOCF_2CFOC_3F_7\underset{CF_3}{|}\underset{CF_3}{|}$$

$$C_3F_7OCFCF_2OCF\underset{CF_3}{|}-(CH_2CCH_3)_{m1}\underset{CO_2CH_2CH(CH_2)_4H}{\overset{CH_2CH_3}{|}}-(CH_2CCH_3)_{m2}\underset{CO_2CH_2CHCH_2}{|}-CFOCF_2CFOC_3F_7\underset{CF_3}{|}\underset{CF_3}{|}$$

$$C_3F_7OCF(CF_3)-(CH_2CCH_3)_{m1}\underset{CO_2CH_2-\text{cyclohexene oxide}}{\overset{CO_2(CH_2)_3CH_3}{|}}-(CH_2CCH_3)_{m2}-(CF_3)CFOC_3F_7$$

$$C_3F_7OCF(CF_3)-(CH_2CCH_3)_{m1}\underset{CO_2(CH_2)_5CO_2CH_2-\text{cyclohexene oxide}}{\overset{CH_2CH_3}{\overset{|}{CO_2CH_2CH(CH_2)_4H}}}-(CH_2CCH_3)_{m2}-(CF_3)CFOC_3F_7$$

$$C_3F_7OCF(CF_3)-(CH_2CH)_{m1}\underset{CO_2CH_2CHCH_2}{\overset{Si(OCH_3)_3}{|}}-(CH_2CCH_3)_{m2}-(CF_3)CFOC_3F_7$$

$$C_3F_7OCF(CF_3)-(CH_2CCH_3)_{m1}\underset{CO_2CH_2CHCH_2}{\overset{CO_2(CH_2)_3Si(OCH_3)_3}{|}}-(CH_2CCH_3)_{m2}-(CF_3)CFOC_3F_7$$

,

-continued
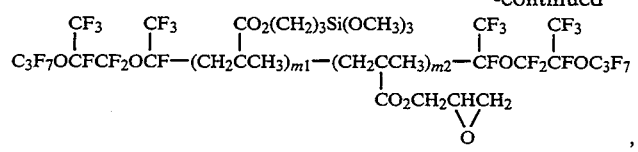
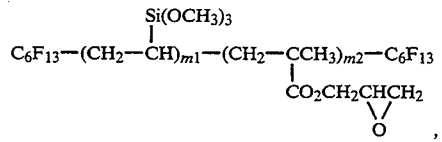
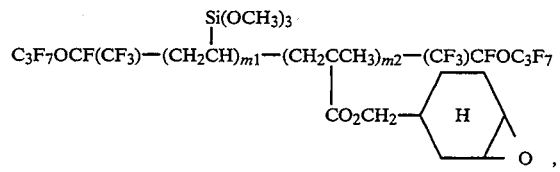
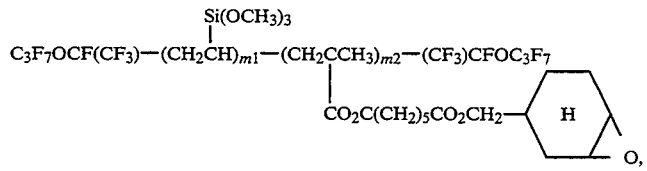
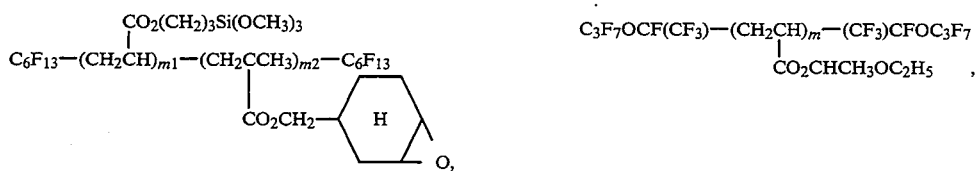
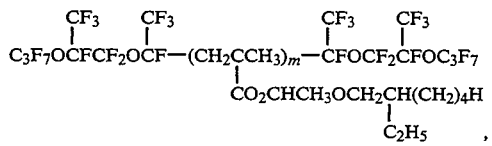
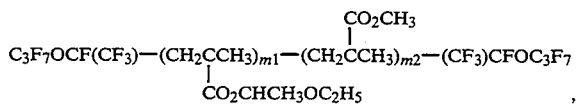
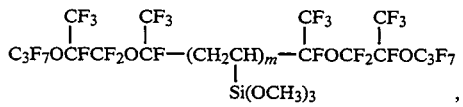
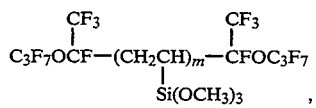
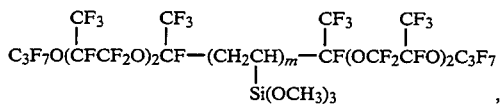
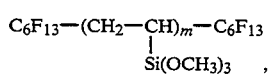
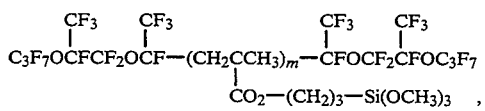
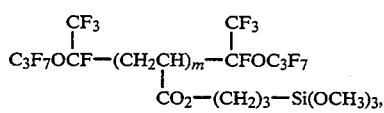
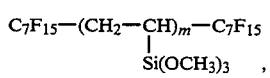
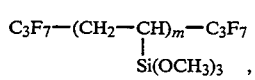
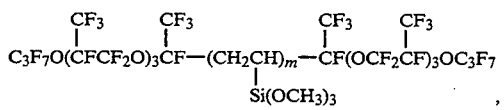
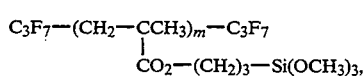
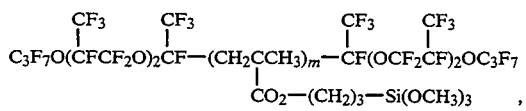

-continued

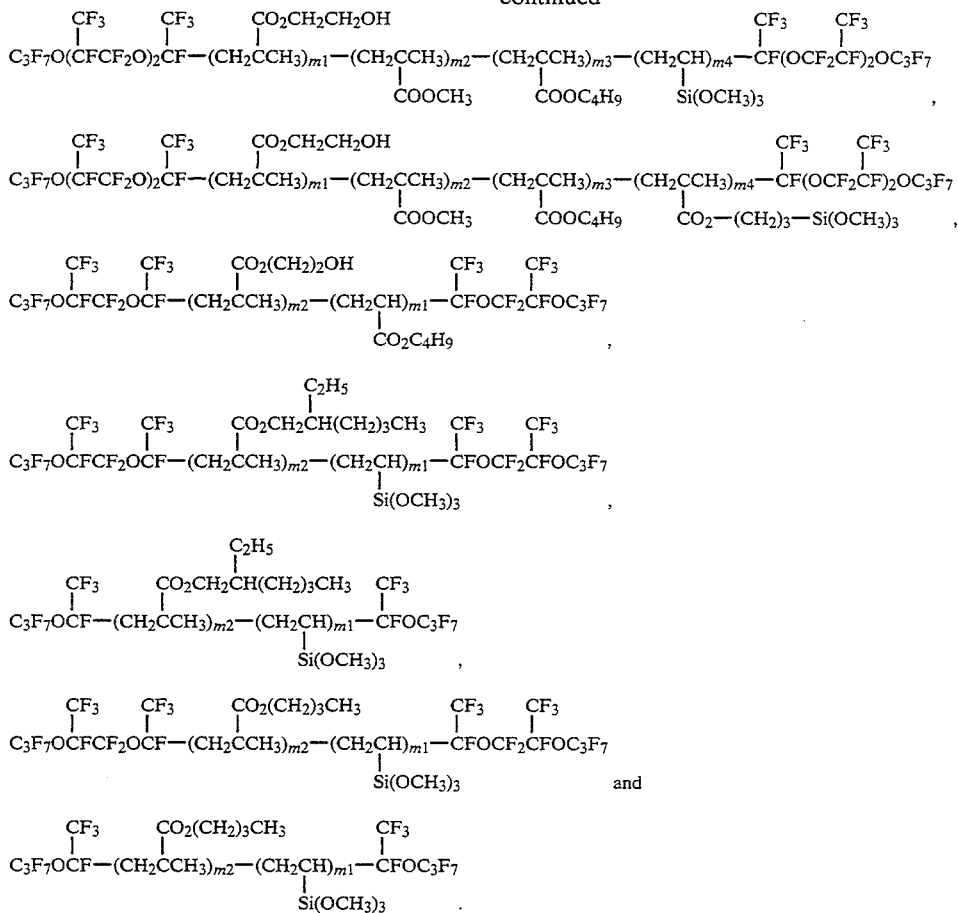

The polymer comprising fluoroalkyl group of the invention is a novel compound and, because the fluoroalkyl group is introduced directly through carbon-carbon linkage rather than through ester linkage, the advantageous properties arising from the fluoroalkyl group can be retained for a long period of time. The compound also has excellent weatherability. Thus, because the compound has excellent properties such as low surface tension, low light refractivity, heat resistance, cold resistance, oil resistance, electric insulation, water repellency resistance against chemicals and the like, it is useful as a surface treatment agent to provide surfaces with water repellency, oil repellency and resistance against fouling, as a surface material of coating, optical lenses, lenses of spectacles, glass instruments, biological materials and the like and as a material of drugs and agricultural chemicals. The polymer comprising fluoroalkyl group also comprises a functional group, such as silyl group, hydroxyl group, epoxy group or carboxyl group and is particularly effective for forming improved cured structure and enhancing adhesion to substrates. According to the method of preparation of the invention, the polymer comprising fluoroalkyl group can be prepared easily with a high yield in a short time in a single step reaction without using reaction catalyst or any specific apparatus.

The surface active agent of the invention exhibits high surface activity of the same degree as that of conventional carboxylic acids comprising fluoroalkyl group such as perfluorooctanoic acid. Thus, it is advantageously utilized as a vesicle agent having high stability, a medical material, an oxygen enriching membrane, an additive to lubricants, a levelling agent of coating materials and inks, a paint remover, a resist remover, a foaming agent for washing, a surface modifier for fluororesins and the like.

The surface treatment agent comprising fluoroalkyl group of the invention has excellent properties arisen from the fluoroalkyl group comprised in the agent, such as water repellency, oil repellency, low adhesion at the surface, lubricating property of the surface and the like. It can be advantageously utilized in a wide range of applications, such as surface treatment of fabrics, clothings, furnitures, covering cloths, rugs, paper bags, containers of thick paper, trunks, handbags, shoes, jackets, rain coats, tents, carpets, wall plates of wood or asbestos, bricks, concrete, tiles for floor or wall, glass, stone, wood, plaster, wall paper, materials for exterior walls, materials for bathroom wall; surface treatment of coated or uncoated surface of metals such as apparatuses and automobile bodies; releasing agent for plastics, such as polyester resins, urethane resins, ABS resins, vinyl chloride resins, epoxy resins, phenol resins and the like by taking advantage of the low adhesion at the surface and the good releasing property from metal substrates like iron, stainless steel, duralmine and the like; an agent for preventing ice formation of airplanes and the like; an agent for preventing burning at frying pans; a lubricant for solid surfaces of magnetic materials in floppy disks, hard disks and the like; and like other applications. It can be advantageously utilized for applications to provide water repellency, oil repellency, resistance against fouling, adhesion free property, lubricating property and the like.

When the surface treatment agent of the invention comprises the compound comprising fluoroalkyl group and alkylene oxide group or fluoroalkyl group, hydroxyl group, carboxyl group and alkylene oxide group as the effective components thereof, it is useful as a amphiphillic material having both the water repellency and the hydrophillic property and can be applied as an antifogging agent and an SR treatment agent which exhibits the water repellency and the oil repellency in air and hydrophillic property in water. Particularly, the surface treatment agent of the invention has excellent adhesion to substrates.

The coating material of the invention contains the polymer comprising fluoroalkyl group as the essential polymer component thereof and has excellent water repellency, oil repellency and resistance against fouling of coating. In the polymer comprising fluoroalkyl group described above, the fluoroalkyl group is introduced into the polymer through carbon-carbon linkage and is not removed by hydrolysis, leading to retention of the advantageous property for a long period of time. The polymer comprising fluoroalkyl group also contains another functional group such as silyl group, hydroxyl group, epoxy group and carboxylic acid group and is particularly effective for forming improved cured structure and enhancing adhesion to substrates. The coating material of the invention is advantageously applied to coating of outer panels of automobiles, electric home appliances, furnitures, exterior panels of buildings and the like and as a material for water soluble coating materials and powder coating materials.

DESCRIPTION OF THE PREFERRED EMBODIMENTS

The invention will be understood more readily with reference to the following examples; however, these examples are intended to illustrate the invention and are not to be construed to limit the scope of the invention.

Example 1

To 30.0 g (300 mmol) of methyl methacrylate, 150 g of a solution of 1,1,2-trichlorotrifluoroethane containing 9.9 g (10 mmol) of perfluoro-2,5-dimethyl-3,6-dioxanonanoyl peroxide was added and the mixture was allowed to react for 5 hours at 30° C. under nitrogen atmosphere. After the reaction, the solvent was removed from the reaction mixture and the product was purified by reprecipitation with chloroform and methanol. The purified product was dried in vacuum to obtain 36.1 g of a polymer comprising fluoroalkyl group. The polymer prepared here was analyzed by spectroscopy and shown to have the following structure and properties:

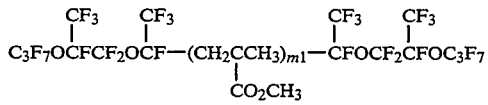

Number average molecular weight, $M_n = 13000$ ($M_w/M_n = 1.30$)

IR (cm$^{-1}$): 1740 (C=O), 1335 (CF$_3$), 1230 (CF$_2$)

$^{19}$F-NMR (CDCl$_3$, ext. CF$_3$CO$_2$H): $\delta -3.31 \sim -9.90$ (26F), $54.00 \sim -9.54$ (8F)

In the above resets, CDCl$_3$ means it was used as the solvent and ext. CF$_3$CO$_2$H means CF$_3$CO$_2$H was used as an external standard for the measurement of the spectrum. This abbreviation is used throughout the description of the preferred embodiments.

The poller prepared above was dissolved into chloroform and film was formed on a glass substrate from the solution. Contact angle of the film with water and dodecane was measured by using a goniometer CA-A ® (a product of Kyowa Kagaku Co., Ltd.). Resets are shown in Table 1.

Example 2

A polymer comprising fluoroalkyl group was prepared by the same method as in Example 1 except that 1.32 g (2.0 mmol) of perfluoro-2-methyl-3-oxahexanoyl peroxide was used in place of perfluoro-2,5-dimethyl-3,6-dioxanonanoyl peroxide in Example 1 and 6.0 g (60 mmol) of methyl methacrylate was used in place of 30.0 g of methyl methacrylate in Example 1 to obtain 7.0 g of a polymer comprising fluoroalkyl group. The polymer prepared here was analyzed by spectroscopy and shown to have the following structure and properties:

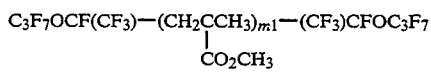

Number average molecular weight, $M_n = 14000$ ($M_w/M_n = 1.74$)

IR (cm$^{-1}$): 1740 (C=O), 1330 (CF$_3$), 1235 (CF$_2$)

$^{19}$F-NMR (CDCl$_3$, ext. CF$_3$CO$_2$H): $\delta -3.30 \sim -9.80$ (16F), $-54.11 \sim -56.75$ (6F)

Contact angle of the film made of the polymer prepared above was measured by the same method as in Example 1. Results are shown in Table 1.

Example 3

A polymer comprising fluoroalkyl group was prepared by the same method as in Example 1 except that 13.22 g (10 mmol) of perfluoro-2,5,8-trimethyl-3,6,9-trioxadodecanoyl peroxide was used in place of perfluoro-2,5-dimethyl-3,6-dioxanonanoyl peroxide in Example 1 to obtain 40.5 g of a polymer comprising fluoroalkyl group. The polymer prepared here was analyzed by spectroscopy and shown to have the following structure and properties:

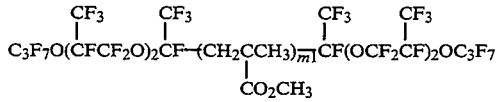

Number average molecular weight, $M_n = 14500$ ($M_w/M_n = 1.22$)

IR (cm$^{-1}$): 1740 (C=O), 1335 (CF$_3$), 1235 (CF$_2$)

$^{19}$F-NMR (CDCl$_3$, ext. CF$_3$CO$_2$H): $\delta -3.51 \sim -9.59$ (36F), $-54.00 \sim -69.48$ (10F)

Contact angle of the film made of the polymer prepared above was measured by the same method as in Example 1. Results are shown in Table 1.

Example 4

A polymer comprising fluoroalkyl group was prepared by the same method as in Example 1 except that 7.3 g (10 mmol) of perfluoroheptanoyl peroxide was used in place of perfluoro-2,5-dimethyl-3,6-dioxanonanoyl peroxide in Example 1 to obtain 34.2 g of a polymer comprising fluoroalkyl group. The polymer prepared here was analyzed by spectroscopy and shown to have the following structure and properties:

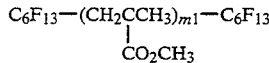

Number average molecular weight, $M_n = 11200$ ($M_w/M_n = 1.29$)

IR (cm$^{-1}$): 1740 (C=O), 1335 (CF$_3$), 1240 (CF$_2$)

$^{19}$F-NMR (CDCl$_3$, ext. CF$_3$CO$_2$H): $\delta -2.94$ (6F), $-29.11$ (4F), $-43.20 \sim -49.09$ (16F)

Contact angle of the film made of the polymer prepared above was measured by the same method as in Example 1. Results are shown in Table 1.

Example 5

A polymer comprising fluoroalkyl group was prepared by the same method as in Example 1 except that 4.3 g (10 mmol) of perfluorobutyryl peroxide was used in place of perfluoro-2,5-dimethyl-3,6-dioxanonanoyl peroxide in Example 1 to obtain 31.1 g of a polymer comprising fluoroalkyl group. The polymer prepared here was analyzed by spectroscopy and shown to have the following structure and properties:

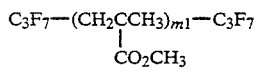

Number average molecular weight, $M_n = 9900$ ($M_w/M_n = 1.21$)

IR (cm$^{-1}$): 1740 (C=O), 1330 (CF$_3$), 1240 (CF$_2$)

$^{19}$F-NMR (CDCl$_3$, ext. CF$_3$CO$_2$H): $\delta -5.29$ (6F), $-36.34$ (4F), $-51.60$ (4F)

Contact angle of the film made of the polymer prepared above was measured by the same method as in Example 1. Results are shown in Table 1.

Example 6

A polymer comprising fluoroalkyl group was prepared by the same method as in Example 1 except that 62.5 g (480 mmol) of 2-hydroxyethyl methacrylate was used in place of methyl methacrylate in Example 1 and 238 g (240 mmol) of perfluoro-2,5-dimethyl-3,6-dioxanonanoyl peroxide was used in place of 9.9 g (10 mmol) perfluoro-2,5-dimethyl-3,6-dioxanonanoyl peroxide in Example 1 to obtain 85 g of white powder of a polymer comprising fluoroalkyl group and 215 g of colorless liquid material which is low molecular weight polymer. The polymer prepared here was analyzed by spectroscopy and shown to have the following structure and properties:

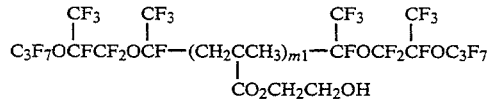

Product of high molecular weight, $M_n = 12000$ ($M_w/M_n = 1.51$)

Product of low molecular weight, $M_n = 1400$ ($M_w/M_n = 1.07$)

IR (cm$^{-1}$): 3450 (OH), 1730 (C=O), 1330 (CF$_3$), 1235 (CF$_2$)

$^{19}$F-NMR (CDCl$_3$, ext. CF$_3$CO$_2$H): $\delta -3.39 \sim -9.91$ (26F), $-54.12 \sim -69.50$ (8F)

Contact angle of the film made of the polymer prepared above was measured by the same method as in Example 1. Results are shown in Table 1.

Example 7

A polymer comprising fluoroalkyl group was prepared by the same method as in Example 1 except that 158 g (240 mmol) of perfluoro-2-methyl-3-oxahexanoyl peroxide was used in place of perfluoro-2,5-dimethyl-3,6-dioxanonanoyl peroxide in Example 1 and 62.5 g (480 mmol) of 2-hydroxyethyl methacrylate was used in place of methyl methacrylate in Example 1 to obtain 45 g of white powder of a polymer comprising fluoroalkyl group and 144 g of colorless liquid material which is low molecular weight polymer. The polymer prepared here was analyzed by spectroscopy and shown to have the following structure and properties:

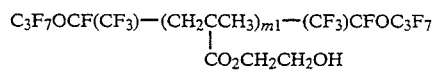

Product of high molecular weight, $M_n = 9900$ ($M_w/M_n = 1.43$)

Product of low molecular weight, $M_n = 1090$ ($M_w/M_n = 1.02$)

IR (cm$^{-1}$): 3450 (OH), 1730 (C=O), 1340 (CF$_3$), 1235 (CF$_2$)

$^{19}$F-NMR (CDCl$_3$, ext. CF$_3$CO$_2$H): $\delta -3.34 \sim -9.89$ (16F), $-54.14 \sim -56.79$ (6F)

Contact angle of the film made of the polymer prepared above was measured by the same method as in Example 1. Results are shown in Table 1.

Example 8

A polymer comprising fluoroalkyl group was prepared by the same method as in Example 1 except that 13.22 g (10 mmol) of perfluoro-2,5,8-trimethyl-3,6,9-trioxadodecanoyl peroxide was used in place of perfluoro-2,5-dimethyl-3,6-dioxanonanoyl peroxide in Example 1 and 3.9 g (30 mmol) of 2-hydroxyethyl methacrylate was used in place of methyl methacrylate in Example 1 to obtain 4.1 g of white powder of a polymer comprising fluoroalkyl group and 10.0 g of colorless liquid material which is low molecular weight polymer. The polymer prepared here was analyzed by spectroscopy and shown to have the following structure and properties:

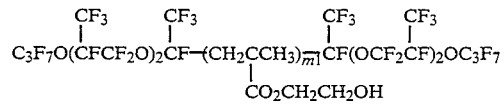

Product of high molecular weight, $M_n = 12300$ ($M_w/M_n = 1.39$)

Product of low molecular weight, $M_n = 1230$ ($M_w/M_n = 1.01$)

IR (cm$^{-1}$): 3450 (OH), 1730 (C=O), 1240 (CF$_3$), 1330 (CF$_2$)

$^{19}$F-NMR (CDCl$_3$, ext. CF$_3$CO$_2$H): $\delta -3.50 \sim -9.66$ (36F), $-54.14 \sim -69.66$ (10F)

Contact angle of the film made of the polymer prepared above was measured by the same method as in Example 1. Results are shown in Table 1.

Example 9

A polymer comprising fluoroalkyl group was prepared by the same method as in Example 1 except that 8.7 g (120 mmol) of acrylic acid was used in place of methyl methacrylate in Example 1 and 49.5 g (50 mmol) of perfluoro-2,5-dimethyl-3,6-dioxanonanoyl peroxide was used in place of 9.9 g (10 mmol) perfluoro-2,5-dimethyl-3,6-dioxanonanoyl peroxide in Example 1 to obtain 18.2 g of white powder of a polymer comprising fluoroalkyl group and 30.0 g of colorless liquid material which is low molecular weight polymer. The polymer prepared here was analyzed by spectroscopy and shown to have the following structure and properties:

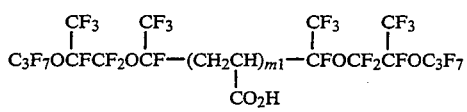

Product of high molecular weight, $M_n=11200$ ($M_w/M_n=1.54$)
Product of low molecular weight, $M_n=980$ ($M_w/M_n=1.01$)
IR (cm$^{-1}$): 3200 (OH), 1720 (C=O), 1335 (CF$_3$), 1235 (CF$_2$)
$^{19}$F-NMR (CDCl$_3$, ext. CF$_3$CO$_2$H): $\delta -3.40 \sim -9.90$ (26F), $-54.11 \sim -69.44$ (8F)

Contact angle of the film made of the polymer prepared above was measured by the same method as in Example 1. Results are shown in Table 1.

Example 10

A polymer comprising fluoroalkyl group was prepared by the same method as in Example 1 except that 155 g (236 mmol) of perfluoro-2-methyl-3-oxahexanoyl peroxide was used in place of perfluoro-2,5-dimethyl-3,6-dioxanonanoyl peroxide in Example 1 and 40.8 g (566 mmol) of acrylic acid was used in place of methyl methacrylate in Example 1 to obtain 78.6 g of white powder of a polymer comprising fluoroalkyl group and 60.1 g of colorless liquid material which is low molecular weight polymer. The polymer prepared here was analyzed by spectroscopy and shown to have the following structure and properties:

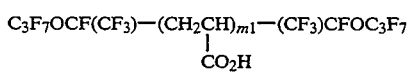

Product of high molecular weight, $M_n=12100$ ($M_w/M_n=1.44$)
Product of low molecular weight, $M_n=780$ ($M_w/M_n=1.02$)
IR (cm$^{-1}$): 3200 (OH), 1720 (C=O), 1240 (CF$_3$), 1330 (CF$_2$)
$^{19}$F-NMR (CDCl$_3$, ext. CF$_3$CO$_2$H): $\delta -3.30 \sim -9.93$ (16F), $-54.14 \sim -56.33$ (6F)

Contact angle of the film made of the polymer prepared above was measured by the same method as in Example 1. Results are shown in Table 1.

Example 11

A polymer comprising fluoroalkyl group was prepared by the same method as in Example 1 except that 9.0 g (6.8 mmol) of perfluoro-2,5,8-trimethyl-3,6,9-trioxadodecanoyl peroxide was used in place of perfluoro-2,5-dimethyl-3,6-dioxanonanoyl peroxide in Example 1 and 1.22 g (16.9 mmol) of acrylic acid was used in place of methyl methacrylate in Example 1 to obtain 1.9 g of white powder of a polymer comprising fluoroalkyl group and 7.0 g of colorless liquid material which is low molecular weight polymer. The polymer prepared here was analyzed by spectroscopy and shown to have the following structure and properties:

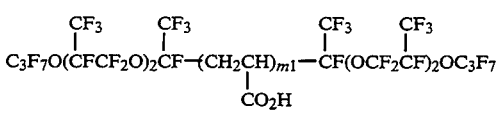

Product of high molecular weight, $M_n=12800$ ($M_w/M_n=1.72$)
Product of low molecular weight, $M_n=1200$ ($M_w/M_n=1.00$)
IR (cm$^{-1}$): 3200 (OH), 1720 (C=O), 1335 (CF$_3$), 1230 (CF$_2$)
$^{19}$F-NMR (CDCl$_3$, ext. CF$_3$CO$_2$H): $\delta -3.51 \sim -9.77$ (36F), $-54.10 \sim -69.64$ (10F)

Contact angle of the film made of the polymer prepared above was measured by the same method as in Example 1. Results are shown in Table 1.

Example 12

A polymer comprising fluoroalkyl group was prepared by the same method as in Example 1 except that 2.5 (3.8 mmol) of perfluoro-2,5-dimethyl-3,6-dioxanonanoyl peroxide was used in place of 9.9 g (10 mmol) of perfluoro-2,5-dimethyl-3,6-dioxanonanoyl peroxide in Example 1 and 1.20 g (12 mmol) of methyl methacrylate and 1.5 g (12 mmol) of 2-hydroxyethyl methacrylate was used in place of methyl methacrylate in Example 1 to obtain 2.5 g of the product shown in the following. The polymer prepared here was analyzed by spectroscopy and shown to have the following structure and properties:

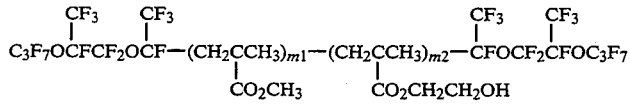

Number average molecular weight, $M_n=4500$ ($M_w/M_n=1.68$)
IR (cm$^{-1}$): 3400 (OH), 1730 (C=O), 1340 (CF$_3$), 1225 (CF$_2$)
$^{19}$F-NMR (CDCl$_3$, ext. CF$_3$CO$_2$H): $\delta -3.50 \sim -9.61$ (36F), $-54.11 \sim -69.54$ (10F)
$m_1:m_2=1:1$.

Contact angle of the film made of the polymer prepared above was measured by the same method as in Example 1. Results are shown in Table 1.

Example 13

A polymer comprising fluoroalkyl group was prepared by the same method as in Example 1 except that 1.32 g (2.0 mmol) of perfluoro-2-methyl-3-oxahexanoyl peroxide was used in place of perfluoro-2,5-dimethyl- 3,6-dioxanonanoyl peroxide in Example 1 and 4.0 g (40 mmol) of methyl methacrylate was used in place of 30.0 g of methyl methacrylate in Example 1 to obtain 4.4 g of the polymer shown in the following. The polymer prepared here was analyzed by spectroscopy and shown to have the following structure and properties:

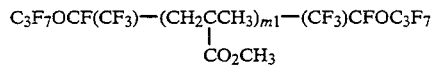

Number average molecular weight, $M_n=3900$ ($M_w/M_n=1.48$)

IR (cm$^{-1}$): 1740 (C=O),1335 (CF$_3$), 1235 (CF$_2$)

$^{19}$F-NMR (CDCl$_3$, ext. CF$_3$CO$_2$H): $\delta$ −3.30 ~ −9.80 (16F), −54.11 ~ −56.75 (6F)

Contact angle of the film made of the polymer prepared above was measured by the same method as in Example 1. Results are shown in Table 1.

Comparative Example 1

Contact angle of the film was measured by the same method as in Example 1 except that polymethyl methacrylate (p-MMA; a product of Wako Junyaku Co., Ltd.) was used in place of the polymer prepared in Example 1. Results are shown in Table 1.

TABLE 1

| | contact angle (degree) | |
|---|---|---|
| | water | dodecane |
| Example 1 | 109 | 41 |
| Example 2 | 102 | 38 |
| Example 3 | 114 | 50 |
| Example 4 | 100 | 32 |
| Example 5 | 91 | 29 |
| Example 6 | 104 | 39 |
| Example 7 | 100 | 32 |
| Example 8 | 110 | 47 |
| Example 9 | 10 | 44 |
| Example 10 | 16 | 49 |
| Example 11 | 22 | 51 |
| Example 12 | 110 | 43 |
| Example 13 | 113 | 52 |
| Comparative example 1 | 72 | 7 |

Example 14

A polymer comprising fluoroalkyl group was prepared by the same method as in Example 1 except that 0.7 (1.0 mmol) of perfluoro-2-methyl-3-oxahexanoyl peroxide was used in place of perfluoro-2,5-dimethyl-3,6-dioxanonanoyl peroxide in Example 1 and 1.6 g (10 mmol) of CH$_2$=CCH$_3$CO$_2$CHCH$_3$OC$_2$H$_5$ was used in place of methyl methacrylate in Example 1 to obtain 0.9 g of the product shown in the following:

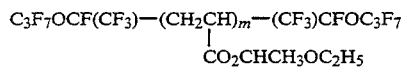

Number average molecular weight, $M_n=5850$ ($M_w/M_n=1.68$)

IR (cm$^{-1}$): 1710 (C=O), 1310 (CF$_3$), 1240 (CF$_2$)

$^{19}$F-NMR (CDCl$_3$, ext. CF$_3$CO$_2$H): $\delta$ −3.39 ~ −9.90 (16F), −54.19 ~ −56.33 (6F)

Example 15

A polymer comprising fluoroalkyl group was prepared by the same method as in Example 1 except that 1.0 g (1 mmol) of perfluoro-2,5-dimethyl-3,6-dioxanonanoyl peroxide was used in place of 9.0 g (10 mmol) of perfluoro-2,5-dimethyl-3,6-dioxanonanoyl peroxide in Example 1 and 2.4 g (10 mmol) of CH$_2$=CCH$_3$CO$_2$CHCH$_3$OCH$_2$CH(C$_2$H$_5$)(CH$_2$)$_4$H was used in place of methyl methacrylate in Example 1 to obtain 1.9 g of the product shown in the following:

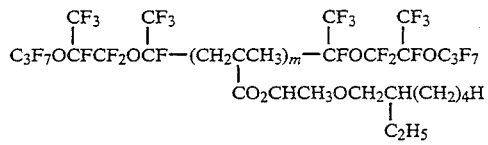

Number average molecular weight, $M_n=9950$ ($M_w/M_n=1.85$)

IR (cm$^{-1}$): 1710 (C=O), 1330 (CF$_3$), 1240 (CF$_2$)

$^{19}$F-NMR (CDCl$_3$, ext. CF$_3$CO$_2$H): $\delta$ −3.39 ~ −9.00 (36F), −53.11 ~ −69.76 (10F)

Example 16

A polymer comprising fluoroalkyl group was prepared by the same method as in Example 1 except that 0.7 (1.0 mmol) of perfluoro-2-methyl-3-oxahexanoyl peroxide was used in place of perfluoro-2,5-dimethyl-3,6-dioxanonanoyl peroxide in Example 1 and 1.0 g (1.0 mmol) of methyl methacrylate and 1.6 g (10 mmol) of CH$_2$=CCH$_3$CO$_2$CHCH$_3$OC$_2$H$_5$ was used in place of methyl methacrylate in Example 1 to obtain 1.8 g of the product shown in the following:

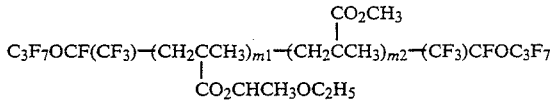

Number average molecular weight, $M_n=9120$ ($M_w/M_n=1.78$)

IR (cm$^{-1}$): 1730 (C=O), 1330 (CF$_3$), 1240 (CF$_2$)

$^{19}$F-NMR (CDCl$_3$, ext. CF$_3$CO$_2$H): $\delta$ −3.11 ~ −9.19 (16F), −54.01 ~ −57.00 (6F)

$m_1:m_2=49:51$.

Example 17

To 1.5 g (15 mmol) of methyl methacrylate and 2.2 g (15 mmol) of trimethoxyvinylsilane, 150 g of a solution of 1,1,2-trichlorotrifluoroethane containing 5.0 g (5 mmol) of diperfluoro-2,5-dimethyl-3,6-dioxanonanoyl peroxide was added and the mixture was allowed to react for 5 hours at 30° C. under nitrogen atmosphere. After the reaction, the solvent was removed from the reaction mixture and the remaining reaction product was dried in vacuum to obtain 6.9 g of the product. The product was analyzed by the gel permeation chromatography, the infrared spectroscopy and the $^{19}$F nuclear magnetic resonance spectroscopy and found to be a silicone polymer comprising fluoroalkyl group having the following structure. Results of the analysis are shown in the following. The polymer prepared here was dissolved in a 95 weight % aqueous solution of ethanol adjusted to pH of 5.5 by adding acetic acid to prepare a 2 weight % solution. Film was formed from the solution prepared here on a glass substrate by the dip coating method. The film was heat treated at 120° C. for 10 minutes and contact angle of the film with water and dodecane was measured. Results are shown in Table 2.

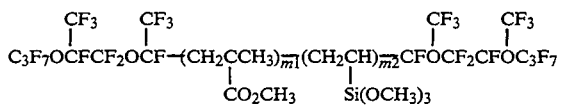

Number average molecular weight, $M_n = 13000$ ($M_w/M_n = 1.00$)
IR (cm$^{-1}$): 1730 (C=O), 1330 (CF$_3$), 1230 (CF$_2$)
$^{19}$F-NMR (CDCl$_3$, ext. CF$_3$CO$_2$H): $\delta -3.35 \sim -9.99$ (26F), $-54.09 \sim -69.51$ (8F)
$m_1:m_2 = 5:1$.

Example 18

Reaction was run by the same method as in Example 17 except that 3.2 g (5.0 mmol) of diperfluoro-2-methyl-3-oxahexanoyl peroxide was used in place of diperfluoro-2,5-dimethyl-3,6-dioxanonanoyl peroxide in Example 17 to obtain 5.2 g of the polymer having the following structure. The product was analyzed by the same method as in Example 17 and results of the analysis are shown in the following. Contact angle was measured by using the polymer prepared here by the same method as in Example 17 and results of the measurement are shown in Table 2.

$^{19}$F-NMR (CDCl$_3$, ext. CF$_3$CO$_2$H): $\delta -3.30 \sim -9.77$ (16F), $-54.10 \sim -56.75$ (6F)
$m_1:m_2 = 5:1$.

Example 20

Reaction was run by the same method as in Example 17 except that 6.6 g (5 mmol) of diperfluoro-2,5,8-trimethyl-3,6,9-trioxadodecanoyl peroxide was used in place of diperfluoro-2,5-dimethyl-3,6-dioxanonanoyl peroxide in Example 17, 0.5 g (5 mmol) of methyl methacrylate was used in place of 1.5 g (15 mmol) of methyl methacrylate in Example 17 and 0.74 g (5 mmol) of trimethoxyvinylsilane was used in place of 2.2 g (15 mmol) of trimethoxyvinylsilane in Example 17 to obtain 7.5 g of the polymer having the following structure. The product was analyzed by the same method as in Example 17 and results of the analysis are shown in the following. Contact angle was measured by using the polymer prepared here by the same method as in Example 17 and results of the measurement are shown in Table 2.

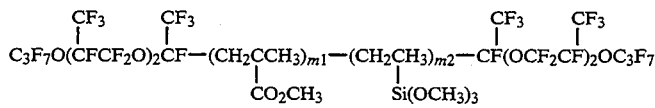

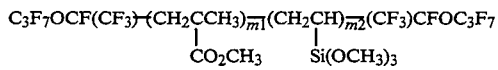

Number average molecular weight, $M_n = 1250$ ($M_w/M_n = 1.00$)
IR (cm$^{-1}$): 1730 (C=O), 1335 (CF$_3$), 1230 (CF$_2$)
$^{19}$F-NMR (CDCl$_3$, ext. CF$_3$CO$_2$H): $\delta -3.33 \sim -9.89$ (16F), $-54.14 \sim -56.70$ (10F)
$m_1:m_2 = 5:1$.

Example 19

Reaction was run by the same method as in Example 17 except that 3.2 g (5.0 mmol) of diperfluoro-2-methyl-3-oxahexanoyl peroxide was used in place of diperfluoro-2,5-dimethyl-3,6-dioxanonanoyl peroxide in Example 17, 0.5 g (5 mmol) of methyl methacrylate was used in place of 1.5 g (15 mmol) of methyl methacrylate in Example 17 and 0.74 g (5 mmol) of trimethoxy vinyl silane was used in place of 2.2 g (15 mmol) of trimethoxyvinylsilane in Example 17 to obtain 4.2 g of the polymer having the following structure. The product was analyzed by the same method as in Example 17 and results of the analysis are shown in the following. Contact angle was measured by using the polymer prepared here by the same method as in Example 17 and results of the measurement are shown in Table 2.

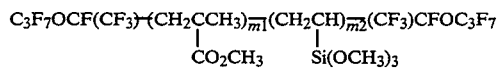

Number average molecular weight, $M_n = 1450$ ($M_w/M_n = 1.00$)
IR (cm$^{-1}$): 1730 (C=O), 1335 (CF$_3$), 1230 (CF$_2$)

Number average molecular weight, $M_n = 1800$ ($M_w/M_n = 1.01$)
IR (cm$^{-1}$): 1735 (C=O), 1330 (CF$_3$), 1235 (CF$_2$)
$^{19}$F-NMR (CDCl$_3$, ext. CF$_3$CO$_2$H): $\delta -3.49 \sim -9.54$ (36F), $-54.21 \sim -69.39$ (10F)
$m_1:m_2 = 5:1$.

Example 21

Reaction was run by the same method as in Example 17 except that 3.7 g (5 mmol) of diperfluoroheptanoyl peroxide was used in place of diperfluoro-2,5-dimethyl-3,6-dioxanonanoyl peroxide in Example 17, 0.5 g (5 mmol) of methyl methacrylate was used in place of 1.5 g (15 mmol) of methyl methacrylate in Example 17 and 0.74 g (5 mmol) of trimethoxyvinylsilane was used in place of 2.2 g (15 mmol) of trimethoxyvinylsilane in Example 17 to obtain 4.8 g of the polymer having the following structure. The product was analyzed by the same method as in Example 17 and results of the analysis are shown in the following. Contact angle was measured by using the polymer prepared here by the same method as in Example 17 and results of the measurement are shown in Table 2.

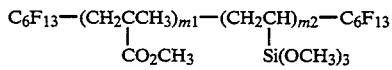

Number average molecular weight, $M_n = 810$ ($M_w/M_n = 1.00$)
IR (cm$^{-1}$): 1735 (C=O), 1330 (CF$_3$), 1240 (CF$_2$)
$^{19}$F-NMR (CDCl$_3$, ext. CF$_3$CO$_2$H): $\delta -2.90$ (6F), $-29.00$ (4F), $-43.29 \sim -49.22$ (16F)
$m_1:m_2 = 6:1$.

Example 22

Reaction was run by the same method as in Example 17 except that 2.5 g (2.5 mmol) of perfluoro-2,5-dimethyl-3,6-dioxanonanoyl peroxide was used in place of 5.0 g (5 mmol) of diperfluoro-2,5-dimethyl-3,6-dioxanonanoyl peroxide in Example 17, 0.75 g (7.5 mmol) of methyl methacrylate was used in place of 1.5 g (15 mmol) of methyl methacrylate in Example 17 and 3.72 g (15 mmol) of 3-methacryloxypropyltrimethoxysilane was used in place of 2.2 g (15 mmol) of trimethoxyvinylsilane in Example 17 to obtain 6.2 g of the polymer having the following structure. The product was analyzed by the same method as in Example 17 and results of the analysis are shown in the following. Contact angle was measured by using the polymer prepared here by the same method as in Example 17 and results of the measurement are shown in Table 2.

pared here by the same method as in Example 17 and results of the measurement are shown in Table 2.

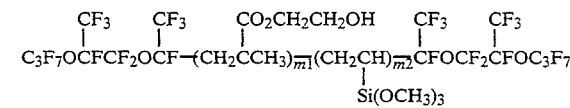

Number average molecular weight, $M_n = 3400$ ($M_w/M_n = 1.20$)
IR (cm$^{-1}$): 1730 (C=O), 1330 (CF$_3$), 1240 (CF$_2$)
$^{19}$F-NMR (CDCl$_3$, ext. CF$_3$CO$_2$H): $\delta - 3.49 \sim -9.90$

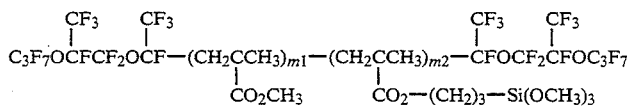

Number average molecular weight, $M_n = 5600$ ($M_w/M_n = 1.61$)
IR (cm$^{-1}$): 1730 (C=O), 1330 (CF$_3$), 1240 (CF$_2$)
$^{19}$F-NMR (CDCl$_3$, ext. CF$_3$CO$_2$H): $\delta - 3.30 \sim -9.94$ (26F), $-54.11 \sim -69.44$ (8F)
$m_1:m_2 = 1:1$.

Example 23

Reaction was run by the same method as in Example 17 except that 1.65 g (2.5 mmol) of diperfluoro-2-methyl-3-oxahexanoyl peroxide was used in place of diperfluoro-2,5-dimethyl-3,6-dioxanonanoyl peroxide in Example 17, 0.75 g (7.5 mmol) of methyl methacrylate was used in place of 1.5 g (15 mmol) of methyl methacrylate in Example 17 and 3.72 g (15 mmol) of 3-methacryloxypropyltrimethoxysilane was used in place of trimethoxyvinylsilane in Example 17 to obtain 5.0 g of the polymer having the following structure. The product was analyzed by the same method as in Example 17 and results of the analysis are shown in the following. Contact angle was measured by using the polymer prepared here by the same method as in Example 17 and results of the measurement are shown in Table 2.

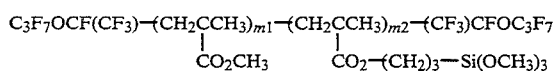

Number average molecular weight, $M_n = 5000$ ($M_w/M_n = 1.74$)
IR (cm$^{-1}$): 1730 (C=O), 1330 (CF$_3$), 1230 (CF$_2$)
$^{19}$F-NMR (CDCl$_3$, ext. CF$_3$CO$_2$H): $\delta - 3.31 \sim -9.90$ (16F), $-54.00 \sim -56.66$ (6F)
$m_1:m_2 = 1:1$.

Example 24

Reaction was run by the same method as in Example 17 except that 2.0 g (15 mmol) of 2-hydroxyethyl methacrylate was used in place of 1.5 g (15 mmol) of methyl methacrylate in Example 17 to obtain 5.9 g of the polymer having the following structure. The product was analyzed by the same method as in Example 17 and results of the analysis are shown in the following. Contact angle was measured by using the polymer pre- $m_1:m_2 = 6:1$.

Example 25

Reaction was run by the same method as in Example 17 except that 3.3 g (5 mmol) of diperfluoro-2-methyl-3-oxahexanoyl peroxide was used in place of diperfluoro-2,5-dimethyl-3,6-dioxanonanoyl peroxide in Example 17 and 2.0 g (15 mmol) of 2-hydroxyethyl methacrylate was used in place of methyl methacrylate in Example 17 to obtain 5.1 g of the polymer having the following structure. The product was analyzed by the same method as in Example 17 and results of the analysis are shown in the following. Contact angle was measured by using the polymer prepared here by the same method as in Example 17 and results of the measurement are shown in Table 2.

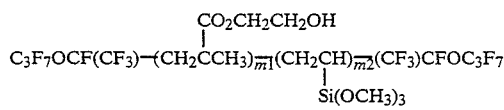

Number average molecular weight, $M_n = 2100$ ($M_w/M_n = 1.12$)
IR (cm$^{-1}$): 3450 (OH), 1730 (C=O), 1340 (CF$_3$), 1230 (CF$_2$)
$^{19}$F-NMR (CDCl$_3$, ext. CF$_3$CO$_2$H): $\delta - 3.30 \sim -9.96$ (16F), $-54.14 \sim -56.44$ (6F)
$m_1:m_2 = 5:1$.

Example 26

Reaction was run by the same method as in Example 17 except that 6.61 g (5 mmol) of diperfluoro-2,5,8-trimethyl-3,6,9-trioxadodecanoyl peroxide was used in place of diperfluoro-2,5-dimethyl-3,6-dioxanonanoyl peroxide in Example 1.7 and 2.0 g (15 mmol) of 2-hydroxyethyl methacrylate was used in place of methyl methacrylate in Example 17 to obtain 7.1 g of the polymer having the following structure. The product was analyzed by the same method as in Example 17 and results of the analysis are shown in the following. Contact angle was measured by using the polymer prepared here by the same method as in Example 17 and results of the measurement are shown in Table 2.

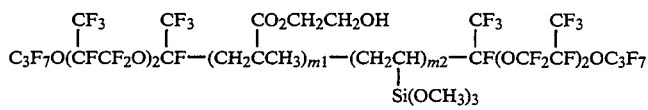

Number average molecular weight, $M_n=3900$ ($M_w/M_n=1.21$)

IR (cm$^{-1}$): 3450 (OH), 1730 (C=O), 1335 (CF$_3$), 1240 (CF$_2$)

$^{19}$F-NMR (CDCl$_3$, ext. CF$_3$CO$_2$H): $\delta -3.58 \sim -9.75$ (36F), $-54.10 \sim -69.71$ (10F)

$m_1:m_2 = 4:1$.

Example 27

Reaction was run by the same method as in Example 17 except that 2.0 g (15 mmol) of 2-hydroxyethyl methacrylate was used in place of methyl methacrylate in Example 17 and 3.7 g (15 mmol) of 3-methacryloxypropyltrimethoxysilane was used in place of trimethoxyvinylsilane in Example 17 to obtain 5.8 g of the polymer having the following structure. The product was analyzed by the same method as in Example 17 and results of the analysis are shown in the following. Contact angle was measured by using the polymer prepared here by the same method as in Example 17 and results of the measurement are shown in Table 2.

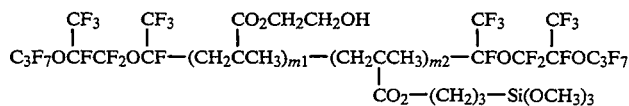

Number average molecular weight, $M_n=5300$ ($M_w/M_n=1.62$)

IR (cm$^{-1}$): 3450 (OH), 1730 (C=O), 1330 (CF$_3$), 1240 (CF$_2$)

$^{19}$F-NMR (CDCl$_3$, ext. CF$_3$CO$_2$H): $\delta -3.40 \sim -9.91$ (26F), $-54.19 \sim -69.50$ (8F)

$m_1:m_2 = 4:1$.

Example 28

Reaction was run by the same method as in Example 17 except that 6.61 g (5 mmol) of diperfluoro-2,5,8-trimethyl-3,6,9-trioxadodecanoyl peroxide was used in place of diperfluoro-2,5-dimethyl-3,6-dioxanonanoyl peroxide in Example 17, 2.0 g (15 mmol) of 2-hydroxyethyl methacrylate was used in place of methyl methacrylate in Example 17 and 3.7 g (15 mmol) of 3-methacryloxypropyltrimethoxysilane was used in place of trimethoxyvinylsilane in Example 17 to obtain 6.9 g of the polymer having the following structure. The product was analyzed by the same method as in Example 17 and results of the analysis are shown in the following. Contact angle was measured by using the polymer prepared here by the same method as in Example 17 and results of the measurement are shown in Table 2.

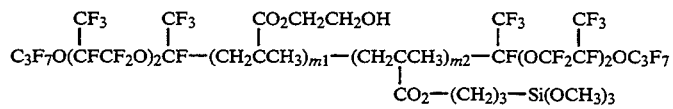

Number average molecular weight, $M_n=5950$ ($M_w/M_n=1.48$)

IR (cm$^{-1}$): 3450 (OH), 1730 (C=O), 1330 (CF$_3$), 1240 (CF$_2$)

$^{19}$F-NMR (CDCl$_3$, ext. CF$_3$CO$_2$H): $\delta -3.59 \sim -9.81$ (36F), $-54.19 \sim -69.23$ (10F)

$m_1:m_2 = 5:1$.

Comparative Example 2

Contact angle of water and dodecane with a glass plate without the treatment by the treatment agent of the invention was measured by the same method as in Example 17. Results are shown in Table 2.

TABLE 2

|  | contact angle (degree) | |
|---|---|---|
|  | water | dodecane |
| Example 17 | 108 | 59 |
| Example 18 | 105 | 57 |
| Example 19 | 104 | 57 |
| Example 20 | 114 | 62 |
| Example 21 | 100 | 51 |
| Example 22 | 106 | 58 |
| Example 23 | 103 | 55 |
| Example 24 | 104 | 58 |
| Example 25 | 101 | 53 |
| Example 26 | 111 | 60 |
| Example 27 | 102 | 55 |
| Example 28 | 109 | 60 |
| Comparative example 2 | 41 | 0 |

Example 29

To 1.74 g (10 mmol) of CH$_2$=C(CH$_3$)CO$_2$(CH$_2$CH$_2$O)$_2$H, 80 g of a solution of 1,1,2-trichlorotrifluoroethane containing 9.9 g (10 mmol) of diperfluoro-2,5-dimethyl-3,6-dioxanonanoyl peroxide was added and the mixture was allowed to react for 7 hours at 30° C. under nitrogen atmosphere. After the reaction, white powder formed by the reaction was filtered, dried in vacuum and purified to obtain 1.0 g of a white powder product. The solvent was removed from the filtrate and the remaining product was dried in vacuum to obtain 10.8 g of a colorless liquid product. The products were analyzed by the gel permeation chromatography, the infrared spectroscopy and the $^{19}$F nuclear magnetic resonance spectroscopy and found to be polymers comprising fluoroalkyl group having the following structure.

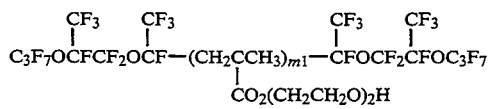

The white powder product: yield. 1.0 g.
Number average molecular weight, $M_n = 9900$ ($M_w/M_n = 1.30$)
The liquid product: yield, 10.8 g.
Number average molecular weight, $M_n = 1500$ ($M_w/M_n = 1.09$)
IR (cm$^{-1}$): 3450 (OH), 1730 (C=O), 1330 (CF$_3$), 1240 (CF$_2$)
$^{19}$F-NMR (CDCl$_3$, ext. CF$_3$CO$_2$H): $\delta -3.45 \sim -9.13$ (26F), $-54.32 \sim -69.50$ (8F)

Example 30

Reaction was run by the same method as in Example 29 except that diperfluoro-2-methyl-3-oxahexanoyl peroxide was used in place of diperfluoro-2,5-dimethyl-3,6-dioxanonanoyl peroxide in Example 29 to obtain 0.9 g of a white powder product and 9.9 g of a colorless liquid product. The products were polymers having the following structure.

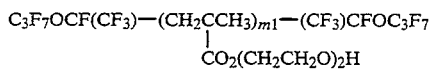

The white powder product: yield, 0.9 g.
Number average molecular weight, $M_n = 9400$ ($M_w/M_n = 1.21$)
The liquid product: yield, 9.9 g.
Number average molecular weight, $M_n = 1200$ ($M_w/M_n = 1.09$)
IR (cm$^{-1}$): 3450 (OH), 1730 (C=O), 1335 (CF$_3$), 1240 (CF$_2$)
$^{19}$F-NMR (CDCl$_3$, ext. CF$_3$CO$_2$H): $\delta -3.31 \sim -9.89$ (16F), $-54.00 \sim -56.70$ (6F)

Example 31

Reaction was run by the same method as in Example 29 except that diperfluoro-2,5,8-trimethyl-3,6,9-trioxadodecanoyl peroxide was used in place of diperfluoro-2,5-dimethyl-3,6-dioxanonanoyl peroxide in Example 29 to obtain 1.3 g of a white powder product and 12.1 g of a colorless liquid product. The products were polymers having the following structure.

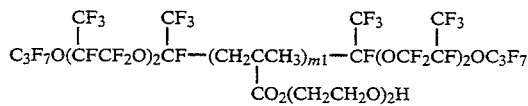

The white powder product: yield, 1.3 g.
Number average molecular weight, $M_n = 10200$ ($M_w/M_n = 1.33$)
The liquid product: yield, 12.1 g.
Number average molecular weight, $M_n = 1800$ ($M_w/M_n = 1.03$)
IR (cm$^{-1}$): 3450 (OH), 1730 (C=O), 1335 (CF$_3$), 1245 (CF$_2$)
$^{19}$F-NMR (CDCl$_3$, ext. CF$_3$CO$_2$H): $\delta -3.59 \sim -9.40$ (36F), $-54.23 \sim -69.00$ (10F)

Example 32

Reaction was run by the same method as in Example 29 except that diperfluoroheptanoyl peroxide was used in place of diperfluoro-2,5-dimethyl-3,6-dioxanonanoyl peroxide in Example 29 to obtain 0.8 g of a white powder product and 9.1 g of a colorless liquid product. The products were polymers having the following structure.

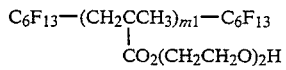

The white powder product: yield, 0.8 g.
Number average molecular weight, $M_n = 9400$ ($M_w/M_n = 1.25$)
The liquid product: yield, 9.1 g.
Number average molecular weight, $M_n = 1350$ ($M_w/M_n = 1.07$)
IR (cm$^{-1}$): 3450 (OH), 1730 (C=O), 1325 (CF$_3$), 1240 (CF$_2$)
$^{19}$F-NMR (CDCl$_3$, ext. CF$_3$CO$_2$H): $\delta -2.90$ (6F), $-29.31$ (4F), $-43.55 \sim -49.98$ (16F)

Example 33

Reaction was run by the same method as in Example 29 except that 4.3 g (10 mmol) of diperfluorobutyryl peroxide was used in place of diperfluoro-2,5-dimethyl-3,6-dioxanonanoyl peroxide in Example 29 to obtain 0.6 g of a white powder product and 8.7 g of a colorless liquid product. The products were polymers having the following structure.

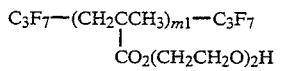

The white powder product: yield, 0.6 g.
Number average molecular weight, $M_n = 9000$ ($M_w/M_n = 1.32$)
The liquid product: yield, 8.7 g.
Number average molecular weight, $M_n = 1100$ ($M_w/M_n = 1.02$)
IR (cm$^{-1}$): 3450 (OH), 1730 (C=O), 1330 (CF$_3$), 1235 (CF$_2$)
$^{19}$F-NMR (CDCl$_3$, ext. CF$_3$CO$_2$H): $\delta -5.33$ (6F), $-36.30$ (4F), $-51.00$ (4F)

Example 34

Reaction was run by the same method as in Example 29 except that 4.38 g (10 mmol) of CH$_2$=C(CH$_3$)CO$_2$(CH$_2$CH$_2$O)$_{x2}$H was used in place of 1.74 g (10 mmol) of CH$_2$=C(CH$_3$)CO$_2$(CH$_2$CH$_2$O)$_2$H in Example 29 to obtain 2.1 g of a white powder product and 12.1 g of a colorless liquid product. The products were polymers having the following structure. In the following, the average molecular weight is shown in the case of $x_2 = 8$ because $x_2$ in the product had the value of $x_2$ between 7 and 9.

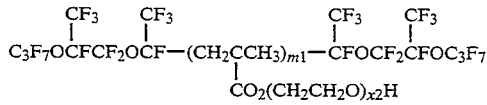

The white powder product: yield, 2.1 g.
Number average molecular weight, $M_n = 13500$ ($M_w/M_n = 1.39$)
The liquid product: yield, 12.1 g.
Number average molecular weight, $M_n = 2200$ ($M_w/M_n = 1.02$)
IR (cm$^{-1}$): 3450 (OH), 1730 (C=O), 1335 (CF$_3$), 1240 (CF$_2$)

$^{19}$F-NMR (CDCl$_3$, ext. CF$_3$CO$_2$H): δ−3.21~−9.11 (26F), −54.00~−69.12 (8F)

Example 35

Reaction was run by the same method as in Example 29 except that 8.86 g (10 mmol) of CH$_2$=C(CH$_3$)CO$_2$(CH$_2$CH$_2$O)$_{10}$—(CH$_2$CH$_2$CH$_2$CH$_2$O)$_5$H was used in place of 1.74 g (10 mmol) of CH$_2$=C(CH$_3$)CO$_2$(CH$_2$CH$_2$O)$_2$H in Example 29 to obtain 3.1 g of a white powder product and 13.9 g of a colorless liquid product. The products were polymers having the following structure.

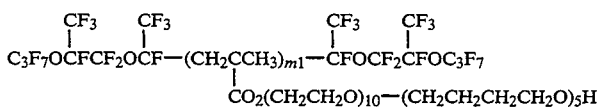

The white powder product: yield, 3.1 g.
Number average molecular weight, M$_n$=18000 (M$_w$/M$_n$=1.22)
The liquid product: yield, 13.9 g.
Number average molecular weight, M$_n$=2900 (M$_w$/M$_n$=1.04)
IR (cm$^{-1}$): 3455 (OH), 1730 (C=O), 1330 (CF$_3$), 1235 (CF$_2$)
$^{19}$F-NMR (CDCl$_3$, ext. CF$_3$CO$_2$H): δ−3.11~−9.31 (26F), −54.67~−69.99 (8F)

Example 36

To 1.74 g (10 mmol) of CH$_2$=C(CH$_3$)CO$_2$(CH$_2$CH$_2$O)$_2$H and 1.48 g (10 mmol) of trimethoxyvinylsilane, 80 g of a solution of 1,1,2-trichlorotrifluoroethane containing 9.9 g (10 mmol) of diperfluoro-2,5-dimethyl-3,6-dioxanonanoyl peroxide was added and the mixture was allowed to react for 7 hours at 30° C. under nitrogen atmosphere. After the reaction, white powder formed by the reaction was filtered, dried in vacuum and purified to obtain 0.4 g of the white powder product. The solvent was removed from the filtrate and the remaining product was dried in vacuum to obtain 12.3 g of a colorless liquid product. The products were polymers comprising fluoroalkyl group having the following structure.

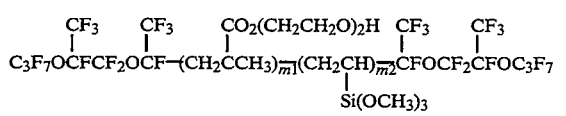

m$_1$:m$_2$=5:2
The white powder product: yield, 0.4 g.
Number average molecular weight, M$_n$=8800 (M$_w$/M$_n$=1.39)
m$_1$:m$_2$=5:2
The liquid product: yield, 12.3 g.
Number average molecular weight, M$_n$=1500 (M$_w$/M$_n$=1.09)
IR (cm$^{-1}$): 3450 (OH), 1725 (C=O), 1330 (CF$_3$), 1240 (CF$_2$)
$^{19}$F-NMR (CDCl$_3$, ext. CF$_3$CO$_2$H): δ−3.12~−9.00 (26F), −54.12~−69.00 (8F)

Example 37

Reaction was run by the same method as in Example 36 except that diperfluoro-2,5,8-trimethyl-3,6,9-trioxadodecanoyl peroxide was used in place of diperfluoro-2,5-dimethyl-3,6-dioxanonanoyl peroxide in Example 36 to obtain 0.7 g of a white powder product and 13.9 g of a colorless liquid product. The products were polymers having the following structure.

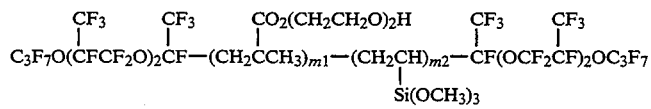

m$_1$:m$_2$=4:1
The white powder product: yield, 0.7 g.
Number average molecular weight, M$_n$=10100 (M$_w$/M$_n$=1.41)
m$_1$:m$_2$=4:1
The liquid product: yield, 13.9 g.
Number average molecular weight, M$_n$=2100 (M$_w$/M$_n$=1.04)
IR (cm$^{-1}$): 3450 (OH), 1725 (C=O), 1335 (CF$_3$), 1240 (CF$_2$)
$^{19}$F-NMR (CDCl$_3$, ext. CF$_3$CO$_2$H): δ−3.59~−9.32 (36F), −54.11~−68.91 (10F)

Example 38

Reaction was run by the same method as in Example 36 except that 3-methacryloxypropyltrimethoxysilane was used in place of trimethoxyvinylsilane in Example 36 to obtain 0.6 g of a white powder product and 12.9 g of a colorless liquid product. The products were polymers having the following structure.

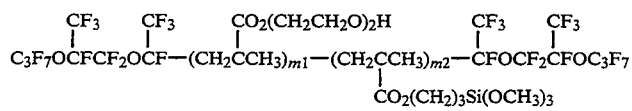

m$_1$:m$_2$=10:9
The white powder product: yield, 0.6 g.
Number average molecular weight, M$_n$=12000 (M$_w$/V$_n$=1.41)
m$_1$:m$_2$=10:9
The liquid product: yield, 12.9 g.
Number average molecular weight, M$_n$=2900 (M$_w$/M$_n$=1.19)
IR (cm$^{-1}$): 3450 (OH), 1730, 1725 (C=O), 1330 (CF$_3$), 1240 (CF$_2$)
$^{19}$F-NMR (CDCl$_3$, ext. CF$_3$CO$_2$H): δ−3.11~−9.29 (26F), −54.19~−69.99 (8F)

Example of Synthesis 1

To 21.6 g (300 mmol) of acrylic acid, 150 g of a solution of 1,1,2-trichlorotrifluoroethane containing 99 g (100 mmol) of diperfluoro-2,5-dimethyl-3,6-dioxanonanoyl peroxide was added and the mixture was allowed to react for 5 hours at 30° C. under nitrogen atmosphere. After the reaction, the solvent was removed from the reaction mixture and the remaining reaction product was purified by reprecipitation with a methanol-ethyl acetate system. After drying the reaction product in vacuum, 96.1 g of the compound comprising fluoroalkyl group having the following formula was obtained.

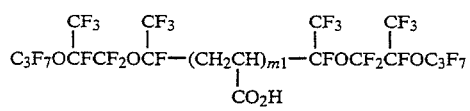

Number average molecular weight $M_n = 11200$ ($M_w/M_n = 1.54$)

Example of Synthesis 2

Reaction was run by the same method as in Example of synthesis 1 except that 13.2 g (20 mmol) of diperfluoro-2-methyl-3-oxahexanoyl peroxide was used in place of diperfluoro-2,5-dimethyl-3,6-dioxanonanoyl peroxide in Example of synthesis 1 and 4.3 g (60 mmol) of acrylic acid was used in place of 21.6 g (300 mmol) of acrylic acid in Example of synthesis 1 to obtain 3.4 g of the the compound comprising fluoroalkyl group having the following formula:

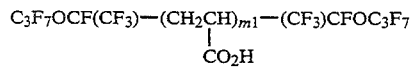

Number average molecular weight $M_n = 12000$ ($M_w/M_n = 1.96$)

Example of Synthesis 3

Reaction was run by the same method as in Example of synthesis 1 except that 13.22 g (10 mmol) of diperfluoro-2,5,8-trimethyl-3,6,9-trioxadodecanoyl peroxide was used in place of diperfluoro-2,5-dimethyl-3,6-dioxanonanoyl peroxide in Example of synthesis 1 to obtain 30.9 g of the the compound comprising fluoroalkyl group having the following formula:

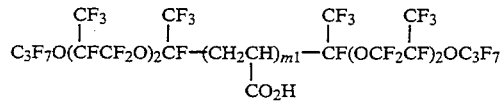

Number average molecular weight $M_n = 12800$ ($M_w/M_n = 1.72$)

Example of Synthesis 4

Reaction was run by the same method as in Example of synthesis 1 except that diperfluorobutyryl peroxide was used in place of diperfluoro-2,5-dimethyl-3,6-dioxanonanoyl peroxide in Example of synthesis 1 to obtain 51.1 g of the the compound comprising fluoroalkyl group having the following formula:

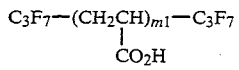

Number average molecular weight $M_n = 5100$ ($M_w/M_n = 1.47$)

Example of Synthesis 5

Reaction was run by the same method as in Example of synthesis 1 except that diperfluoroheptanoyl peroxide was used in place of diperfluoro-2,5-dimethyl-3,6-dioxanonanoyl peroxide in Example of synthesis 1 to obtain 80.9 g of the the compound comprising fluoroalkyl group having the following formula:

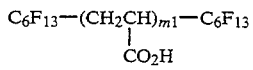

Number average molecular weight $M_n = 4600$ ($M_w/M_n = 1.43$)

Example of Synthesis 6

To 1 g of the compound comprising fluoroalkyl group synthesized in Example of synthesis 1, 50 ml of a 25 weight % aqueous solution of ammonia was added and the mixture was allowed to react for 2 days at the room temperature to obtain 0.9 g of the the compound comprising fluoroalkyl group having the following formula:

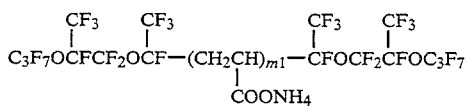

Number average molecular weight $M_n = 13600$

Example 39

The compound comprising fluoroalkyl group synthesized in Example of synthesis 1 was added to water (water for medical injection supplied by of Otsuka Seiyaku Co., Ltd.) in a suitable amount so that the solution had the concentration shown in Table 3. The solution was treated by ultrasonic wave at 25° C. to prepare a surface active agent of the invention. After the surface active agent thus prepared was left standing at 25° C. for one night, surface tension of the surface active agent was measured at the constant temperature of 25° C. by Kyowa CBVP surface tension meter A-3 ®°(a product of Kyowa Kagaku Co., Ltd.). Critical micelle concentration was calculated from the measured value of the surface tension shown in Table 1 and the results are shown in Table 3.

Examples 40 to 44

Surface tension was measured and critical micelle concentration was calculated by the same method as in Example 39 except that a compound comprising fluoroalkyl group synthesized in one of Examples of synthesis 2 to 6 was used in place of the compound comprising fluoroalkyl group synthesized in Example of synthesis 1 in Example 39. Results are shown in Table 3.

Comparative Example 3

Surface tension was measured and critical micelle concentration was calculated by the same method as in Example 39 except that polyacrylic acid (a product of Aldrich Co.; average molecular weight, 2000) was used in place of the compound comprising fluoroalkyl group synthesized in Example of synthesis 1 in Example 39. Results are shown in Table 3.

Comparative Example 4

Surface tension was measured by the same method as in Example 39 except that perfluorododecanoic acid was used in place of the compound comprising fluoroalkyl group synthesized in Example of synthesis 1 in Example 39. The surface tension thus measured was 32.0 dyne/cm at the concentration of 100 g/L.

TABLE 3

| | surface tension (dyne/cm) | | | | | | |
|---|---|---|---|---|---|---|---|
| Example | 39 | 40 | 41 | 42 | 43 | 44 | — |
| Comparative example | — | — | — | — | — | — | 3 |
| concentration (g/L) | | | | | | | |
| 0 | 71.5 | 71.5 | 71.5 | 71.5 | 71.5 | 71.5 | 71.5 |
| $10^{-3}$ | 56.9 | 58.9 | 60.8 | 59.1 | 60.8 | 62.5 | 59.3 |
| $10^{-2}$ | 53.3 | 55.6 | 53.1 | 53.3 | 51.3 | 55.3 | 55.2 |
| $10^{-1}$ | 20.3 | 18.3 | 17.1 | 44.9 | 41.0 | 29.3 | 50.3 |
| $10^{0}$ | 17.2 | 18.2 | 16.1 | 19.0 | 17.2 | 17.4 | 45.3 |
| $10^{1}$ | 16.9 | 16.7 | 15.1 | 18.9 | 17.0 | 17.1 | 40.5 |
| $2.5 \times 10$ | 16.7 | — | 15.0 | 18.4 | 16.8 | 17.2 | — |
| $5.0 \times 10$ | 16.5 | — | 14.9 | 18.5 | 16.9 | 17.0 | — |
| $10^{2}$ | 16.2 | 17.2 | 15.0 | 18.3 | 16.7 | 16.9 | 37.3 |
| CMC* (g/L) | 0.20 | 0.09 | 0.05 | 1.10 | 0.81 | 0.80 | — |

*critical micelle concentration

The results in the above clearly show that the surface active agents of the invention had excellent surface active property.

Example 45

The following compound comprising fluoroalkyl group obtained in Example 29 was dissolved in chloroform to prepare a 5 weight % solution.

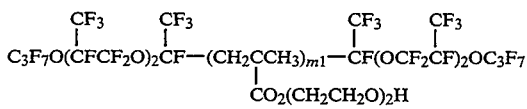

The white powder product: yield, 1.0 g.
Number average molecular weight, $M_n = 9900$ ($M_w/M_n = 1.30$)
The liquid product: yield, 10.8 g.
Number average molecular weight, $M_n = 1500$ ($M_w/M_n = 1.09$)

By using the solution thus prepared, film was formed on a glass substrate by using a bar coater and contact angle of the film with water and dodecane was measured. Results are shown in Table 4.

Example 46

Film was formed and contact angle of the film was measured by the same method as in Example 45 except that the compound comprising fluoroalkyl group obtained in Example 30 was used in place of the compound comprising fluoroalkyl group obtained in Example 29 in Example 45. Results are shown in Table 4.

Example 47

Film was formed and contact angle of the film was measured by the same method as in Example 45 except that the compound comprising fluoroalkyl group obtained in Example 31 was used in place of the compound comprising fluoroalkyl group obtained in Example 29 in Example 45. Results are shown in Table 4.

Example 48

Film was formed and contact angle of the film was measured by the same method as in Example 45 except that the compound comprising fluoroalkyl group obtained in Example 32 was used in place of the compound comprising fluoroalkyl group obtained in Example 29 in Example 45. Results are shown in Table 4.

Example 49

Film was formed and contact angle of the film was measured by the same method as in Example 45 except that the compound comprising fluoroalkyl group obtained in Example 33 was used in place of the compound comprising fluoroalkyl group obtained in Example 29 in Example 45. Results are shown in Table 4.

Example 50

Film was formed and contact angle of the film was measured by the same method as in Example 45 except that the compound comprising fluoroalkyl group obtained in Example 34 was used in place of the compound comprising fluoroalkyl group obtained in Example 29 in Example 45. Results are shown in Table 4.

Example 51

Film was formed and contact angle of the film was measured by the same method as in Example 45 except that the compound comprising fluoroalkyl group obtained in Example 35 was used in place of the compound comprising fluoroalkyl group obtained in Example 29 in Example 45. Results are shown in Table 4.

Example 52

Film was formed and contact angle of the film was measured by the same method as in Example 45 except that the compound comprising fluoroalkyl group obtained in Example 36 was used in place of the compound comprising fluoroalkyl group obtained in Example 29 in Example 45. Results are shown in Table 4.

Example 53

Film was formed and contact angle of the film was measured by the same method as in Example 45 except that the compound comprising fluoroalkyl group obtained in Example 37 was used in place of the compound comprising fluoroalkyl group obtained in Example 29 in Example 45. Results are shown in Table 4.

Example 54

Reaction was run by the same method as in Example 29 except that CH$_2$=C(CH$_3$)CO$_2$(CH$_2$CH$_2$O)$_2$H and CH$_2$=C(CH$_3$)CO$_2$(CH$_2$)$_3$Si(OCH$_3$)$_3$ were used in place of CH$_2$=C(CH$_3$)CO$_2$(CH$_2$CH$_2$O)$_2$H in Example 29 and diperfluoro-2-methyl-3-oxahexanoyl peroxide was used in place of diperfluoro-2,5-dimethyl-3,6-dioxanonanoyl peroxide in Example 29 to obtain a white powder product and a colorless liquid product. The products were polymers having the following structure.

$$\begin{array}{ccccc} CF_3 & CF_3 & CO_2(CH_2CH_2O)_2H & CF_3 & CF_3 \\ | & | & | & | & | \\ C_3F_7OCFCF_2OCF-(CH_2CCH_3)_{m1}-(CH_2CCH_3)_{m2}-CFOCF_2CFOC_3F_7 \\ & & | \\ & & CO_2(CH_2)_3Si(OCH_3)_3 \end{array}$$

The white powder product: yield, 0.6 g.
Number average molecular weight, $M_n = 12000$ ($M_w/M_n = 1.41$)
$m_1:m_2 = 10:9$
The liquid product: yield, 12.9 g.
Number average molecular weight, $M_n = 2900$ ($M_w/M_n = 1.19$)
$m_1:m_2 = 10:9$
The compound thus obtained was evaluated by the same method as in Example 45. Results are shown in Table 4.

Comparative Example 5

Contact angle was measured by the same method as in Example 45 except that a glass substrate was used without treatment by the compound comprising fluoroalkyl group. Results are shown in Table 4.

TABLE 4

| | | contact angle (degree) | |
|---|---|---|---|
| | | water | dodecane |
| Example 45 | white powder | 55 | 59 |
| | colorless liquid | 58 | 62 |
| Example 46 | white powder | 52 | 51 |
| | colorless liquid | 55 | 53 |
| Example 47 | white powder | 60 | 62 |
| | colorless liquid | 69 | 66 |
| Example 48 | white powder | 51 | 50 |
| | colorless liquid | 52 | 54 |
| Example 49 | white powder | 42 | 45 |
| | colorless liquid | 48 | 50 |
| Example 50 | white powder | 0 | 62 |
| Example 51 | white powder | 0 | 59 |
| Example 52 | white powder | 109 | 70 |
| | colorless liquid | 112(100)* | 75(75)* |
| Example 53 | white powder | 111 | 73 |
| | colorless liquid | 114(102)* | 78(78)* |
| Example 54 | white powder | 106 | 70 |
| | colorless liquid | 112(99)* | 77(77)* |
| Comparative example 5 | | 49 | 0 |

*a value after 1 minute.

Example 55

To 1.42 g (10 mmol) of glycidyl methacrylate and 2.96 g (20 mmol) of trimethoxyvinylsilane, 66 g of a solution of 1,1,2-trichlorotrifluoroethane containing 6.6 g (10 mmol) of diperfluoro-2-methyl-3-oxahexanoyl peroxide was added and the mixture was allowed to react for 5 hours at 40° C. under nitrogen atmosphere. After the reaction, the solvent was removed from the reaction mixture and the remaining reaction product was dried in vacuum to obtain 7.8 g of a colorless clear liquid product. The product was analyzed by the gel permeation chromatography, the infrared spectroscopy, the $^{19}$F nuclear magnetic resonance spectroscopy and the $^1$H nuclear magnetic resonance spectroscopy and found to be a fluorosilicone polymer comprising epoxy group having the following structure. Results of the analysis are shown in the following.

$$\begin{array}{c} Si(OCH_3)_3 \\ | \\ C_3F_7OCF(CF_3)-(CH_2CH)_{m1}-(CH_2CCH_3)_{m2}-(CF_3)CFOC_3F_7 \\ | \\ CO_2CH_2CHCH_2 \\ \diagdown \diagup \\ O \end{array}$$

Number average molecular weight: $M_n = 790$ (($M_w/M_n = 1.08$)
IR (cm$^{-1}$): 1740 (C=O), 1330 (CF$_3$), 1245 (CF$_2$), $$912 \left( \begin{array}{c} \diagdown \quad \diagup \\ C\text{———}C \\ \diagup \diagdown_O \diagup \diagdown \end{array} \right)$$

$^{19}$F-NMR (CDCl$_3$, ext. CF$_3$CO$_2$H): $\delta -3.35 \sim -9.89$ (16F), $-54.10 \sim -56.71$ (6F)
$^1$H-NMR (CDCl$_3$): $\delta 0.6 \sim 2.9$ (>CH—, —CH$_2$—, —CH$_3$), $2.6 \sim 2.9$ (—CH$_2$—), $3.1 \sim 3.3$ (>CH—), 3.6 (OCH$_3$), $3.7 \sim 4.6$ (—CH$_2$—),
Copolymerization ratio $m_1:m_2 = 47:53$.

Example 56

Reaction was run by the same method as in Example 55 except that diperfluoroheptanoyl peroxide was used in place of diperfluoro-2-methyl-3-oxahexanoyl peroxide in Example 55 to obtain 7.3 g of the polymer having the following structure. The product was analyzed by the same method as in Example 55 and results of the analysis are shown in the following.

$$\begin{array}{c} Si(OCH_3)_3 \\ | \\ C_6F_{13}-(CH_2-CH)_{m1}-(CH_2-CCH_3)_{m2}-C_6F_{13} \\ | \\ CO_2CH_2CHCH_2 \\ \diagdown \diagup \\ O \end{array}$$

Number average molecular weight: $M_n = 905$ (($M_w/M_n = 1.04$)
IR (cm$^{-1}$): 1740 (C=O), 1330 (CF$_3$), 1240 (CF$_2$), $$908 \left( \begin{array}{c} \diagdown \quad \diagup \\ C\text{———}C \\ \diagup \diagdown_O \diagup \diagdown \end{array} \right)$$

$^{19}$F-NMR (CDCl$_3$, ext. CF$_3$CO$_2$H): $\delta -2.99$ (6F), $-29.18$ (4F), $-43.19 \sim -48.85$ (16F)

$^1$H-NMR (CDCl$_3$): δ0.6~2.9 (>CH—, —CH$_2$—, —CH$_3$), 2.5~2.8 (—CH$_2$—), 3.0~3.4 (>CH—), 3.6 (OCH$_3$), 3.7~4.5 (—CH$_2$—),

Copolymerization ratio m$_1$:m$_2$=43:57.

Example 57

Reaction was run by the same method as in Example 55 except that 1.86 g (10 mmol) of 2-(glycidyloxy)ethyl methacrylate was used in place of glycidyl methacrylate in Example 55 to obtain 8.0 g of the polymer having the following structure. The product was analyzed by the same method as in Example 55 and results of the analysis are shown in the following.

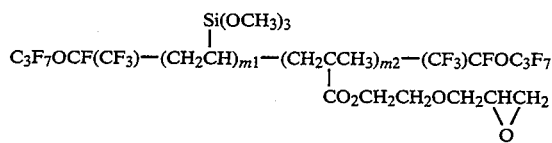

Number average molecular weight: M$_n$=820 ((M$_w$/M$_n$=1.09)

IR (cm$^{-1}$): 1735 (C=O), 1335 (CF$_3$), 1230 (CF$_2$), 910 ( 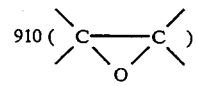 )

$^{19}$F-NMR (CDCl$_3$, ext. CF$_3$CO$_2$H): δ−3.10~−9.12 (16F), −54.00~−56.68 (6F)

$^1$H-NMR (CDCl$_3$): δ0.6~3.4 (>CH—, —CH$_2$—, —CH$_3$), 2.6~3.0 (—CH$_2$—), 3.3~3.5 (>CH—), 3.6 (OCH$_3$), 3.8~4.3 (—CH$_2$—),

Copolymerization ratio m$_1$:m$_2$=44:56.

Example 58

Reaction was run by the same method as in Example 55 except that 1.56 g (10 mmol) of 2-methylglycidyl methacrylate was used in place of glycidyl methacrylate in Example 55 to obtain 7.5 g of the polymer having the following structure. The product was analyzed by the same method as in Example 55 and results of the analysis are shown in the following.

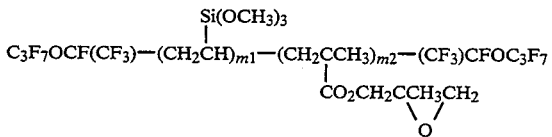

Number average molecular weight: M$_n$=805 ((M$_w$/M$_n$=1.02)

IR (cm$^{-1}$): 1735(C=O),1330 (CF$_3$), 1240 (CF$_2$), 909 ( 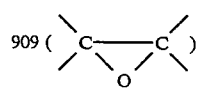 )

$^{19}$F-NMR (CDCl$_3$, ext. CF$_3$CO$_2$H): δ−3.67~−9.01(16F), −54.44~−56.98 (6F)

$^1$H-NMR (CDCl$_3$): δ0.6~3.0(>CH—, —CH$_2$—, —CH$_3$), 2.6~2.9 (—CH$_2$—), 3.3~3.4 (>CH—), 3.6 (OCH$_3$), 3.7~4.5 (—CH$_2$—),

Copolymerization ratio m$_1$:m$_2$=42:58.

Example 59

Reaction was run by the same method as in Example 55 except that 2.4 g (10 mmol) of 3-methacryloxypropyltrimethoxysilane was used in place of trimethoxyvinylsilane in Example 55 to obtain 7.2 g of the polymer having the following structure. The product was analyzed by the same method as in Example 55 and results of the analysis are shown in the following.

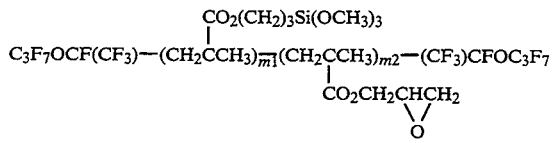

Number average molecular weight: M$_n$=820 ((M$_w$/M$_n$=1.02)

IR (cm$^{-1}$): 1735(C=O),1330(CF$_3$), 1235(CF$_2$), 910 ( 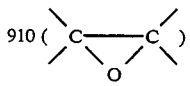 )

$^{19}$F-NMR (CDCl$_3$, ext. CF$_3$CO$_2$H): δ−3.39~−9.55 (16F), −54.97~−56.12 (6F)

$^1$H-NMR (CDCl$_3$): δ0.5~2.2 (>CH—, —CH$_2$—, —CH$_3$), 2.6~3.0 (—CH$_2$—), 3.1~3.5 (>CH—), 3.3~3.5 (OCH$_3$), 3.7~4.3 (—CH$_2$—),

Copolymerization ratio m$_1$:m$_2$=51:49.

Example 60

Reaction was run by the same method as in Example 55 except that a mixture of 1,1,1,2,2-pentafluoro-3,3-dichloropropane and 1,1,2,2,3-pentafluoro-1,3-dichloropropane (50:50 in weight ratio) was used in place of 1,1,2-trichlorotrifluoroethane in Example 55 to obtain 8.9 g of the polymer having the following structure. The product was analyzed by the same method as in Example 55 and results of the analysis are shown in the following.

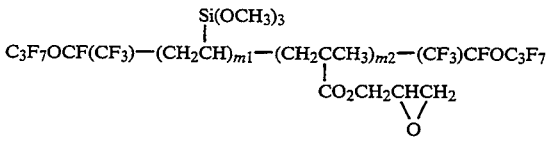

Number average molecular weight: M$_n$=790 ((M$_w$/M$_n$=1.08)

IR (cm$^{-1}$): 1740(C=O),1330(CF$_3$), 1245(CF$_2$), 912 ( 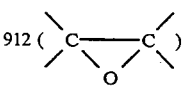 )

$^{19}$F-NMR (CDCl$_3$, ext. CF$_3$CO$_2$H): δ−3.30~−9.91 (16F), −54.11~−56.73 (6F)

$^1$H-NMR (CDCl$_3$): δ0.6~2.9 (>CH—, —CH$_2$—, —CH$_3$), 2.6~2.9 (—CH$_2$—), 3.1~3.3 (>CH—), 3.6 (OCH$_3$), 3.7~4.6 (—CH$_2$—),

Copolymerization ratio m$_1$:m$_2$=47:53.

Example 61

To 85.2 g (600 mmol) of glycidyl methacrylate, 150 g of a solution of 1,1,2-trichlorotrifluoroethane containing 19.8 g (20 mmol) of diperfluoro-2,5-dimethyl-3,6-dioxanonanoyl peroxide was added and the mixture was allowed to react for 3 hours at 40° C. under nitrogen atmosphere. After the reaction, white powder formed by the reaction was filtered and dried in vacuum to obtain 88.4 g of the product. The product was analyzed by the gel permeation chromatography, the infrared spectroscopy and the $^{19}$F nuclear magnetic resonance spectroscopy and found to be the epoxy polymer comprising fluorine having the following structure. Results of the analysis are shown in the following.

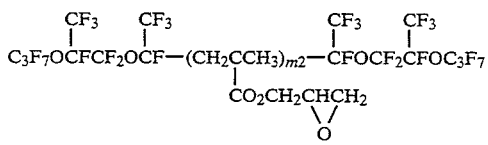

Number average molecular weight: $M_n = 2450$ (($M_w/M_n = 1.19$)

IR (cm$^{-1}$): 1735 (C=O), 1335 (CF$_3$), 1240 (CF$_2$),

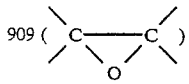

$^{19}$F-NMR (CDCl$_3$, ext. CF$_3$CO$_2$H): $\delta - 3.26 \sim -9.99$ (26F), $-54.04 \sim -69.50$ (8F)

Example 62

Reaction was run by the same method as in Example 61 except that a mixture of 42.6 g (300 mmol) of glycidyl methacrylate and 42.6 g (300 mmol) of butyl methacrylate was used in place of glycidyl methacrylate in Example 61 to obtain 73.0 g of the polymer having the following structure as a colorless clear liquid material. The product was analyzed by the same method as in Example 61 and results of the analysis are shown in the following.

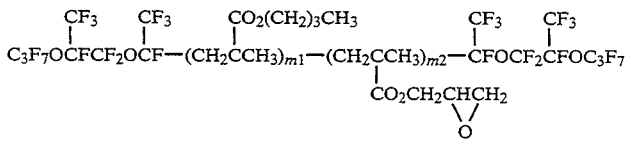

Number average molecular weight: $M_n = 4700$ ($M_w/M_n = 1.22$)

IR (cm$^{-1}$): 1730 (C=O), 1335 (CF$_3$), 1240 (CF$_2$),

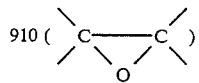

$^{19}$F-NMR (CDCl$_3$, ext. CF$_3$CO$_2$H): $\delta - 3.21 \sim -9.55$ (26F), $-54.32 \sim -68.78$ (8F)

Copolymerization ratio $m_1:m_2 = 55.3:44.7$.

Example 63

Reaction was run by the same method as in Example 61 except that a mixture of 42.6 g (300 mmol) of glycidyl methacrylate and 59.4 g (300 mmol) of 2-ethylhexyl methacrylate was used in place of glycidyl methacrylate in Example 61 to obtain 107.4 g of the polymer having the following structure as a colorless clear liquid material. The product was analyzed by the same method as in Example 61 and results of the analysis are shown in the following.

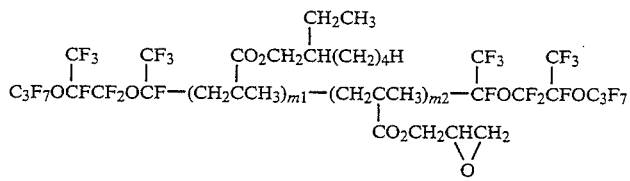

Number average molecular weight: $M_n = 2300$ (($M_w/M_n = 1.19$)

IR (cm$^{-1}$): 1735 (C=O), 1330 (CF$_3$), 1235 (CF$_2$),

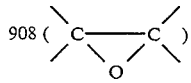

$^{19}$F-NMR (CDCl$_3$, ext. CF$_3$CO$_2$H): $\delta - 3.15 \sim -9.66$ (26F), $-54.41 \sim -68.09$ (8F)

Copolymerization ratio $m_1:m_2 = 57.1:42.9$.

Example 64

Into a reaction vessel, 100 g of a solution of 1,1,2-trichlorotrifluoroethane containing 3.1 g (10 mmol) of 6-methacroyloxyhexanoyloxymethyl-7-oxabicyclo[4.1.0]heptane, 3.0 g (20 mmol) of trimethoxyvinylsilane and 6.6 g (10 mmol) of diperfluoro-2-methyl-3-oxahexanoyl peroxide was added and the mixture was allowed to react for 3 hours at 40° C. under nitrogen atmosphere. After the reaction, the solvent was removed from the reaction mixture in vacuum and the remaining reaction product was dried in vacuum to obtain 8.8 g of a fluorosilicone compound comprising epoxy group as a colorless clear liquid product. The product was analyzed by the gel permeation chromatography, the infrared spectroscopy, the $^{19}$F nuclear magnetic resonance spectroscopy and the $^1$H nuclear magnetic resonance spectroscopy and found to be the compound having the following structure. Results of the analysis are shown in the following.

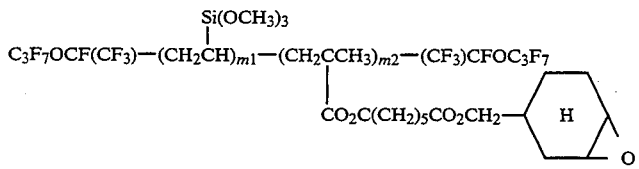

Number average molecular weight: $M_n=1260$ (($M_w/M_n=1.23$)

IR (cm$^{-1}$): 1736 (C=O), 1333 (CF$_3$), 1240 (CF$_2$),

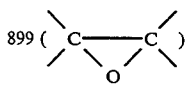 899

$^{19}$F-NMR (CDCl$_3$, ext. CF$_3$CO$_2$H): $\delta$ −3.31 ~ −9.10 (16F), −54.19 ~ −56.33 (6F)

$^1$H-NMR (CDCl$_3$): $\delta$0.71~2.40 (>CH—, —CH$_2$—, —CH$_3$), 3.15~3.25 (>CH—), 3.60 (OCH$_3$), 3.82~4.18 (—CH$_2$—)

Copolymerization ratio $m_1$:$m_2$=60.3:39.7.

Example 65

Reaction was run by the same method as in Example 64 except that diperfluoro-2,5,8-trimethyl-3,6,9-trioxadodecanoyl peroxide was used in place of diperfluoro-2-methyl-3-oxahexanoyl peroxide in Example 64 to obtain 9.6 g of the polymer having the following structure. The product was analyzed by the same method as in Example 64 and results of the analysis are shown in the following.

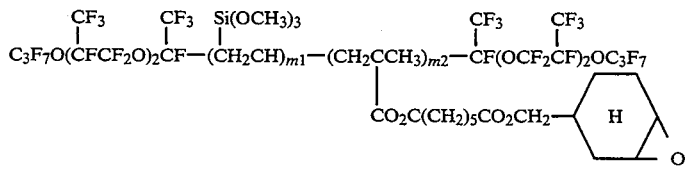

Number average molecular weight: $M_n=1980$ (($M_w/M_n=1.18$)

IR (cm$^{-1}$): 1735 (C=O),1330 (CF$_3$), 1245 (CF$_2$),

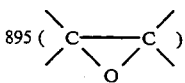 895

$^{19}$F-NMR (CDCl$_3$, ext. CF$_3$CO$_2$H): $\delta$ −2.86 ~ −9.19 (36F), −54.00 ~ −69.84 (10F)

$^1$H-NMR (CDCl$_3$): $\delta$0.71~2.79 (>CH—, —CH$_2$—, —CH$_3$), 3.18~3.22 (>CH—), 3.61 (OCH$_3$), 3.89~4.28 (—CH$_2$—)

Copolymerization ratio $m_1$:$m_2$=54.1:45.9.

Example 66

Reaction was run by the same method as in Example 64 except that 2.0 g (10 mmol) of 6-methacroyloxymethyl-7-oxabicyclo[4.1.0]heptane was used in place of 3.1 g (10 mmol) of 6-methacroyloxyhexanoyloxymethyl-7-oxabicyclo[4.1.0]heptane in Example 64 to obtain 8.8 g of the polymer having the following structure. The product was analyzed by the same method as in Example 64 and results of the analysis are shown in the following.

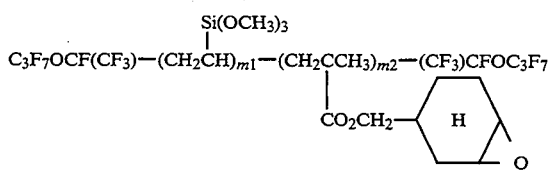

Number average molecular weight: $M_n=1120$ (($M_w/M_n=1.21$)

IR (cm$^{-1}$): 1736 (C=O), 1333 (CF$_3$), 1237 (CF$_2$),

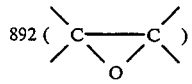 892

$^{19}$F-NMR (CDCl$_3$, ext. CF$_3$CO$_2$H): $\delta$ −3.11 ~ −9.09 (16F), −54.01 ~ −56.99 (6F)

$^1$H-NMR (CDCl$_3$): $\delta$0.71~2.81 (>CH—, —CH$_2$—, —CH$_3$), 3.18~3.21 (>CH—), 3.60 (OCH$_3$), 3.81~4.21 (—CH$_2$—)

Copolymerization ratio $m_1$:$m_2$=53.0:47.0.

Example 67

Reaction was run by the same method as in Example 64 except that 2.0 g (10 mmol) of 6-methacroyloxymethyl-7-oxabicyclo[4.1.0]heptane was used in place of 3.1 g (10 mmol) of 6-methacroyloxyhexanoyloxymethyl-7-oxabicyclo[4.1.0]heptane in Example 64 and diperfluoro-2,5,8-trimethyl-3,6,9-trioxadodecanoyl peroxide was used in place of diperfluoro-2-methyl-3-oxahexanoyl peroxide in Example 64 to obtain 15.1 g of the polymer having the following structure. The product was analyzed by the same method as in the following.

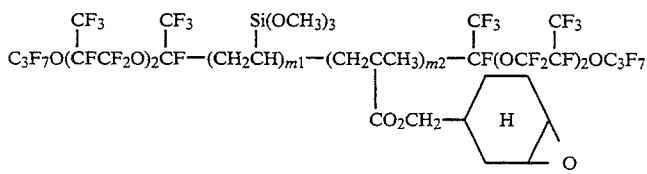

Number average molecular weight: $M_n = 2040$ (($M_w/M_n = 1.41$)

IR (cm$^{-1}$): 1730 (C=O), 1340 (CF$_3$), 1235 (CF$_2$),

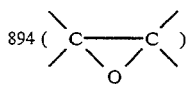
894

$^{19}$F-NMR (CDCl$_3$, ext. CF$_3$CO$_2$H): δ −2.98 ~ −9.34 (36F), −54.09 ~ −68.12 (10F)

$^1$H-NMR (CDCl$_3$): δ 0.71 ~ 2.89 (>CH—, —CH$_2$—, —CH$_3$), 3.18 ~ 3.21 (>CH—), 3.60 (OCH$_3$), 3.79 ~ 4.34 (—CH$_2$—)

Copolymerization ratio $m_1:m_2 = 44.4:55.6$.

Example 68

Reaction was run by the same method as in Example 64 except that 2.48 g (10 mmol) of CH$_2$=CCH$_3$CO$_2$(CH$_2$)$_3$Si(OCH$_3$)$_3$ was used in place of trimethoxyvinylsilane in Example 64 to obtain 8.0 g of the polymer having the following structure. The product was analyzed by the same method as in Example 64 and results of the analysis are shown in the following.

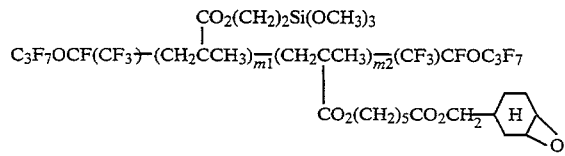

Number average molecular weight: $M_n = 2010$ (($M_w/M_n = 1.50$)

IR (cm$^{-1}$): 1735 (C=O), 1330 (CF$_3$), 1240 (CF$_2$),

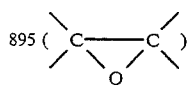
895

$^{19}$F-NMR (CDCl$_3$, ext. CF$_3$CO$_2$H): δ −3.36 ~ −9.89 (16F), −54.10 ~ −56.23 (6F)

$^1$H-NMR (CDCl$_3$): δ 0.71 ~ 2.45 (>CH—, —CH$_2$—, —CH$_3$), 3.15 ~ 3.61 (>CH—), 3.31 ~ 3.51 (OCH$_3$), 3.69 ~ 4.32 (—CH$_2$—),

Copolymerization ratio $m_1:m_2 = 51.0:49.0$.

Example 69

To 70.0 g (226 mmol) of 6-methacroyloxyhexanoyloxymethyl-7-oxabicyclo[4.1.0]heptane, 600 g of a solution of 1,1,2-trichlorotrifluoroethane containing 7.9 g (7.9 mmol) of diperfluoro-2,5-dimethyl-3,6-dioxanonanoyl peroxide was added and the mixture was allowed to react for 3 hours at 40° C. under nitrogen atmosphere. After the reaction, a white powder formed by the reaction was filtered and dried in vacuum to obtain 58 g of a colorless clear liquid product. The product was analyzed by the gel permeation chromatography, the infrared spectroscopy and the $^{19}$F nuclear magnetic resonance spectroscopy and found to be the epoxy polymer comprising fluorine having the following structure. Results of the analysis are shown in the following.

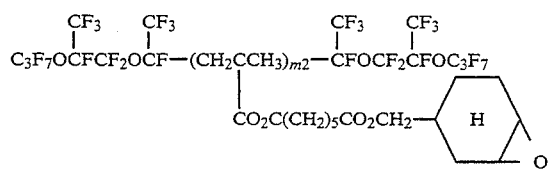

Number average molecular weight: $M_n = 8900$ (($M_w/M_n = 1.72$)

IR (cm$^{-1}$): 1736 (C=O), 1330 (CF$_3$), 1245 (CF$_2$),

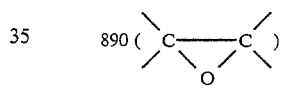
890

$^{19}$F-NMR (CDCl$_3$, ext. CF$_3$CO$_2$H): δ −3.18 ~ −9.44 (26F), −54.00 ~ −69.03 (8F)

Example 70

Reaction was run by the same method as in Example 69 except that 9.8 g (50 mmol) of methacroyloxymethyl-7-oxabicyclo[4.1.0]heptane and 20 g (200 mmol) of methyl methacrylate were used in place of 6-methacroyloxyhexanoyloxymethyl-7-oxabicyclo[4.1.0]heptane in Example 69 and 9.9 g (10 mmol) of diperfluoro-2,5-dimethyl-3,6-dioxanonanoyl peroxide was used in place of 7.9 g (7.8 mmol) of diperfluoro-2,5-dimethyl-3,6-dioxanonanoyl peroxide in Example 69 to obtain 18 g of the polymer having the following structure. The product was analyzed by the same method as in Example 69 and results of the analysis are shown in the following.

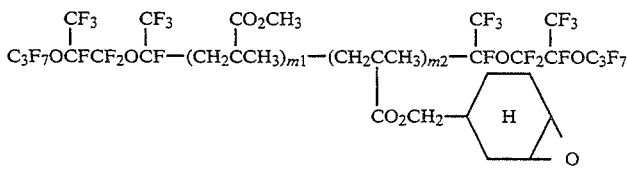

Number average molecular weight: $M_n = 6350$ (($M_w/M_n = 1.51$)

IR (cm$^{-1}$): 1732 (C=O), 1322 (CF$_3$), 1240 (CF$_2$),

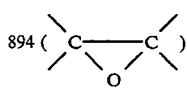

894

$^{19}$F-NMR (CDCl$_3$, ext. CF$_3$CO$_2$H): δ−2.99∼−9.04 (26F), −54.21∼−68.02 (8F)

Copolymerization ratio m$_1$:m$_2$=79:21.

Example 71

Reaction was run by the same method as in Example 69 except that 9.8 g (50 mmol) of methacroyloxymethyl-7-oxabicyclo[4.1.0]heptane and 39.2 g (200 mmol) of 2-ethylhexyl methacrylate were used in place of 6-methacroyloxyhexanoyloxymethyl-7-oxabicyclo[4.1.0-]heptane in Example 69 and 9.9 g (10 mmol) of diperfluoro-2,5-dimethyl-3,6-dioxanonanoyl peroxide was used in place of 7.9 g (7.8 mmol) of diperfluoro-2,5-dimethyl-3,6-dioxanonanoyl peroxide in Example 69 to obtain 48 g of the polymer having the following structure. The product was analyzed by the same method as in Example 69 and results of the analysis are shown in the following.

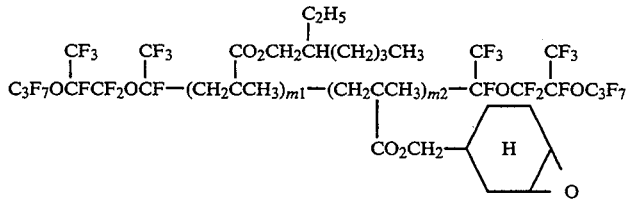

Number average molecular weight: M$_n$=8300 ((M$_w$/M$_n$=1.71)

IR (cm$^{-1}$): 1730 (C=O), 1335 (CF$_3$), 1245 (CF$_2$),

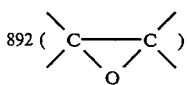

892

$^{19}$F-NMR (CDCl$_3$, ext. CF$_3$CO$_2$H): δ−3.29∼−9.00 (26F), −54.04∼−67.88 (8F)

Copolymerization ratio m$_1$:m$_2$=79:21.

Example 72

Reaction was run by the same method as in Example 69 except that 9.8 g (50 mmol) of methacroyloxymethyl-7-oxabicyclo[4.1.0]heptane and 20 g of (200 mmol) of methyl methacrylate were used in place of 6-methacroyloxyhexanoyloxymethyl-7-oxabicyclo[4.1.0]heptane in Example 69 and 7.3 g (10 mmol) of diperfluoroheptanoyl peroxide was used in place of diperfluoro-2,5-dimethyl-3,6-dioxanonanoyl peroxide in Example 64 to obtain 13 g of the polymer having the following structure. The product was analyzed by the same method as in Example 64 and results of the analysis are shown in the following.

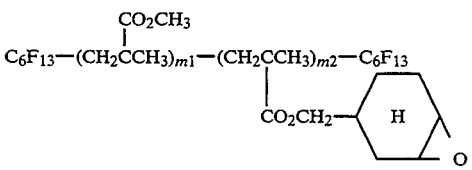

Number average molecular weight: M$_n$=6010 ((M$_w$/M$_n$=1.49)

IR (cm$^{-1}$): 1730 (C=O), 1335 (CF$_3$), 1245 (CF$_2$),

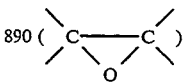

890

$^{19}$F-NMR (CDCl$_3$, ext. CF$_3$CO$_2$H): δ−3.09 (6F), −29.09 (4F), −44.01∼−48.92 (16F)

Copolymerization ratio m$_1$:m$_2$=76:24.

Example of Synthesis 7

To 7.5 g of methyl methacrylate and 37.2 g of 3-methacryloxypropyltrimethoxysilane, 1500 g of a solution of 1,1,2-trichlorotrifluoroethane containing 16.5 g (7.9 mmol) of diperfluoro-2-methyl-3-oxahexanoyl peroxide was added and the mixture was allowed to react for 5 hours at 30° C. under nitrogen atmosphere. After the reaction, the solvent was removed and the reaction product was dried in vacuum to obtain 50 g of a silicon polymer comprising fluoroalkyl group. Molecular weight of the polymer was measured by the gel permeation chromatography. Results of the analysis are shown in Table 5.

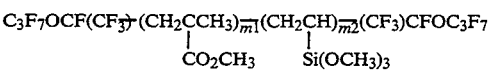

Examples of Synthesis 8 to 10

Reactions were run by the same method as in Example of synthesis 7 except that compounds shown in Table 5 were used in amounts also shown in Table 5 to obtain silicone polymers having fluoroalkyl group in yields shown in Table 5. Weight average molecular weights of the polymers are shown in Table 5.

TABLE 5

| Example of synthesis | 7 | 8 | 9 | 10 |
|---|---|---|---|---|
| material compound (g) | | | | |
| diperfluoro-2-methyl-3-oxahexanoyl peroxide | 16.5 | 16.5 | — | — |
| diperfluoro-2,5-dimethyl-3,6-dioxanonanoyl peroxide | — | — | 17.0 | 32.0 |
| trimethoxyvinylsilane | — | 11.0 | — | 7.4 |

TABLE 5-continued

| Example of synthesis | 7 | 8 | 9 | 10 |
|---|---|---|---|---|
| 3-trimethacryloxy-propyl-trimethoxysilane | 37.2 | — | 10.0 | — |
| methyl methacrylate | 7.5 | 12.0 | 15.5 | 5.0 |
| n-butyl methacrylate | — | 12.0 | 17.2 | — |
| 2-hydroxyethyl methacrylate | — | 10.0 | 10.0 | — |
| weight average molecular weight | 8700 | 9300 | 23000 | 890 |
| yield (g) | 50 | 51 | 63 | 42 |

Example of Synthesis 11

A mixture of 50 weight parts of xylene and 30 weight parts of butyl acetate was heated to 100° C. under stirring and, to the heated mixture, a monomer mixture containing 30 weight parts of 3-methacryloxypropyl-tris(trimethylsiloxy)silane, 12 weight parts of 2-hydroxyethyl methacrylate, 30 weight parts of styrene, 26 weight parts of n-butyl methacrylate, 2 weight parts of acrylic acid and 3 weight parts of azo-bisisobutyronitrile was dropped in 2 hours. After the dropping of the monomer mixture, the reaction was allowed to proceed for further 2 hours at 100° C. After the reaction, the reaction system was cooled to obtain a solution of the reaction mixture. To the solution, 23 weight parts of butyl acetate was added to obtain 206 weight parts of a solution containing 50 weight % (as the residue of heating) of vinyl polymer comprising alkylsilane having weight average molecular weight of 14600.

Example of Synthesis 12

Reaction was run by the same method as in Example of synthesis 11 except that a monomer mixture containing 30 weight parts of 1H,1H,2H,2H-heptadecafluorodecyl methacrylate, 12 weight parts of 2-hydroxyethyl methacrylate, 30 weight parts of styrene, 26 weight parts of n-butyl methacrylate and 2 weight parts of acrylic acid was used in place of the monomer mixture described in Example of synthesis 11 to obtain 206 weight parts of a solution containing 50.2 weight % (as the residue of heating) of vinyl polymer comprising fluoroalkyl group having weight average molecular weight of 15300.

Example of Synthesis 13

To 2.8 g (20 mmol) of butyl methacrylate and 2.6 g (20 mmol) of 2-hydroxyethyl methacrylate, 40 g of a solution of 1,1,2-trichlorotrifluoroethane containing 4.0 g (6 mmol) of perfluoro-2-methyl-3-oxahexanoyl peroxide was added and the mixture was allowed to react at 30° C. for 6 hours under nitrogen stream to obtain the polymer comprising fluoroalkyl group having the following formula. The polymer had number average molecular weight of 1200 ($M_w/M_n = 1.40$) and $m_1:m_2$ in the formula was 1:2.

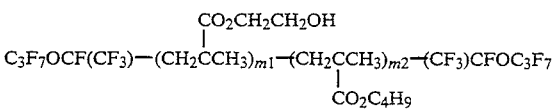

Example of Synthesis 14

Reaction was run by the same method as in Example of synthesis 13 except that 2.0 g (3 mmol) of perfluoro-2-methyl-3-oxahexanoyl peroxide was used in place of 4.0 g (6 mmol) of perfluoro-2-methyl-3-oxahexanoyl peroxide in Example of synthesis 13 to obtain the polymer comprising fluoroalkyl group having the following formula. The polymer had number average molecular weight of 2520 ($M_w/M_n = 1.09$) and $m_1:m_2$ in the formula was 1:1.

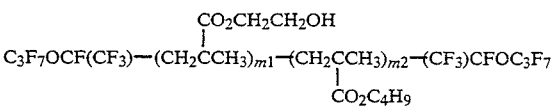

Example of Synthesis 15

Reaction was run by the same method as in Example of synthesis 13 except that 8.4 g (60 mmol) of butyl methacrylate was used in place of 2.8 g (20 mmol) of butyl methacrylate in Example of synthesis 13 to obtain the polymer comprising fluoroalkyl group having the following formula. The polymer had number average molecular weight of 1200 ($M_w/M_n = 1.40$) and $m_1:m_2$ in the formula was 1:3.

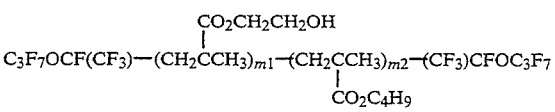

Example of Synthesis 16

Reaction was run by the same method as in Example of synthesis 13 except that perfluoro-2,5-dimethyl-3,6-dioxanonanoyl peroxide was used in place of perfluoro-2-methyl-3-oxahexanoyl peroxide in Example of synthesis 13 to obtain the polymer comprising fluoroalkyl group having the following formula. The polymer had number average molecular weight of 1200 ($M_w/M_n = 1.00$) and $m_1:m_2$ in the formula was 1:1.

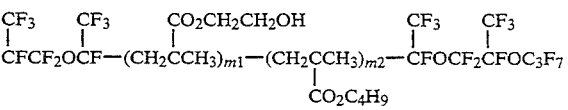

Example of Synthesis 17

Reaction was run by the same method as in Example of synthesis 13 except that 19.6 g (140 mmol) of butyl methacrylate was used in place of 2.8 g (20 mmol) of butyl methacrylate in Example of synthesis 13 to obtain the polymer comprising fluoroalkyl group having the following formula. The polymer had number average molecular weight of 1200 ($M_w/M_n = 1.00$) and $m_1:m_2$ in the formula was 1:6.

$$\underset{\underset{CO_2C_4H_9}{|}}{\overset{\overset{CO_2CH_2CH_2OH}{|}}{C_3F_7OCF(CF_3)-(CH_2CCH_3)_{m1}-(CH_2CCH_3)_{m2}-(CF_3)CFOC_3F_7}}$$

Example of Synthesis 18

To 1.5 g (10 mmol) of trimethoxyvinylsilane and 2.0 g (10 mmol) of 2-hydroxyethyl methacrylate, 124 g of a solution of 1,1,2-trichlorotrifluoroethane containing 9.9 g (6 mmol) of perfluoro-2,5-dimethyl-3,6-dioxanonanoyl peroxide was added and the mixture was allowed to react at 30° C. for 6 hours under nitrogen stream to obtain the polymer comprising fluoroalkyl group having the following formula. The polymer had number average molecular weight of 1990 ($M_w/M_n=1.11$) and $m_1:m_2$ in the formula was 1:1.

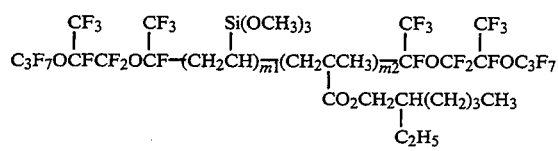

Example of Synthesis 19

Reaction was run by the same method as in Example of synthesis except that perfluoro-2-methyl-3-oxahexanoyl peroxide was used in place of perfluoro-2,5-dimethyl-3,6-dioxanonanoyl peroxide in Example of synthesis 18 to obtain the polymer comprising fluoroalkyl group having the following formula. The polymer had number average molecular weight of 2030 ($M_w/M_n=1.12$) and $m_1:m_2$ in the formula was 1:1.

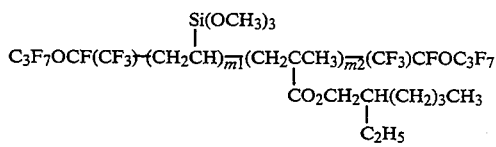

Example of Synthesis 20

Reaction was run by the same method as in Example of synthesis 18 except that butyl methacrylate was used in place of 2-ethylhexyl methacrylate in Example of synthesis 18 to obtain the polymer comprising fluoroalkyl group having the following formula. The polymer had number average molecular weight of 1850 ($M_w/M_n=1.07$) and $m_1:m_2$ in the formula was 1:1.

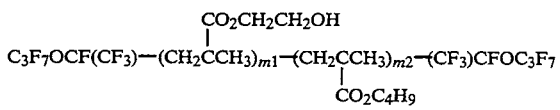

Example of Synthesis 21

Reaction was run by the same method as in Example of synthesis 18 except that 5.3 g (8 mmol) of perfluoro-2-methyl-3-oxahexanoyl peroxide was used in place of perfluoro-2,5-dimethyl-3,6-dioxanonanoyl peroxide in Example of synthesis 18 and butyl methacrylate was used in place of 2-ethylhexyl methacrylate in Example of synthesis 18 to obtain the polymer comprising fluoroalkyl group having the following formula. The polymer had number average molecular weight of 1770 ($M_w/M_n=1.15$) and $m_1:m_2$ in the formula was 1:1.

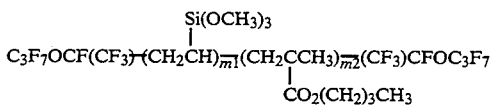

Example of Synthesis 22

Reaction was run by the same method as in Example of synthesis 13 except that glycidyl methacrylate was used in place of 2-hydroxyethyl methacrylate in Example of synthesis 13 to obtain the polymer comprising fluoroalkyl group having the following formula. The polymer had number average molecular weight of 2590 ($M_w/M_n=1.62$) and $m_1:m_2$ in the formula was 1:1.

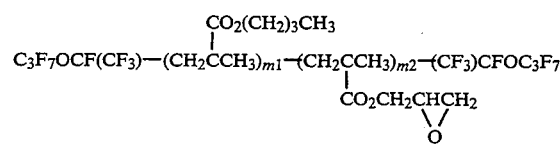

Example of Synthesis 23

Reaction was run by the same method as in Example of synthesis 13 except that

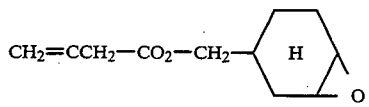

was used in place of 2-hydroxyethyl methacrylate in Example of synthesis 13 to obtain the polymer comprising fluoroalkyl group having the following formula. The polymer had number average molecular weight of 2990 ($M_w/M_n=1.71$) and $m_1:m_2$ in the formula was 1:1.

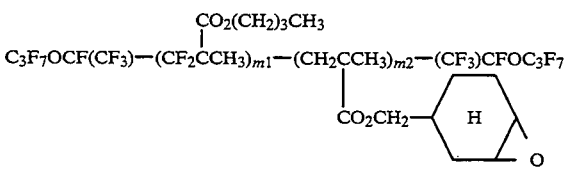

Example of Synthesis 24

Reaction was run by the same method as in Example of synthesis 18 except that perfluoro-2-methyl-3-oxahexanoyl peroxide was used in place of perfluoro-2,5-dimethyl-3,6-dioxanonanoyl peroxide in Example of synthesis 18 and

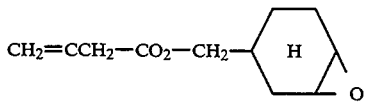

was used in place of 2-ethylhexyl methacrylate in Example of synthesis 18 to obtain the polymer comprising fluoroalkyl group having the following formula. The polymer had number average molecular weight of 1720 ($M_w/M_n = 1.14$).

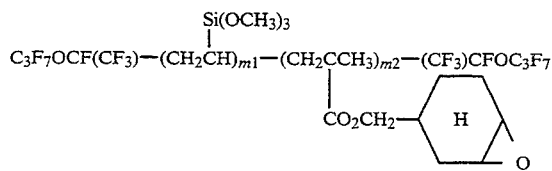

Example of Synthesis 25

Into a 2 l four-necked flask equipped with a stirrer, a thermometer, a cooler and a dropping funnel, 599.6 g of Solvet #100 ® (a product of Exxon Kagaku Co., Ltd.) was charged and heated to 130° C. To the flask, 214.8 g of 2-hydroxyethyl methacrylate, 139.05 g of methyl methacrylate, 471.3 g of 2-ethylhexyl methacrylate and 20.7 g of Perbutyl O ® (a product of NOF CORPORATION) were added and the mixture was allowed to react for 3.5 hours at 100° to 130° C. to obtain 1460 g of a polyol resin having 55.7 weight % of solid component and weight average molecular weight of 12300.

Example of Synthesis 26

Reaction was run by the same method as in Example of synthesis 25 except that glycidyl methacrylate was used in place of 2-hydroxyethyl methacrylate in Example of synthesis 25 to obtain an epoxy resin having 55.7 weight % of solid component and weight average molecular weight of 11300.

Examples 73 to 80 and Comparative Examples 6 to 8

Solutions of coating material were prepared by mixing one of the polymers obtained in Examples of synthesis 7 to 12 and compounds shown in Table 6 to form the compositions shown in Table 6. The solutions of coating materials thus prepared were diluted with a mixed solvent of xylene and butyl acetate in 6:4 weight ratio so that the solutions had viscosity of 25 seconds by Ford cup No. 4 at 20° C.

HIGH EPICO No. 100 White ® (a product of NOF CORPORATION) was coated on a steel plate and cured for 20 minutes at 140° C. To the coating layer thus prepared, one of the solutions of coating material prepared above was coated by spraying and cured by the condition shown in Table 6 to obtain a test piece. Contact angle of the test piece with water and dodecane was measured. Then, the test piece was dipped into water of 40° C. for 24 hours and the contact angle of the test piece with water and dodecane were measured again. This time, resistance against fouling was also evaluated. Results are shown in Table 6. The resistance against fouling was evaluated by the following method. A test piece was dipped into water of 40° C. for 24 hours and fouled with artificial mud (containing field soil, mineral oil, clay and carbon black) for 10 minutes at 40° C., magic ink for 10 minutes at 25° C. or lipstick for 10 minutes at 25° C. After the fouling, the artificial mud was washed with water and magic ink and lipstick were wiped with cloth by using a mixed solvent of petroleum benzine and ethanol (90:10 in weight ratio). Condition after washing or wiping was evaluated by visual observation and the result was expressed according to the following criterion.

◎: no fouling at all
◯: slight fouling
△: considerable fouling
×: remarkable fouling

TABLE 6

| Example | 73 | 74 | 75 | 76 | 77 | 78 | 79 | 80 | — | — | — |
| Comparative example | — | — | — | — | — | — | — | — | 6 | 7 | 8 |
| composition of the coating material (weight %) | | | | | | | | | | | |
| silicon polymer of Example of synthesis 7 | 0.5 | — | — | — | — | — | — | — | — | — | — |
| silicon polymer of Example of synthesis 8 | — | 0.5 | 0.5 | 0.5 | 0.5 | — | — | 60.0 | — | — | — |
| silicon polymer of Example of synthesis 9 | — | — | — | — | — | 35.0 | — | — | — | — | — |
| silicon polymer of Example of synthesis 10 | — | — | — | — | — | — | 0.1 | — | — | — | — |
| vinyl polymer comprising alkylsilane group | — | — | — | — | — | — | — | — | 70.0 | — | — |
| vinyl polymer comprising fluoroalkyl group | — | — | — | — | — | — | — | — | — | 70.0 | — |
| Aksodic A310[1] | 69.0 | 69.0 | — | — | — | 70.0 | — | — | — | — | 70.0 |
| Bekosol 57-1362[2] | — | — | 53.0 | — | — | — | — | — | — | — | — |
| Desmofen 680[3] | — | — | — | 57.5 | 60.0 | — | — | — | — | — | — |
| Yuban 20SE-60[4] | 25.0 | 25.0 | 25.0 | 25.0 | — | 25.0 | 25.0 | — | 25.0 | 25.0 | 25.0 |
| Sumidur N[5] | — | — | — | — | 18.0 | — | — | — | — | — | — |
| dibutyltin dilaurate | 0.1 | 0.1 | 0.1 | 0.1 | 0.1 | 0.1 | 0.1 | 0.1 | — | — | — |
| xylene | 5.4 | 5.4 | 7.4 | 5.4 | 7.4 | 13.9 | 4.8 | 13.3 | 5.0 | 5.0 | 5.0 |
| Solveso 100[6] | — | — | 8.0 | 5.0 | 8.0 | 13.0 | — | 13.3 | — | — | — |
| butyl acetate | — | — | 6.0 | 6.5 | 6.0 | 13.0 | — | 13.3 | — | — | — |
| condition of curing | 140° 30 m | 140° 30 m | 140° 30 m | 140° 30 m | 140° 30 m | 140° 30 m | 140° 30 m | | 140° 30 m | 140° 30 m | 140° 30 m |
| water, oil repellency (contact angle, degree) initial | | | | | | | | | | | |
| water | 106 | 105 | 107 | 106 | 106 | 107 | 105 | 108 | 103 | 108 | 68 |
| dodecane | 57 | 55 | 56 | 55 | 56 | 61 | 54 | 62 | 24 | 61 | 15 |
| after 24 hrs. at 40° C. in water | | | | | | | | | | | |
| water | 106 | 105 | 106 | 105 | 106 | 107 | 103 | 107 | 82 | 68 | 65 |
| dodecane | 56 | 54 | 53 | 54 | 54 | 60 | 51 | 60 | 18 | 14 | 14 |
| resistance against fouling | | | | | | | | | | | |
| artificial mud | ◎ | ◎ | ◎ | ◎ | ◎ | ◎ | ◯ | ◎ | × | × | × |

TABLE 6-continued

| Example | 73 | 74 | 75 | 76 | 77 | 78 | 79 | 80 | — | — | — |
|---|---|---|---|---|---|---|---|---|---|---|---|
| Comparative example | — | — | — | — | — | — | — | — | 6 | 7 | 8 |
| magic ink | ⊚ | ⊚ | ⊚ | ⊚ | ⊚ | ⊚ | ◯ | ⊚ | Δ | Δ | X |
| lipstick | ⊚ | ⊚ | ⊚ | ⊚ | ⊚ | ⊚ | ⊚ | ⊚ | Δ | Δ | Δ |

[1] A commercial product of Dainippon Ink Kagaku Kogyo Co., Ltd.; an acrylic varnish resin; residue by heating, 50%.
[1] A commercial product of Dainippon Ink Kagaku Kogyo Co., Ltd.; an alkyd varnish resin; residue by heating, 65%.
[3] A commercial product of Sumitomo Bayer Urethane Co., Ltd.; a polyester varnish resin; residue by heating, 60%.
[4] A commercial product of Mitsui Toatsu Kagaku Co., Ltd.; a melamine resin varnish; residue by heating 60%.
[5] A commercial product of Sumitomo Bayer Urethane Co., Ltd.; a solution of aliphatic polyisocyanate compound; residue by heating, 75%.
[6] A commercial product of Esso Sekiyu Kagaku Co., Ltd.; an aromatic solvent.

Examples 81 to 89

To 16.7 g of the polyol resin prepared in Example of synthesis 25, 4 g of a hardener, Cymel 303 ® (a product of Mitsui Cyanamid Co., Ltd.), was added and one of the polymers comprising fluoroalkyl group prepared in Example of synthesis 13 to 21 was further added to the mixture in a specified amount based on the total of the polyol resin and the hardener so that the mixture thus formed had the composition shown in Table 7. Then, 1 weight % of a catalyst dodecylbenzenesulfonic acid based on the total of the polyol resin and the hardener was added. To adjust viscosity of the resin solution thus prepared, 9 ml of Solvesso #100 ® (a product of Exxon Kagaku Co., Ltd.) was added and the solution was stirred to prepare a solution of coating material.

The coating material thus prepared was coated on a steel plate by spraying and cured at 140° C. for 30 minutes to prepare a test piece. After occurrence of cissing on the test piece was visually examined, the coating was evaluated by the same method as in Examples 73 to 80. Results are shown in Table 7.

Result of the evaluation on the occurrence of cissing is expressed as following:
none: the coating formed was uniform without occurrence of cissing.
occurred: the coating formed was not uniform and occurrence of cissing was observed.

Example 90 to 92

Coating materials were prepared, coated by spraying and evaluated by the same method as in Examples 81 except that the epoxy resin prepared in Example of synthesis 26 was used in place of the polyol resin prepared in Example of synthesis 25 in Example 81, adipic acid was used in place of Cymel 303 ® in Example 81 and tetrabutyl phosphonium bromide was used as the catalyst in place of dodecylbenzenesulfonic acid in Example 81. Results are shown in Table 7.

Comparative Example 9

Coating materials were prepared, coated by spraying and evaluated by the same method as in Examples 81 to 92 except that none of the polymer comprising fluoroalkyl group prepared in Examples of synthesis 13 to 24 was used. Results are shown in Table 7.

TABLE 7

| Example | 81 | 81 | 82 | 82 | 83 | 83 | 84 | 84 | 85 | 85 | 86 |
|---|---|---|---|---|---|---|---|---|---|---|---|
| Comparative example | — | — | — | — | — | — | — | — | — | — | — |
| composition of the coating material (weight %) | | | | | | | | | | | |
| polymer of Example of synthesis 13 | 0.5 | 1 | — | — | — | — | — | — | — | — | — |
| polymer of Example of synthesis 14 | — | — | 0.5 | 1 | — | — | — | — | — | — | — |
| polymer of Example of synthesis 15 | — | — | — | — | 0.5 | 1 | — | — | — | — | — |
| polymer of Example of synthesis 16 | — | — | — | — | — | — | 0.5 | 1 | — | — | — |
| polymer of Example of synthesis 17 | — | — | — | — | — | — | — | — | 0.5 | 1 | — |
| polymer of Example of synthesis 18 | — | — | — | — | — | — | — | — | — | — | 0.05 |
| polymer of Example of synthesis 19 | — | — | — | — | — | — | — | — | — | — | — |
| polymer of Example of synthesis 20 | — | — | — | — | — | — | — | — | — | — | — |
| polymer of Example of synthesis 21 | — | — | — | — | — | — | — | — | — | — | — |
| polymer of Example of synthesis 22 | — | — | — | — | — | — | — | — | — | — | — |
| polymer of Example of synthesis 23 | — | — | — | — | — | — | — | — | — | — | — |
| polymer of Example of synthesis 24 | — | — | — | — | — | — | — | — | — | — | — |
| occurrence of cissing | none | none | none | none | none | none | none | none | none | none | none |
| water, oil repellency (contact angle, degree) initial | | | | | | | | | | | |
| water | 95 | 99 | 94 | 98 | 98 | 100 | 111 | 111 | 109 | 110 | 105 |
| dodecane | 39 | 42 | 40 | 41 | 52 | 58 | 60 | 62 | 61 | 63 | 58 |
| after 24 hrs. at 40° C. in water | | | | | | | | | | | |
| water | 95 | 98 | 93 | 98 | 98 | 100 | 111 | 111 | 109 | 110 | 106 |
| dodecane | 39 | 42 | 40 | 41 | 51 | 57 | 61 | 62 | 60 | 63 | 58 |
| resistance against fouling | | | | | | | | | | | |
| artificial mud | ⊚ | ⊚ | ⊚ | ⊚ | ⊚ | ⊚ | ⊚ | ⊚ | ⊚ | ⊚ | ⊚ |
| magic ink | ⊚ | ⊚ | ⊚ | ⊚ | ⊚ | ⊚ | ⊚ | ⊚ | ⊚ | ⊚ | ⊚ |
| lipstick | ⊚ | ⊚ | ⊚ | ⊚ | ⊚ | ⊚ | ⊚ | ⊚ | ⊚ | ⊚ | ⊚ |
| Example | 86 | | 87 | 87 | 88 | 88 | 89 | 89 | 90 | 90 | 91 |
| Comparative example | — | | — | — | — | — | — | — | — | — | — |
| composition of the coating material (weight %) | | | | | | | | | | | |
| polymer of Example of synthesis 13 | — | | — | — | — | — | — | — | — | — | — |
| polymer of Example of synthesis 14 | — | | — | — | — | — | — | — | — | — | — |
| polymer of Example of synthesis 15 | — | | — | — | — | — | — | — | — | — | — |
| polymer of Example of synthesis 16 | — | | — | — | — | — | — | — | — | — | — |
| polymer of Example of synthesis 17 | — | | — | — | — | — | — | — | — | — | — |
| polymer of Example of synthesis 18 | 1 | | — | — | — | — | — | — | — | — | — |

TABLE 7-continued

| | | | | | | | | | | |
|---|---|---|---|---|---|---|---|---|---|---|
| polymer of Example of synthesis 19 | — | 0.05 | 0.5 | — | — | — | — | — | — | — |
| polymer of Example of synthesis 20 | — | — | — | 0.05 | 0.5 | — | — | — | — | — |
| polymer of Example of synthesis 21 | — | — | — | — | — | 0.05 | 0.5 | — | — | — |
| polymer of Example of synthesis 22 | — | — | — | — | — | — | — | 0.5 | 1 | — |
| polymer of Example of synthesis 23 | — | — | — | — | — | — | — | — | — | 0.5 |
| polymer of Example of synthesis 24 | — | — | — | — | — | — | — | — | — | — |
| occurrence of cissing | none | none | none | none | none | none | none | none | none | none |
| water, oil repellency (contact angle, degree) | | | | | | | | | | |
| initial | | | | | | | | | | |
| water | 109 | 105 | 106 | 110 | 113 | 104 | 105 | 106 | 107 | 105 |
| dodecane | 60 | 60 | 68 | 69 | 69 | 59 | 60 | 62 | 63 | 63 |
| after 24 hrs. at 40° C. in water | | | | | | | | | | |
| water | 109 | 105 | 106 | 110 | 112 | 104 | 106 | 106 | 107 | 105 |
| dodecane | 60 | 60 | 67 | 68 | 69 | 59 | 60 | 62 | 63 | 63 |
| resistance against fouling | | | | | | | | | | |
| artificial mud | ⊙ | ⊙ | ⊙ | ⊙ | ⊙ | ⊙ | ⊙ | ⊙ | ⊙ | ⊙ |
| magic ink | ⊙ | ⊙ | ⊙ | ⊙ | ⊙ | ⊙ | ⊙ | ⊙ | ⊙ | ⊙ |
| lipstick | ⊙ | ⊙ | ⊙ | ⊙ | ⊙ | ⊙ | ⊙ | ⊙ | ⊙ | ⊙ |
| Example | | | | | | | 91 | 92 | 92 | — |
| Comparative example | | | | | | | — | — | — | 9 |

| | | | | |
|---|---|---|---|---|
| composition of the coating material (weight %) | | | | |
| polymer of Example of synthesis 13 | — | — | — | — |
| polymer of Example of synthesis 14 | — | — | — | — |
| polymer of Example of synthesis 15 | — | — | — | — |
| polymer of Example of synthesis 16 | — | — | — | — |
| polymer of Example of synthesis 17 | — | — | — | — |
| polymer of Example of synthesis 18 | — | — | — | — |
| polymer of Example of synthesis 19 | — | — | — | — |
| polymer of Example of synthesis 20 | — | — | — | — |
| polymer of Example of synthesis 21 | — | — | — | — |
| polymer of Example of synthesis 22 | — | — | — | — |
| polymer of Example of synthesis 23 | 1 | — | — | — |
| polymer of Example of synthesis 24 | — | 0.5 | 1 | — |
| occurrence of cissing | none | none | none | none |
| water, oil repellency (contact angle, degree) | | | | |
| initial | | | | |
| water | 104 | 112 | 113 | 80 |
| dodecane | 63 | 69 | 69 | 0 |
| after 24 hrs. at 40° C. in water | | | | |
| water | 104 | 112 | 113 | 79 |
| dodecane | 63 | 69 | 69 | 0 |
| resistance against fouling | | | | |
| artificial mud | ⊙ | ⊙ | ⊙ | X |
| magic ink | ⊙ | ⊙ | ⊙ | X |
| lipstick | ⊙ | ⊙ | ⊙ | Δ |

The results in Tables 6 and 7 show that the coating compositions of the invention had excellent water repellency and the oil repellency and the excellent properties were retained for a long time while the coating compositions in Comparative examples did not. It is clearly shown that the coating formed by the coating compositions of the invention have excellent resistance against fouling.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of preparation of the polymer comprising fluoroalkyl group having the formula (I):

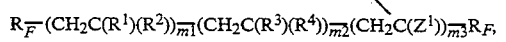

comprising reacting a fluoroalkanoyl peroxide having the formula (II):

$$R_F COOCR_F,  \quad\text{(II)}$$

wherein $R_F$ is $-(CF_2)_{n1}X$ or

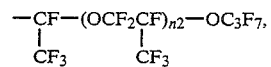

$m_1$ is an integer of 1 to 1000, $m_2$ and $m_3$ are respectively an integer of 0 to 3000, $n_1$ is an integer of 1 to 10, X is a fluorine atom, chlorine atom or hydrogen atom and $n_2$ is an integer of 0 to 8, $R^3$ is $R^1$ of the following formula (III), $R^1$ and $R^3$ of the formula (I) are the same or different atoms or groups, $R^4$ is $R^2$ of the following formula (III), $R^2$ and $R^4$ of the formula (I) are the same or different atoms or groups; with a monomer having the formula (III):

$$CH_2=C(R^1)(R^2) \quad\text{(III),}$$

wherein $R^1$ is hydrogen atom, halogen atom or alkyl group having 1 to 5 carbon atoms, $R^2$ is hydrogen atom, halogen atom, cyano group, alkylsulfonic acid group having 1 to 4 carbon atoms, amidoalkylsulfonic acid group having 1 to 4 carbon atoms, $-CO_2R^5$, $-OCOR^6$, $-OR^7$, $-CO_2(CH_2CH(R^8)O)_{m4}-$ $-(CH_2CH(R^9)O)_{m5}[CH_2CH_2(CH_2)_{m7}O]_{m6}(R^{10})$,

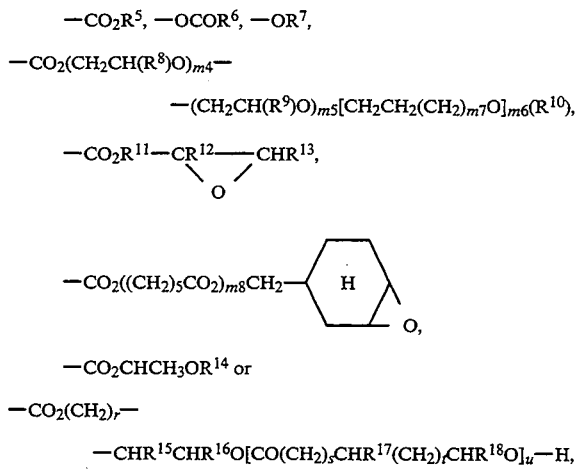

$-CO_2CHCH_3OR^{14}$ or $-CO_2(CH_2)_r-$

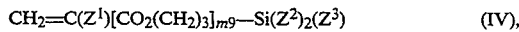

$R^5$ is hydrogen atom, alkyl group having 1 to 18 carbon atoms or hydroxyalkyl group having 3 to 6 carbon atoms, $R^6$ and $R^7$ are the same or different atoms or groups respectively selected from the group consisting of hydrogen atom, alkyl group having 1 to 18 carbon atoms and hydroxyalkyl group having 1 to 4 carbon atoms, $R^8$, $R^9$ and $R^{10}$ are the same or different groups respectively selected from the group consisting of hydrogen atom and methyl group, $R^{11}$ is alkylene group having 1 to 10 carbon atoms or $-(CH_2CH_2O)_pCH_2-$, $R^{12}$ and $R^{13}$ are the same or different atoms or groups respectively selected from the group consisting of hydrogen atom and alkyl group having 1 to 18 carbon atoms, $R^{14}$ is alkyl group having 1 to 18 carbon atoms, $m_4$ is an integer of 1 to 20, $m_5$ and $m_6$ are respectively an integer of 0 to 20, $m_7$ is 1 or 2, $m_8$ is an integer of 0 to 5, p is an integer of 1 to 10, $R^{15}$, $R^{16}$, $R^{17}$ and $R^{18}$ are the same or different atoms or groups respectively selected from the group consisting of hydrogen atom and methyl group, r is an integer of 0 to 2, s and t are respectively an integer of 0 to 3 and u is an integer of 1 to 5; or a monomer having the formula (IV):

$$CH_2=C(Z^1)[CO_2(CH_2)_3]_{m9}-Si(Z^2)_2(Z^3) \qquad (IV),$$

wherein $Z^1$ is hydrogen atom or methyl group, $Z^2$ and $Z^3$ are groups having 1 to 10 carbon atoms respectively selected from the group consisting of alkyl group, alkoxy group and alkylcarbonyloxy group, $m_9$ is 0 or 1 and $Z^1$ is hydrogen atom when $m_9=0$.

2. A method of preparation of the polymer comprising fluoroalkyl group as claimed in claim 1 wherein the mol ratio of fluoroalkanoyl peroxide to the monomer having the formula (III) or (IV) is 1:0.5 to 1:1000.

3. A method of preparation of the polymer comprising fluoroalkyl group as claimed in claim 1 wherein the mol ration of the monomer having the formula (III) to the monomer having the formula (IV) is 1:0.01 to 1:100.

4. A method of preparation of the polymer comprising fluoroalkyl group as claimed in claim 1 wherein a halogenated aliphatic solvent is used as a solvent for the reaction.

* * * * *